US010417613B1

(12) United States Patent
Brisebois et al.

(10) Patent No.: US 10,417,613 B1
(45) Date of Patent: Sep. 17, 2019

(54) SYSTEMS AND METHODS OF PATTERNIZING LOGGED USER-INITIATED EVENTS FOR SCHEDULING FUNCTIONS

(71) Applicant: Dell Software Inc., Aliso Viejo, CA (US)

(72) Inventors: Michel Albert Brisebois, Renfrew (CA); Artem Nikolaevich Polikarpov, St. Petersburg (RU); Curtis T. Johnstone, Ottawa (CA)

(73) Assignee: Quest Software Inc., Aliso Viejo, CA (US)

( * ) Notice: Subject to any disclaimer, the term of this patent is extended or adjusted under 35 U.S.C. 154(b) by 524 days.

(21) Appl. No.: 14/660,697

(22) Filed: Mar. 17, 2015

(51) Int. Cl.
*G06Q 10/10* (2012.01)
*G06N 5/04* (2006.01)
*G06N 7/00* (2006.01)

(52) U.S. Cl.
CPC ......... *G06Q 10/1095* (2013.01); *G06N 5/047* (2013.01); *G06N 7/005* (2013.01)

(58) Field of Classification Search
CPC ........... G06Q 10/1093; G06Q 10/1095; G06Q 10/02; G06Q 10/0631; G06Q 10/06312; G06F 15/0266
See application file for complete search history.

(56) References Cited

U.S. PATENT DOCUMENTS

| 5,675,711 A | 10/1997 | Kephart et al. |
| 6,009,439 A | 12/1999 | Shiomi et al. |
| 6,012,087 A | 1/2000 | Freivald et al. |
| 6,092,059 A | 7/2000 | Straforini et al. |
| 6,266,656 B1 | 7/2001 | Ohno |
| 6,310,944 B1 | 10/2001 | Brisebois et al. |

(Continued)

FOREIGN PATENT DOCUMENTS

| WO | WO-2011/103385 A1 | 8/2011 |
| WO | WO-2013/166126 A1 | 11/2013 |

(Continued)

OTHER PUBLICATIONS

U.S. Appl. No. 14/683,441, Brisebois et al.

(Continued)

*Primary Examiner* — Tiphany B Dickerson
(74) *Attorney, Agent, or Firm* — Winstead PC

(57) ABSTRACT

In one embodiment, a method includes selecting a set of logged user-initiated events of a user. The method further includes determining timing information, device-identification information, and user-location information for the set of logged user-initiated events. In addition, the method includes correlating the set of logged user-initiated events to recurring time intervals of a time map. Also, the method includes determining an overall density, a location-specific density, and a device-specific density of the set of logged user-initiated events for at least some recurring time intervals of the time map. Furthermore, the method includes generating a time-based activity pattern of the user, the time-based activity pattern comprising, for the at least some recurring time intervals of the time map, information related to the overall density, the location-specific density, and the device-specific density. In addition, the method includes publishing the time-based activity pattern to a scheduling interface.

19 Claims, 28 Drawing Sheets

(56) References Cited

U.S. PATENT DOCUMENTS

| | | |
|---|---|---|
| 6,345,327 B1 | 2/2002 | Baskey et al. |
| 6,415,282 B1 | 7/2002 | Mukherjea et al. |
| 6,421,676 B1 | 7/2002 | Krishnamurthy et al. |
| 6,490,620 B1 | 12/2002 | Ditmer et al. |
| 6,633,835 B1 | 10/2003 | Moran et al. |
| 6,647,396 B2 | 11/2003 | Parnell et al. |
| 6,735,701 B1 | 5/2004 | Jacobson |
| 6,871,324 B2 | 3/2005 | Hand et al. |
| 6,883,019 B1 | 4/2005 | Sengupta et al. |
| 7,035,919 B1 | 4/2006 | Lee et al. |
| 7,047,236 B2 | 5/2006 | Conroy et al. |
| 7,058,621 B1 | 6/2006 | Wolge |
| 7,103,843 B2 | 9/2006 | Hand et al. |
| 7,318,040 B2 | 1/2008 | Doss et al. |
| 7,363,278 B2 | 4/2008 | Schmelzer et al. |
| 7,403,487 B1 | 7/2008 | Foladare et al. |
| 7,516,045 B2 * | 4/2009 | Butler ............... G06F 17/30905 702/183 |
| 7,516,492 B1 | 4/2009 | Nisbet et al. |
| 7,668,157 B2 * | 2/2010 | Weintraub ........ H04L 29/06027 370/260 |
| 7,730,537 B2 | 6/2010 | Bardsley et al. |
| 7,739,210 B2 * | 6/2010 | Horvitz ............... G06Q 10/109 706/21 |
| 7,760,684 B2 | 7/2010 | Kadar et al. |
| 7,769,751 B1 | 8/2010 | Wu et al. |
| 7,779,466 B2 | 8/2010 | Judge et al. |
| 7,809,856 B2 | 10/2010 | Skarpness |
| 7,836,097 B2 | 11/2010 | Blackstone et al. |
| 7,886,359 B2 | 2/2011 | Jones et al. |
| 7,908,647 B1 | 3/2011 | Polis et al. |
| 7,974,849 B1 * | 7/2011 | Begole ............... G06Q 10/0631 705/1.1 |
| 7,996,373 B1 | 8/2011 | Zoppas et al. |
| 7,996,374 B1 | 8/2011 | Jones et al. |
| 7,996,670 B1 | 8/2011 | Krishna et al. |
| 8,010,466 B2 | 8/2011 | Patinkin |
| 8,065,739 B1 | 11/2011 | Bruening et al. |
| 8,086,538 B2 | 12/2011 | D'Alo' et al. |
| 8,132,250 B2 | 3/2012 | Judge et al. |
| 8,141,127 B1 | 3/2012 | Mustafa |
| 8,156,553 B1 | 4/2012 | Church et al. |
| 8,224,924 B2 | 7/2012 | Andersen et al. |
| 8,250,158 B2 | 8/2012 | Arnold et al. |
| 8,255,370 B1 | 8/2012 | Zoppas et al. |
| 8,255,419 B2 | 8/2012 | Grebenik et al. |
| 8,286,254 B2 | 10/2012 | Kraemer et al. |
| 8,341,734 B1 | 12/2012 | Hernacki et al. |
| 8,346,929 B1 | 1/2013 | Lai |
| 8,359,472 B1 | 1/2013 | Ren et al. |
| 8,407,194 B1 | 3/2013 | Chaput et al. |
| 8,418,249 B1 | 4/2013 | Nucci et al. |
| 8,429,179 B1 | 4/2013 | Mirhaji |
| 8,429,260 B2 | 4/2013 | Siegel et al. |
| 8,489,615 B2 * | 7/2013 | Dhara ................. H04L 12/1818 707/748 |
| 8,495,705 B1 | 7/2013 | Verma et al. |
| 8,516,597 B1 | 8/2013 | Sharma et al. |
| 8,549,643 B1 | 10/2013 | Shou |
| 8,555,371 B1 | 10/2013 | Signaoff et al. |
| 8,560,671 B1 | 10/2013 | Yahalom et al. |
| 8,565,108 B1 | 10/2013 | Marshall et al. |
| 8,620,842 B1 | 12/2013 | Cormack |
| 8,620,922 B2 | 12/2013 | Bird et al. |
| 8,649,499 B1 | 2/2014 | Koster et al. |
| 8,671,190 B2 | 3/2014 | Liyanage et al. |
| 8,677,448 B1 | 3/2014 | Kauffman et al. |
| 8,683,052 B1 | 3/2014 | Brinskelle |
| 8,706,692 B1 | 4/2014 | Luthra et al. |
| 8,745,091 B2 | 6/2014 | McHenry et al. |
| 8,756,087 B1 | 6/2014 | Ambikar |
| 8,763,140 B2 | 6/2014 | Marcus et al. |
| 8,769,073 B2 | 7/2014 | Humphreys et al. |
| 8,817,966 B2 | 8/2014 | Wrench |
| 8,818,906 B1 | 8/2014 | Szwalbenest |
| 8,839,350 B1 | 9/2014 | McNair et al. |
| 8,863,272 B1 | 10/2014 | Maeng |
| 8,893,285 B2 | 11/2014 | Zucker et al. |
| 8,943,575 B2 | 1/2015 | Kumar et al. |
| 8,972,466 B1 | 3/2015 | Kumar |
| 9,009,256 B1 | 4/2015 | DeMorrow et al. |
| 9,015,832 B1 | 4/2015 | Lachwani et al. |
| 9,111,069 B1 | 8/2015 | Torney et al. |
| 9,160,700 B2 * | 10/2015 | Kau ........................ H04L 51/26 |
| 9,172,738 B1 * | 10/2015 | daCosta .................. H04L 67/00 |
| 9,183,384 B1 | 11/2015 | Bruhmuller |
| 9,202,063 B1 | 12/2015 | Ekke et al. |
| 9,213,847 B2 | 12/2015 | Farkash et al. |
| 9,246,944 B1 | 1/2016 | Chen |
| 9,300,693 B1 | 3/2016 | Manmohan et al. |
| 9,317,574 B1 * | 4/2016 | Brisebois .......... G06F 17/30864 |
| 9,349,016 B1 | 5/2016 | Brisebois et al. |
| 9,361,337 B1 | 6/2016 | Bhave et al. |
| 9,390,240 B1 | 7/2016 | Brisebois et al. |
| 9,473,532 B2 | 10/2016 | Pearl et al. |
| 9,485,606 B1 | 11/2016 | Song |
| 9,544,346 B1 | 1/2017 | Chakrovorthy et al. |
| 9,626,678 B2 | 4/2017 | Ovick et al. |
| 9,705,817 B2 * | 7/2017 | Lui ........................ H04L 47/70 |
| 9,750,433 B2 * | 9/2017 | Hu ........................... A61B 5/002 |
| 9,800,525 B1 | 10/2017 | Lerner et al. |
| 2001/0015817 A1 | 8/2001 | Adachi |
| 2002/0083063 A1 | 6/2002 | Egolf |
| 2002/0087682 A1 | 7/2002 | Roach |
| 2002/0091811 A1 | 7/2002 | Schweitzer et al. |
| 2002/0095454 A1 | 7/2002 | Reed et al. |
| 2002/0143595 A1 | 10/2002 | Frank et al. |
| 2002/0162031 A1 | 10/2002 | Levin et al. |
| 2002/0169679 A1 | 11/2002 | Neumayer |
| 2003/0028525 A1 | 2/2003 | Santos et al. |
| 2003/0039216 A1 | 2/2003 | Sheldon et al. |
| 2003/0084066 A1 | 5/2003 | Waterman et al. |
| 2003/0172292 A1 | 9/2003 | Judge |
| 2003/0172368 A1 | 9/2003 | Alumbaugh et al. |
| 2003/0207685 A1 | 11/2003 | Rankin |
| 2003/0212546 A1 | 11/2003 | Shaw |
| 2003/0225763 A1 | 12/2003 | Guilak et al. |
| 2003/0226035 A1 | 12/2003 | Robert et al. |
| 2004/0034659 A1 | 2/2004 | Steger |
| 2004/0044482 A1 | 3/2004 | Takeda et al. |
| 2004/0048232 A1 | 3/2004 | Murphy et al. |
| 2004/0083389 A1 | 4/2004 | Yoshida |
| 2004/0177271 A1 | 9/2004 | Arnold et al. |
| 2004/0199445 A1 | 10/2004 | Eder |
| 2004/0199491 A1 | 10/2004 | Bhatt |
| 2004/0205661 A1 | 10/2004 | Gallemore |
| 2005/0044187 A1 | 2/2005 | Jhaveri et al. |
| 2005/0060295 A1 | 3/2005 | Gould et al. |
| 2005/0065805 A1 | 3/2005 | Moharram |
| 2005/0076095 A1 | 4/2005 | Mathew et al. |
| 2005/0080720 A1 | 4/2005 | Betz et al. |
| 2005/0091184 A1 | 4/2005 | Seshadri et al. |
| 2005/0097320 A1 | 5/2005 | Golan et al. |
| 2005/0108030 A1 | 5/2005 | Kim |
| 2005/0226495 A1 | 10/2005 | Li |
| 2005/0240754 A1 | 10/2005 | Auterinen |
| 2005/0251675 A1 | 11/2005 | Marcjan et al. |
| 2005/0262061 A1 | 11/2005 | Moritsu et al. |
| 2006/0013456 A1 | 1/2006 | Soykan |
| 2006/0019397 A1 | 1/2006 | Soykan |
| 2006/0031465 A1 | 2/2006 | Ahya et al. |
| 2006/0069686 A1 | 3/2006 | Beyda et al. |
| 2006/0090202 A1 | 4/2006 | Liu et al. |
| 2006/0104299 A1 | 5/2006 | Vazquez Castro et al. |
| 2006/0117388 A1 | 6/2006 | Nelson et al. |
| 2006/0149652 A1 | 7/2006 | Fellenstein et al. |
| 2006/0149714 A1 | 7/2006 | Fellenstein et al. |
| 2006/0167696 A1 | 7/2006 | Chaar et al. |
| 2006/0176824 A1 | 8/2006 | Laver et al. |
| 2006/0178910 A1 | 8/2006 | Eisenberger et al. |
| 2006/0218110 A1 | 9/2006 | Simske et al. |
| 2006/0218134 A1 | 9/2006 | Simske et al. |
| 2006/0224994 A1 | 10/2006 | Cheemalapati et al. |

(56) References Cited

U.S. PATENT DOCUMENTS

| | | |
|---|---|---|
| 2006/0248094 A1 | 11/2006 | Andrews et al. |
| 2006/0259333 A1 | 11/2006 | Pyburn et al. |
| 2007/0014537 A1 | 1/2007 | Wesemann et al. |
| 2007/0050854 A1 | 3/2007 | Cooperstein et al. |
| 2007/0071208 A1 | 3/2007 | Morris |
| 2007/0100712 A1 | 5/2007 | Kilpatrick et al. |
| 2007/0100812 A1 | 5/2007 | Simske et al. |
| 2007/0143851 A1 | 6/2007 | Nicodemus et al. |
| 2007/0180509 A1 | 8/2007 | Swartz et al. |
| 2007/0198330 A1 | 8/2007 | Korenblit et al. |
| 2007/0219964 A1 | 9/2007 | Cannon et al. |
| 2007/0238085 A1 | 10/2007 | Colvin et al. |
| 2007/0244690 A1 | 10/2007 | Peters |
| 2007/0282908 A1 | 12/2007 | Van der Meulen et al. |
| 2008/0022370 A1 | 1/2008 | Beedubail et al. |
| 2008/0026768 A1 | 1/2008 | Fok et al. |
| 2008/0028453 A1 | 1/2008 | Nguyen et al. |
| 2008/0037763 A1 | 2/2008 | Shaffer et al. |
| 2008/0052217 A1 | 2/2008 | Etkin |
| 2008/0063173 A1 | 3/2008 | Sarkar et al. |
| 2008/0083021 A1 | 4/2008 | Doane et al. |
| 2008/0184366 A1 | 7/2008 | Alperovitch et al. |
| 2008/0208475 A1 | 8/2008 | Karr et al. |
| 2008/0222111 A1 | 9/2008 | Hoang et al. |
| 2008/0225870 A1 | 9/2008 | Sundstrom |
| 2008/0250054 A1 | 10/2008 | Nickel |
| 2008/0254774 A1 | 10/2008 | Lee |
| 2009/0006982 A1 | 1/2009 | Curtis et al. |
| 2009/0019065 A1 | 1/2009 | Sapounas |
| 2009/0086252 A1 | 4/2009 | Zucker et al. |
| 2009/0106836 A1 | 4/2009 | Toshima et al. |
| 2009/0164289 A1 | 6/2009 | Minnich, Jr. et al. |
| 2009/0164556 A1 | 6/2009 | Siegel et al. |
| 2009/0177529 A1 | 7/2009 | Hadi |
| 2009/0182820 A1 | 7/2009 | Hamilton, II et al. |
| 2009/0192853 A1 | 7/2009 | Drake et al. |
| 2009/0254572 A1 | 10/2009 | Redlich et al. |
| 2009/0254971 A1 | 10/2009 | Herz et al. |
| 2009/0258636 A1 | 10/2009 | Helvick |
| 2009/0265655 A1 | 10/2009 | Fiedler |
| 2009/0276346 A1 | 11/2009 | Rukonic et al. |
| 2009/0276720 A1 | 11/2009 | Hutheesing |
| 2009/0279346 A1 | 11/2009 | Manohar et al. |
| 2009/0292548 A1 | 11/2009 | Van Court |
| 2009/0292649 A1 | 11/2009 | Somech et al. |
| 2010/0011000 A1 | 1/2010 | Chakra et al. |
| 2010/0036779 A1 | 2/2010 | Sadeh-Koniecpol et al. |
| 2010/0042448 A1 | 2/2010 | Bess |
| 2010/0066822 A1 | 3/2010 | Steinberg et al. |
| 2010/0070448 A1 | 3/2010 | Omoigui |
| 2010/0070461 A1 | 3/2010 | Vella et al. |
| 2010/0111276 A1 | 5/2010 | Hartley et al. |
| 2010/0118114 A1 | 5/2010 | Hosseini et al. |
| 2010/0125664 A1 | 5/2010 | Hadar et al. |
| 2010/0125911 A1 | 5/2010 | Bhaskaran |
| 2010/0131356 A1 | 5/2010 | Stevens et al. |
| 2010/0132041 A1 | 5/2010 | Chu et al. |
| 2010/0162347 A1 | 6/2010 | Barile |
| 2010/0174813 A1 | 7/2010 | Hildreth et al. |
| 2010/0199287 A1 | 8/2010 | Boda et al. |
| 2010/0235915 A1 | 9/2010 | Memon et al. |
| 2010/0250498 A1 | 9/2010 | Andersen et al. |
| 2010/0273447 A1 | 10/2010 | Mann et al. |
| 2010/0284290 A1 | 11/2010 | Williams |
| 2010/0293543 A1 | 11/2010 | Erhart et al. |
| 2010/0306850 A1 | 12/2010 | Barile et al. |
| 2011/0016534 A1 | 1/2011 | Jakobsson et al. |
| 2011/0029974 A1 | 2/2011 | Broyles et al. |
| 2011/0055923 A1 | 3/2011 | Thomas |
| 2011/0066468 A1* | 3/2011 | Huang .............. G01C 21/3438 705/7.19 |
| 2011/0077950 A1 | 3/2011 | Hughston |
| 2011/0093293 A1 | 4/2011 | G. N. et al. |
| 2011/0106797 A1 | 5/2011 | Palakodety et al. |
| 2011/0119730 A1 | 5/2011 | Eldar et al. |
| 2011/0125898 A1 | 5/2011 | Hassan et al. |
| 2011/0208630 A1 | 8/2011 | Hazzani |
| 2011/0209159 A1 | 8/2011 | Baratz et al. |
| 2011/0213785 A1 | 9/2011 | Kristiansson et al. |
| 2011/0213788 A1 | 9/2011 | Zhao et al. |
| 2011/0225650 A1 | 9/2011 | Margolies et al. |
| 2011/0238430 A1 | 9/2011 | Sikorski |
| 2011/0239309 A1 | 9/2011 | Yanoo |
| 2011/0270834 A1 | 11/2011 | Sokolan et al. |
| 2011/0296354 A1 | 12/2011 | Zambetti et al. |
| 2011/0314558 A1 | 12/2011 | Song et al. |
| 2011/0320394 A1 | 12/2011 | McKeown et al. |
| 2011/0321117 A1 | 12/2011 | Nestler et al. |
| 2012/0041929 A1 | 2/2012 | Kapoor |
| 2012/0047439 A1 | 2/2012 | Harlan et al. |
| 2012/0084366 A1 | 4/2012 | Killoran, Jr. et al. |
| 2012/0101870 A1 | 4/2012 | Gates et al. |
| 2012/0109802 A1 | 5/2012 | Griffin et al. |
| 2012/0110092 A1 | 5/2012 | Keohane et al. |
| 2012/0130809 A1 | 5/2012 | Tedjamulia et al. |
| 2012/0137061 A1 | 5/2012 | Yang et al. |
| 2012/0137340 A1 | 5/2012 | Jakobsson et al. |
| 2012/0150581 A1 | 6/2012 | McPhail |
| 2012/0150773 A1 | 6/2012 | DiCorpo et al. |
| 2012/0151551 A1 | 6/2012 | Readshaw et al. |
| 2012/0158846 A1 | 6/2012 | Linder |
| 2012/0166442 A1 | 6/2012 | Furuichi et al. |
| 2012/0167170 A1 | 6/2012 | Shi et al. |
| 2012/0180120 A1 | 7/2012 | Jain |
| 2012/0191777 A1 | 7/2012 | Iwasaki et al. |
| 2012/0203536 A1 | 8/2012 | Gangemi et al. |
| 2012/0203733 A1 | 8/2012 | Zhang |
| 2012/0204260 A1 | 8/2012 | Cecil et al. |
| 2012/0215491 A1 | 8/2012 | Theriot et al. |
| 2012/0240183 A1 | 9/2012 | Sinha |
| 2012/0272156 A1 | 10/2012 | Kerger et al. |
| 2012/0290666 A1 | 11/2012 | Fabre et al. |
| 2012/0291087 A1 | 11/2012 | Agrawal |
| 2012/0311696 A1 | 12/2012 | Datsenko et al. |
| 2012/0324008 A1 | 12/2012 | Werz, III et al. |
| 2013/0042327 A1 | 2/2013 | Chow |
| 2013/0055337 A1 | 2/2013 | Choi et al. |
| 2013/0055342 A1 | 2/2013 | Choi et al. |
| 2013/0057696 A1 | 3/2013 | Felt et al. |
| 2013/0067351 A1 | 3/2013 | Yokoi et al. |
| 2013/0086684 A1 | 4/2013 | Mohler |
| 2013/0097304 A1 | 4/2013 | Asthana et al. |
| 2013/0097662 A1 | 4/2013 | Pearcy et al. |
| 2013/0097701 A1 | 4/2013 | Moyle et al. |
| 2013/0097709 A1 | 4/2013 | Basavapatna et al. |
| 2013/0102290 A1 | 4/2013 | Akhtar et al. |
| 2013/0117268 A1 | 5/2013 | Smith et al. |
| 2013/0130652 A1 | 5/2013 | Deasy et al. |
| 2013/0132566 A1 | 5/2013 | Olsen et al. |
| 2013/0188475 A1 | 7/2013 | Lim et al. |
| 2013/0198811 A1 | 8/2013 | Yu et al. |
| 2013/0205365 A1 | 8/2013 | Choi et al. |
| 2013/0211876 A1 | 8/2013 | Perler |
| 2013/0219043 A1 | 8/2013 | Steiner et al. |
| 2013/0227641 A1 | 8/2013 | White et al. |
| 2013/0227712 A1 | 8/2013 | Salem et al. |
| 2013/0232205 A1 | 9/2013 | Gorecha et al. |
| 2013/0247142 A1 | 9/2013 | Nishizawa et al. |
| 2013/0254831 A1 | 9/2013 | Roach et al. |
| 2013/0290067 A1 | 10/2013 | Barton |
| 2013/0291055 A1 | 10/2013 | Muppidi et al. |
| 2013/0298192 A1 | 11/2013 | Kumar et al. |
| 2013/0298230 A1 | 11/2013 | Kumar et al. |
| 2013/0298242 A1 | 11/2013 | Kumar et al. |
| 2013/0305357 A1 | 11/2013 | Ayyagari et al. |
| 2013/0339457 A1 | 12/2013 | Freire et al. |
| 2013/0347055 A1 | 12/2013 | Motoyama |
| 2014/0006244 A1 | 1/2014 | Crowley et al. |
| 2014/0007233 A1 | 1/2014 | Roesch |
| 2014/0018542 A1 | 1/2014 | Parker et al. |
| 2014/0019443 A1 | 1/2014 | Golshan |
| 2014/0020045 A1 | 1/2014 | Kabat et al. |
| 2014/0026179 A1 | 1/2014 | Devarajan et al. |
| 2014/0026182 A1 | 1/2014 | Pearl et al. |

(56) References Cited

U.S. PATENT DOCUMENTS

| | | |
|---|---|---|
| 2014/0040182 A1 | 2/2014 | Gilder et al. |
| 2014/0040414 A1 | 2/2014 | Ronchi et al. |
| 2014/0059700 A1 | 2/2014 | Kiriyama et al. |
| 2014/0068779 A1 | 3/2014 | Tan et al. |
| 2014/0074579 A1 | 3/2014 | King |
| 2014/0081643 A1 | 3/2014 | John et al. |
| 2014/0087711 A1 | 3/2014 | Geyer et al. |
| 2014/0122153 A1* | 5/2014 | Truitt ............... G06Q 10/1095 705/7.19 |
| 2014/0122834 A1 | 5/2014 | Ganguli et al. |
| 2014/0136612 A1* | 5/2014 | Redfern ............... G06Q 50/01 709/204 |
| 2014/0149888 A1 | 5/2014 | Morris |
| 2014/0155028 A1 | 6/2014 | Daniela et al. |
| 2014/0157351 A1 | 6/2014 | Canning et al. |
| 2014/0165054 A1 | 6/2014 | Wang et al. |
| 2014/0165137 A1 | 6/2014 | Balinsky et al. |
| 2014/0172662 A1 | 6/2014 | Weiss et al. |
| 2014/0186810 A1 | 7/2014 | Falash et al. |
| 2014/0187213 A1 | 7/2014 | Shuster et al. |
| 2014/0189784 A1 | 7/2014 | Marino et al. |
| 2014/0194094 A1 | 7/2014 | Ahuja et al. |
| 2014/0199663 A1 | 7/2014 | Sadeh-Koniecpol et al. |
| 2014/0199664 A1 | 7/2014 | Sadeh-Koniecpol et al. |
| 2014/0200944 A1 | 7/2014 | Henriksen et al. |
| 2014/0236737 A1 | 8/2014 | Rowe |
| 2014/0237537 A1 | 8/2014 | Manmohan et al. |
| 2014/0244363 A1 | 8/2014 | Travis et al. |
| 2014/0245394 A1 | 8/2014 | Abuelsaad et al. |
| 2014/0254469 A1 | 9/2014 | Stephens et al. |
| 2014/0258546 A1 | 9/2014 | Janssens et al. |
| 2014/0259130 A1 | 9/2014 | Li et al. |
| 2014/0282824 A1 | 9/2014 | Lango et al. |
| 2014/0289245 A1 | 9/2014 | Deshpande et al. |
| 2014/0317746 A1 | 10/2014 | Hendel et al. |
| 2014/0324517 A1 | 10/2014 | Harris |
| 2014/0344281 A1 | 11/2014 | Rao et al. |
| 2014/0355749 A1 | 12/2014 | Conway et al. |
| 2014/0372162 A1* | 12/2014 | Dhara ............... G06Q 10/1095 705/7.19 |
| 2014/0380475 A1 | 12/2014 | Canning et al. |
| 2015/0010895 A1 | 1/2015 | Hastings et al. |
| 2015/0033305 A1 | 1/2015 | Shear et al. |
| 2015/0039565 A1 | 2/2015 | Lucas |
| 2015/0066547 A1* | 3/2015 | Cronin ............... G06Q 10/109 705/5 |
| 2015/0074579 A1 | 3/2015 | Gladstone et al. |
| 2015/0081701 A1 | 3/2015 | Lerios et al. |
| 2015/0082432 A1 | 3/2015 | Eaton et al. |
| 2015/0089613 A1 | 3/2015 | Tippett et al. |
| 2015/0111607 A1 | 4/2015 | Baldwin |
| 2015/0120596 A1* | 4/2015 | Fadell ............... G08B 27/003 705/330 |
| 2015/0120763 A1 | 4/2015 | Grue et al. |
| 2015/0135263 A1 | 5/2015 | Singla et al. |
| 2015/0143494 A1 | 5/2015 | Lee et al. |
| 2015/0148014 A1 | 5/2015 | Gupta et al. |
| 2015/0163121 A1 | 6/2015 | Mahaffey et al. |
| 2015/0199318 A1 | 7/2015 | Lemonik et al. |
| 2015/0205595 A1 | 7/2015 | Dudai |
| 2015/0205954 A1 | 7/2015 | Jou et al. |
| 2015/0212873 A1 | 7/2015 | Filho et al. |
| 2015/0215329 A1 | 7/2015 | Singla et al. |
| 2015/0215337 A1 | 7/2015 | Warren |
| 2015/0269386 A1 | 9/2015 | Khetawat et al. |
| 2015/0294275 A1* | 10/2015 | Richardson ............... G06T 19/00 705/7.18 |
| 2015/0302352 A1 | 10/2015 | Le Chevalier et al. |
| 2015/0304120 A1 | 10/2015 | Xiao et al. |
| 2015/0312356 A1 | 10/2015 | Roth et al. |
| 2015/0339477 A1 | 11/2015 | Abrams et al. |
| 2015/0356516 A1* | 12/2015 | Kagan ............... G06Q 10/1095 705/7.19 |
| 2015/0363600 A1 | 12/2015 | Jin |
| 2015/0379453 A1 | 12/2015 | Myers |
| 2016/0007083 A1 | 1/2016 | Gurha |
| 2016/0073148 A1 | 3/2016 | Winograd et al. |
| 2016/0092561 A1 | 3/2016 | Liu et al. |
| 2016/0098687 A1* | 4/2016 | Lamons ............... G06Q 10/1095 705/7.19 |
| 2016/0105359 A1 | 4/2016 | Kim et al. |
| 2016/0173292 A1 | 6/2016 | McCoy et al. |
| 2016/0285752 A1 | 9/2016 | Joshi |
| 2017/0024705 A1* | 1/2017 | Richardson ............... G06T 19/00 |
| 2017/0034023 A1 | 2/2017 | Nickolov et al. |
| 2017/0150399 A1 | 5/2017 | Kedalagudde et al. |
| 2017/0220972 A1* | 8/2017 | Conway ............... G06Q 10/06315 705/7.25 |
| 2018/0165554 A1 | 6/2018 | Zhang et al. |

FOREIGN PATENT DOCUMENTS

| | | |
|---|---|---|
| WO | WO-2013180707 A1 | 12/2013 |
| WO | WO-2014021871 A1 | 2/2014 |
| WO | WO-2014080239 A1 | 5/2014 |

OTHER PUBLICATIONS

U.S. Appl. No. 14/683,513, Brisebois et al.
U.S. Appl. No. 14/683,465, Brisebois et al.
U.S. Appl. No. 14/683,462, Brisebois et al.
U.S. Appl. No. 14/683,453, Brisebois et al.
Pujol, Josep M., et al.; "Extracting Reputation in Multi Agent Systems by Means of Social Network Topology"; AAMAS; Jul. 15-19, 2002; pp. 467-474.
Wikimedia Foundation, Inc.; "Microsoft Visual SourceSafe"; http://en.wikipedia.org/wiki/Microsoft_Visual_SourceSafe; last modified on Feb. 2, 2015; 6 pages.
Wikimedia Foundation, Inc.; "TinEye"; http://en.wikipedia.org/wiki/TinEye; last modified on Jan. 26, 2015;4 pages.
Microsoft; "Information Rights Management"; https://technet.microsoft.com/en-us/library/dd638140(v=exchg.150).aspx; Nov. 1, 2013; 7 pages.
Microsoft; "Document Fingerprinting"; https://technet.microsoft.com/en-us/library/dn635176(v=exchg.150).aspx; Sep. 11, 2014; 3 pages.
Wikimedia Foundation, Inc.; "Plagiarism Detection"; http://en.wikipedia.org/wiki/Plagiarism_detection; last modified on Mar. 19, 2015; 11 pages.
U.S. Appl. No. 14/819,233, Brisebois et al.
Campbell, Christopher S., et al.; "Expertise Identification using Email Communications"; ACM; Nov. 3, 2003; pp. 528-531.
Balog, Krisztian, et al.; "Finding Experts and their Details in E-mail Corpora"; ACM; May 23, 2006; pp. 1035-1036.
Proofpoint, Inc.; "Proofpoint Introduces Its Next-Generation Email Security and Privacy Platform with Enhanced Email Encryption, Available for SaaS and Appliance Deployment"; http://investors.proofpoint.com/releasedetail.cfm?releaseid=664064; Oct. 5, 2009; 5 pages.
U.S. Appl. No. 14/875,120, Brisebois et al.
Microsoft; "Network Planning, Monitoring, and Troubleshooting with Lync Server"; http://www.microsoft.com/en-ca/download/details.aspx?id=39084; Jun. 10, 2015; 2 pages.
Microsoft; "Quality of Experience (QoE) database schema in Lync Server 2013"; https://technet.microsoft.com/en-us/library/gg398687.aspx; Oct. 3, 2012; 1 page.
Microsoft; "List of QoE tables in Lync Server 2013"; https://technet.microsoft.com/en-us/library/gg398236.aspx; Oct. 2, 2012; 3 pages.
Microsoft; "AppliedBandwidthSource table in Lync Server 2013"; https://technet.microsoft.com/en-us/library/gg425725.aspx; Oct. 2, 2012; 1 page.
Microsoft; "AppSharingMetricsThreshold table in Lync Server 2013"; https://technet.microsoft.com/en-us/library/jj205018.aspx; Oct. 2, 2012; 2 pages.
Microsoft; "AppSharingStream table in Lync Server 2013"; https://technet.microsoft.com/en-us/library/jj204808.aspx; Feb. 21, 2014; 5 pages.

(56) References Cited

OTHER PUBLICATIONS

Microsoft; "AudioClientEvent table in Lync Server 2013"; https://technet.microsoft.com/en-us/library/gg413086.aspx; Oct. 17, 2012; 2 pages.
Microsoft; "AudioSignal table in Lync Server 2013"; https://technet.microsoft.com/en-us/library/gg398064.aspx; Nov. 12, 2013; 3 pages.
Microsoft; "AudioStream table in Lync Server 2013"; https://technet.microsoft.com/en-us/library/gg425961.aspx; Oct. 2, 2012; 4 pages.
Microsoft; "CodecDescription table in Lync Server 2013"; https://technet.microsoft.com/en-us/library/jj204797.aspx; Oct. 17, 2012; 1 page.
Microsoft; "Conference table in Lync Server 2013"; https://technet.microsoft.com/en-us/library/gg425762.aspx; Oct. 2, 2012; 1 page.
Microsoft; "Device table in Lync Server 2013"; https://technet.microsoft.com/en-us/library/gg398930.aspx; Oct. 2, 2012; 1 page.
Microsoft; "DeviceDriver table in Lync Server 2013"; https://technet.microsoft.com/en-us/library/gg398844.aspx; Oct. 2, 2012; 1 page.
Microsoft; "Dialog table in Lync Server 2013"; https://technet.microsoft.com/en-us/library/gg398313.aspx; Oct. 2, 2012; 1 page.
Microsoft; "Endpoint table in Lync Server 2013"; https://technet.microsoft.com/en-us/library/gg398327.aspx; Oct. 2, 2012; 1 page.
Microsoft; "EndpointSubnet table in Lync Server 2013"; https://technet.microsoft.com/en-us/library/gg398933.aspx; Oct. 2, 2012; 1 page.
Microsoft; "IP Address table in Lync Server 2013"; https://technet.microsoft.com/en-us/library/jj205077.aspx; Oct. 17, 2012; 1 page.
Microsoft; "MacAddress table in Lync Server 2013"; https://technet.microsoft.com/en-us/library/gg412761.aspx; Oct. 2, 2012; 1 page.
Microsoft; "MediaLine table in Lync Server 2013"; https://technet.microsoft.com/en-us/library/gg425920.aspx; Feb. 21, 2014; 3 pages.
Microsoft; "MonitoredRegionLink table in Lync Server 2013"; https://technet.microsoft.com/en-us/library/gg398874.aspx; Oct. 2, 2012; 1 page.
Microsoft; "MonitoredUserSiteLink table"; https://technet.microsoft.com/en-us/library/gg398233.aspx; Oct. 2, 2012; 1 page.
Microsoft; "NetworkConnectionDetail table in Lync Server 2013"; https://technet.microsoft.com/en-us/library/jj205185.aspx; Oct. 2, 2012; 1 page.
Microsoft; "PayloadDescription table in Lync Server 2013"; https://technet.microsoft.com/en-us/library/gg412971.aspx; Oct. 2, 2012; 1 page.
Microsoft; "PurgeSettings table (QoE) in Lync Server 2013"; https://technet.microsoft.com/en-us/library/jj204788.aspx; Oct. 2, 2012; 1 page.
Microsoft; "Region table in Lync Server 2013"; https://technet.microsoft.com/en-us/library/gg398235.aspx; Nov. 9, 2010; 1 page.
Microsoft; "Server table in Lync Server 2013"; https://technet.microsoft.com/en-us/library/gg398801.aspx; Oct. 2, 2012; 1 page.
Microsoft; "Session table in Lync Server 2013"; https://technet.microsoft.com/en-us/library/gg398635.aspx; Sep. 9, 2013; 2 pages.
Microsoft; "SessionCorrelation table in Lync Server 2013"; https://technet.microsoft.com/en-us/library/gg398091.aspx; Oct. 2, 2012; 1 page.
Microsoft; "Subnet table in Lync Server 2013"; https://technet.microsoft.com/en-us/library/gg398582.aspx; Oct. 2, 2012; 1 page.
Microsoft; "TraceRoute table in Lync Server 2013"; https://technet.microsoft.com/en-us/library/jj205205.aspx; Feb. 21, 2014; 1 page.
Microsoft; "User table in Lync Server 2013"; https://technet.microsoft.com/en-us/library/gg398505.aspx; Oct. 2, 2012; 1 page.
Microsoft; "UserAgent table in Lync Server 2013"; https://technet.microsoft.com/en-us/library/gg398939.aspx; May 25, 2012; 1 page.
Microsoft; "UserAgentDef table (QoE) in Lync Server 2013"; https://technet.microsoft.com/en-us/library/jj205259.aspx; Mar. 25, 2014; 2 pages.
Microsoft; "UserSite table in Lync Server 2013"; https://technet.microsoft.com/en-us/library/gg398256.aspx; Nov. 9, 2010; 1 page.
Microsoft; "VideoClientEvent table in Lync Server 2013"; https://technet.microsoft.com/en-us/library/gg399039.aspx; Oct. 2, 2012; 1 page.
Microsoft; "VideoMetricsThreshold table in Lync Server 2013"; https://technet.microsoft.com/en-us/library/jj204778.aspx; Oct. 2, 2012; 1 page.
Microsoft; "VideoStream table in Lync Server 2013"; https://technet.microsoft.com/en-us/library/gg425928.aspx; Dec. 13, 2013; 4 pages.
Microsoft; "QoE view details in Lync Server 2013"; https://technet.microsoft.com/en-us/library/jj688081.aspx; Oct. 3, 2012; 1 page.
Microsoft; "Sample QoE database queries in Lync Server 2013"; https://technet.microsoft.com/en-us/library/gg398100.aspx; Oct. 17, 2012; 1 page.
U.S. Appl. No. 14/929,460, Le Rudulier et al.
U.S. Appl. No. 15/010,960, Le Rudulier et al.
U.S. Appl. No. 15/080,755, Brisebois et al.
U.S. Appl. No. 15/081,104, Brisebois et al.
Kim, Yoohwan, et al.; "Anomaly Detection in Multiple Scale for Insider Threat Analysis"; CSIIRW'11, Oak Ridge, Tennessee; Oct. 2011; 4 pages.
Boudaoud, K., et al.; "Network Security Management with Intelligent Agents"; IEEE, Session Fourteen, Security Management (I); Apr. 2000; pp. 579-592.
U.S. Appl. No. 14/674,270, Brisebois et al.
U.S. Appl. No. 14/672,715, Brisebois et al.
Paradiso Solutions; "Paradiso LMS Social Learning: What is Social Learning?"; https:www.paradisosolutions.com/social-learning-lms; Mar. 18, 2015; 5 pages.
Mcintosh, Don; "List of Corporate Learning Management Systems"; elearningindustry.com/list-corporate-learning-management-systems; Oct. 3, 2014; 157 pages.
Talbot, Chris; "Level Platforms Adds Managed Print Service Features to Managed Workplace 2011"; http://www.channelinsider.com/c/a/Managed-Services-Level-Platform-Adds-Managed-Pri . . . ; Nov. 30, 2011; 4 pages.
Messmer, Ellen; "Do we Need Data-Loss Prevention for Printers and Copiers? Canon USA Explains Why it Designed a DLP Product Specifically for its Multi-Function Peripherals"; Network World; Dec. 13, 2011; 4 pages.
Intermedia, Inc.; "How to Configure your Printer, Scanner, Copier, Web Script or SMTP Application to Work with an Exchange Account"; https://hosting.intermedia.net/support/kb/viewKBArticle.asp?id=2167; 2013; 3 pages.
U.S. Appl. No. 13/906,241, Brisebois.
U.S. Appl. No. 13/906,246, Brisebois.
U.S. Appl. No. 13/906,255, Brisebois.
U.S. Appl. No. 14/047,162, Brisebois et al.
U.S. Appl. No. 14/089,427, Brisebois et al.
U.S. Appl. No. 14/265,973, Brisebois et al.
U.S. Appl. No. 14/297,944, Brisebois et al.
U.S. Appl. No. 14/298,095, Brisebois et al.
U.S. Appl. No. 14/335,205, Brisebois et al.
U.S. Appl. No. 14/631,826, Brisebois et al.
Lagorio-Chafkin, Christine; "35 under 35: When I Work: A Company that Incubated Itself"; www.inc.com; Jun. 24, 2014; 4 pages.
Microsoft, "Manage Dynamic Distribution Groups", Oct. 15, 2012, 2 pages.
Rubin, Courtney, "Study: Employees Are Unproductive Half the Day", Mar. 2, 2011, 4 pages.
Natural Resources Management and Environment Department, "Land Cover Classification System", May 17, 2012, 4 pages.
Humanext, "Communicating to inform and engage people at work", May 25, 2012, 5 pages.
Lumincreative, "Lumin Synergy: Powerful Corporate Collaboration Software", http://www.lumincreative.com, Oct. 2013, 10 pages.
Syntegrity Group, "THINKahead", Mar. 2013, 16 pages.
Abdi, Nerve, et al., "Principal Component Analysis", Jun. 30, 2010, 47 pages.
SharePoint, "Find the right people", http://discoversharepoint.com/people, Jun. 27, 2013, 13 pages.
Bennett, Madeline, "Endorsement feature degrades Linkedin as a professional network", the Inquirer, Oct. 19, 2012, 3 pages.
Breger, David, "Introducing Endorsements: Give Kudos with Just One Click", Linkedin Blog, Sep. 24, 2012, 3 pages.
Microsoft, "How DLP Rules are Applied to Evaluate Messages", Sep. 18, 2013, 5 pages.

(56) References Cited

OTHER PUBLICATIONS

Microsoft, "Define Your Own DLP Templates and Information Types", Sep. 30, 2013, 4 pages.
Microsoft, "Policy Templates from Microsoft Partners", Jan. 31, 2013, 1 page.
Microsoft, "DLP Policy Templates Supplied in Exchange", Feb. 4, 2013, 8 pages.
Microsoft, "DLP Policy Templates", Oct. 4, 2012, 4 pages.
Microsoft, "Data Loss Prevention", Mar. 21, 2013, 6 pages.
Pocsi, Gyorgy, "Find a free Meeting Room," http://android.metricscat.com, 2013, 8 pages.
Ragan, Steve, "5 More Post-Holiday BYOD Strategies and Considerations," www.csoonline.com, Jan. 2, 2014, 5 pages.
Duncan, Stacy, "Wendy's Franchisee Safeguards against Data Breaches with Intelligent Firewalls," http://m.hospitalitytechnology.edgl.com, Dec. 12, 2013, 4 pages.
Rubens, Paul, "Cybercrime Shopping List Study Points to Falling Prices," www.bbc.com/news/technology, Dec. 16, 2013, 3 pages.
Kaneshige, Tom, "BYOD Lawsuits Loom as Work Gets Personal," www.cio.com, Apr. 22, 2013, 3 pages.
Kaneshige, Tom, "BYOD Became the 'New Normal' in 2013," www.cio.com, Dec. 19, 2013, 3 pages.
Kaneshige, Tom, "The BYOD Troubleshoot: Security and Cost-Savings," www.cio.com, Mar. 30, 2012, 3 pages.
Eckersley, Peter, "How Unique is Your Web Browser?", Electronic Frontier Foundation, 2010, 19 pages.
Adamedes, Karen, "5 Truths about Performance Reviews. Are You Ready for Yours?", www.careerchickchat.com, Jan. 5, 2013, 8 pages.
Mosley, Eric, "Crowdsource Your Performance Reviews," HBR Blog Network, Jun. 15, 2012, 2 pages.
Monahan, Tom, "Big Idea 2014: The Couch-Potato-ification of Talent Measurement," Dec. 10, 2013, 7 pages.
SIGNiX; "Know Your Signer"; http://www.signix.com/how-it-works/digital-signature-identity-authentication; Aug. 10, 2014; 4 pages.
Brenner, "Mining the bit pipes: Discovering and leveraging users' behavior", IEEE, 2009, 6 pages (Year: 2009).

\* cited by examiner

Business Communications

Partner
My sent and received messages
0
Last 30 Days

Partner
My staffs sent and received messages
0
Last 30 Days

Customer
My sent and received messages
18
Last 30 Days

Customer
My staffs sent and received messages
82
Last 30 Days

Competitor
My sent and received messages
5
Last 30 Days

Competitor
My staffs sent and received messages
13
Last 30 Days

General Communications

Internal
My sent and received messages
95
Last 30 Days

Internal
My staffs sent and received messages
308
Last 30 Days

External
My sent and received messages
31
Last 30 Days

External
My staffs sent and received messages
148
Last 30 Days

Personal
My sent and received messages
6
Last 30 Days

Personal
My staffs sent and received messages
44
Last 30 Days

Social Networking
My received messages
2
Last 30 Days

Social Networking
My staffs received messages
9
Last 30 Days

Governance

Encrypted
My sent and received messages
0
Last 30 Days

Encrypted
My staffs sent and received messages
0
Last 30 Days

Large Attachme...
My sent and received messages
2
Last 30 Days

Large Attachme...
My staffs sent and received messages
11
Last 30 Days

FIG. 9

Scope: Me ▽

Me — Message — Participant

Direction: Sent or Received
Sent Date: Last 30 Days

Add Search Parameters for Insight

| | | |
|---|---|---|
| Name | Subject | Name |
| Department | Total Size | Message Address |
| Office | Message Type | Department |
| Job Title | Has External Recipients | Office |
| Manager - Name | Sent Time of Day | Mailbox Type |
| Was External | File Attachment - Extension | Was External |
| Was Addressed In To | File Attachment - File Name | Domain - Name |
| Was Addressed in Bcc | File Attachment - Last Modified Date | Domain - Classification |
| Was Addressed in Cc | File Attachment - Size | Direct Reports - Name |
| Delivery Time | Was Encrypted | Manager - Name |
| Response Time | Importance | Was Addressed In To |
| Received Time of Day | Sensitivity | Was Addressed In Bcc |
| Was Received After Hours | Original Message Id | Was Addressed In Cc |
| Was Sent After Hours | | Receipt Date |
| Was AD Account Enabled | | Delivery Time |
| | | Response Time |
| | | Received Time of Day |
| | | Was Received After Hours |

[Apply] [Cancel]

FIG. 10

SYSTEMS AND METHODS OF PATTERNIZING LOGGED USER-INITIATED EVENTS FOR SCHEDULING FUNCTIONS

BACKGROUND

Technical Field

The present disclosure relates generally to analysis of computing events and more particularly, but not by way of limitation, to systems and methods of patternizing logged user-initiated events for scheduling functions.

History of Related Art

Meetings, whether in-person, remote, or a mix thereof, can be vital to organizations. Significant portions of operational budgets are allocated to providing physical meeting space and teleconferencing equipment. In general, existing systems schedule meetings at times that avoid direct conflicts with other appointments. Scheduling meetings at times and locations that are convenient or optimal (as opposed to merely possible) is difficult.

Moreover, as the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

SUMMARY OF THE INVENTION

In one embodiment, a method is performed by a computer system. The method includes selecting a set of logged user-initiated events of a user that were previously executed on a computing platform. The method further includes determining timing information, device-identification information, and user-location information for the set of logged user-initiated events on a per-event basis. In addition, the method includes correlating the set of logged user-initiated events to recurring time intervals of a time map on a per-event basis. Also, the method includes determining an overall density, a location-specific density, and a device-specific density of the set of logged user-initiated events for at least some recurring time intervals of the time map. The determining of the location-specific density is based, at least in part, on the user-location information. The determining of the device-specific density is based, at least in part, on the device-identification information. Furthermore, the method includes generating a time-based activity pattern of the user, the time-based activity pattern comprising, for the at least some recurring time intervals of the time map, information related to the overall density, the location-specific density, and the device-specific density. In addition, the method includes publishing the time-based activity pattern to a scheduling interface.

In one embodiment, an information handling system includes at least one processor. The at least one processor is operable to implement a method. The method includes selecting a set of logged user-initiated events of a user that were previously executed on a computing platform. The method further includes determining timing information, device-identification information, and user-location information for the set of logged user-initiated events on a per-event basis. In addition, the method includes correlating the set of logged user-initiated events to recurring time intervals of a time map on a per-event basis. Also, the method includes determining an overall density, a location-specific density, and a device-specific density of the set of logged user-initiated events for at least some recurring time intervals of the time map. The determining of the location-specific density is based, at least in part, on the user-location information. The determining of the device-specific density is based, at least in part, on the device-identification information. Furthermore, the method includes generating a time-based activity pattern of the user, the time-based activity pattern comprising, for the at least some recurring time intervals of the time map, information related to the overall density, the location-specific density, and the device-specific density. In addition, the method includes publishing the time-based activity pattern to a scheduling interface.

In one embodiment, a computer-program product includes a non-transitory computer-usable medium having computer-readable program code embodied therein. The computer-readable program code is adapted to be executed to implement a method. The method includes selecting a set of logged user-initiated events of a user that were previously executed on a computing platform. The method further includes determining timing information, device-identification information, and user-location information for the set of logged user-initiated events on a per-event basis. In addition, the method includes correlating the set of logged user-initiated events to recurring time intervals of a time map on a per-event basis. Also, the method includes determining an overall density, a location-specific density, and a device-specific density of the set of logged user-initiated events for at least some recurring time intervals of the time map. The determining of the location-specific density is based, at least in part, on the user-location information. The determining of the device-specific density is based, at least in part, on the device-identification information. Furthermore, the method includes generating a time-based activity pattern of the user, the time-based activity pattern comprising, for the at least some recurring time intervals of the time map, information related to the overall density, the location-specific density, and the device-specific density. In addition, the method includes publishing the time-based activity pattern to a scheduling interface.

BRIEF DESCRIPTION OF THE DRAWINGS

A more complete understanding of the method and apparatus of the present invention may be obtained by reference to the following Detailed Description when taken in conjunction with the accompanying Drawings wherein:

FIG. 9 illustrates an example of a user interface.

FIG. 10 illustrates an example of a user interface.

DETAILED DESCRIPTION OF ILLUSTRATIVE EMBODIMENTS OF THE INVENTION

This disclosure describes several non-limiting examples of processes for collecting information or data from multiple sources and analyzing the information to classify the data and to extract or determine additional information based on the collected data. The data sources can be internal to the business and/or external to the business. For example, the data sources can include sales databases, business or internal email systems, non-business or external email systems, social networking accounts, inventory databases, file directories, enterprise systems, customer relationship management (CRM) systems, organizational directories, collaboration systems (e.g., SharePoint™ servers), etc.

As used herein, the term "business," in addition to having its ordinary meaning, is intended to include any type of organization or entity. For example, a business can include a charitable organization, a governmental organization, an educational institution, or any other entity that may have one or more sources of data to analyze. Further, the user of any of the above terms may be used interchangeably unless explicitly used otherwise or unless the context makes clear otherwise. In addition, as used herein, the term "data" generally refers to electronic data or any type of data that can be accessed by a computing system.

I. Systems and Methods for Collecting, Classifying, and Querying Data

Example of a Networked Computing Environment

Figure 1:
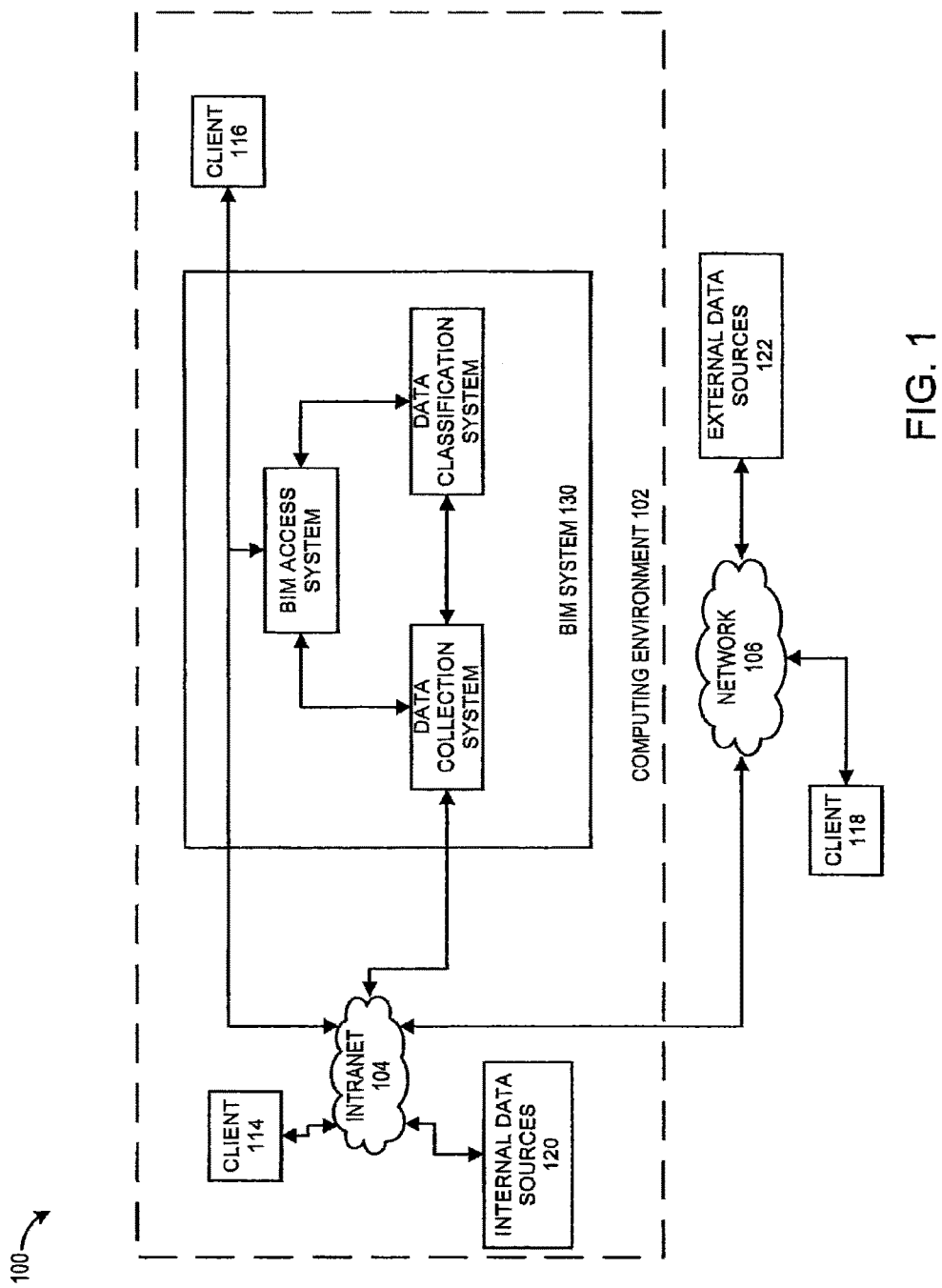
FIG. 1 illustrates an embodiment of a networked computing environment.

FIG. 1 illustrates an embodiment of a networked computing environment 100. The networked computing environment 100 can include a computing environment 102 that is associated with a business or organization. The computing environment 102 may vary based on the type of organization or business. However, generally, the computing environment 102 may include at least a number of computing systems. For example, the computing environment may include clients, servers, databases, mobile computing devices (e.g., tablets, laptops, smartphones, etc.), virtual computing devices, shared computing devices, networked computing devices, and the like. Further, the computing environment 102 may include one or more networks, such as intranet 104.

The computing environment 102 includes a Business Insights on Messaging (BIM) system 130. Using the BIM system 130, a user can examine the data available to a business regardless of where the data was generated or is stored. Further, in some embodiments, the user can use the BIM system 130 to identify trends and/or metadata associated with the data available to the BIM system 130. In certain embodiments, the BIM system 130 can access the data from internal data sources 120, external data sources 122, or a combination of the two. The data that can be accessed from the internal data sources 120 can include any data that is stored within the computing environment 102 or is accessed by a computing system that is associated with the computing environment 102. For example, the data may include information stored in employee created files, log files, archived files, internal emails, outgoing emails, received emails, received files, data downloaded from an external network or the Internet, not-yet-transmitted emails in a drafts folder, etc. The type of data is not limited and may depend on the organization or business associated with the computing environment 102. For example, the data can include sales numbers, contact information, vendor costs, product designs, meeting minutes, the identity of file creators, the identity of file owners, the identity of users who have accessed a file or are authorized to access a file, etc.

The data that can be accessed from the external data sources 122 can include any data that is stored outside of the computing environment 102 and is publicly accessible or otherwise accessible to the BIM system 130. For example, the data can include data from social networking sites, customer sites, Internet sites, or any other data source that is publicly accessible or which the BIM system 130 has been granted access. In some cases, a subset of the data may be unavailable to the BIM system 130. For example, portions of the computing environment 102 may be configured for private use.

The internal data sources 120 can include any type of computing system that is part of or associated with the computing environment 102 and is available to the BIM system 130. These computing systems can include database systems or repositories, servers (e.g., authentication servers, file servers, email servers, collaboration servers), clients, mobile computing systems (including e.g., tablets, laptops, smartphones, etc.), virtual machines, CRM systems, directory services, such as lightweight directory access protocol (LDAP) systems, and the like. Further, in some cases, the internal data sources 120 can include the clients 114 and 116. The external data sources 122 can include any type of computing system that is not associated with the computing environment 102, but is accessible to the BIM system 130. For example, the external data sources 122 can include any computing systems associated with cloud services, social media services, hosted applications, etc.

The BIM system 130 can communicate with the internal data sources 120 via the intranet 104. The intranet 104 can include any type of wired and/or wireless network that enables computing systems associated with the computing environment 102 to communicate with each other. For example, the intranet 104 can include any type of a LAN, a WAN, an Ethernet network, a wireless network, a cellular network, a virtual private network (VPN) and an ad hoc network. In some embodiments, the intranet 104 may include an extranet that is accessible by customers or other users who are external to the business or organization associated with the computing environment 102.

The BIM system 130 can communicate with the external data sources 122 via the network 106. The network 106 can include any type of wired, wireless, or cellular network that enables one or more computing systems associated with the computing environment 102 to communicate with the external data sources 122 and/or any computing system that is not associated with the computing environment 102. In some cases, the network 106 can include the Internet.

A user can access the BIM system 130 using any computing system that can communicate with the BIM system 130. For example, the user can access the BIM system 130 using the client 114, which can communicate with the BIM system 130 via the intranet 104, the client 116, which can communicate via a direct communication connection with the BIM system 130, or the client 118, which can communicate with the BIM system 130 via the network 106. As illustrated in FIG. 1, in some embodiments the client 118 may not be associated with the computing environment 102. In such embodiments, the client 118 and/or a user associated with the client 118 may be granted access to the BIM system 130. The clients 114, 116, and 118 may include any type of computing system including, for example, a laptop, desktop, smartphone, tablet, or the like. In some embodiments, the BIM system 130 may determine whether the user is authorized to access the BIM system 130 as described in further detail below.

The BIM system 130 can include a data collection system 132, a data classification system 134, and a BIM access system 136. The data collection system 132 can collect data or information from one or more data sources for processing by the BIM system 130. In some embodiments, the data collection system 132 can reformat the collected data to facilitate processing by the BIM system 130. Further, in some cases, the data collection system 132 may reformat collected data into a consistent or defined format that enables the comparison or processing of data that is of the same or a similar type, but which may be formatted differently because, for example, the data is obtained from different sources. The data collection system 132 is described in more detail below with reference to FIG. 2.

The data classification system 134 can store and classify the data obtained by the data collection system 132. In addition to predefined classifications, the data classification system 134 can identify and develop new classifications and associations between data using, for example, heuristics and probabilistic algorithms. The data classification system 134 is described in more detail below with reference to FIG. 3.

The BIM access system 136 can provide users with access to the BIM system 130. In some embodiments, the BIM access system 136 determines whether a user is authorized to access the BIM system 130. The BIM access system 136 enables a user to query one or more databases (not shown) of the data classification system 134 to obtain access to the data collected by the data collection system 132. Further, the BIM access system 136 enables a user to mine the data and/or to extract metadata by, for example, creating queries based on the data and the data classifications. Advantageously, in certain embodiments, because the data classification system 134 can classify data obtained from a number of data sources, more complex queries can be created compared to a system that can only query its own database or a single data source.

Additionally, in certain embodiments, the BIM access system 136 can enable users to create, share, and access query packages. As described in greater detail below, a query package can encapsulate one or more pre-defined queries, one or more visualizations of queried data, and other package attributes. When a user selects a query package, the query package can be executed in a determined manner in similar fashion to other queries. As an additional advantage, in some embodiments, because the data classification system 134 can use heuristics and probabilistic algorithms to develop and modify data classifications over time, user queries are not limited to a set of predefined search variables. The BIM access system 136 is described in more detail below with reference to FIG. 3.

Example Implementation of a BIM System

Figure 2:
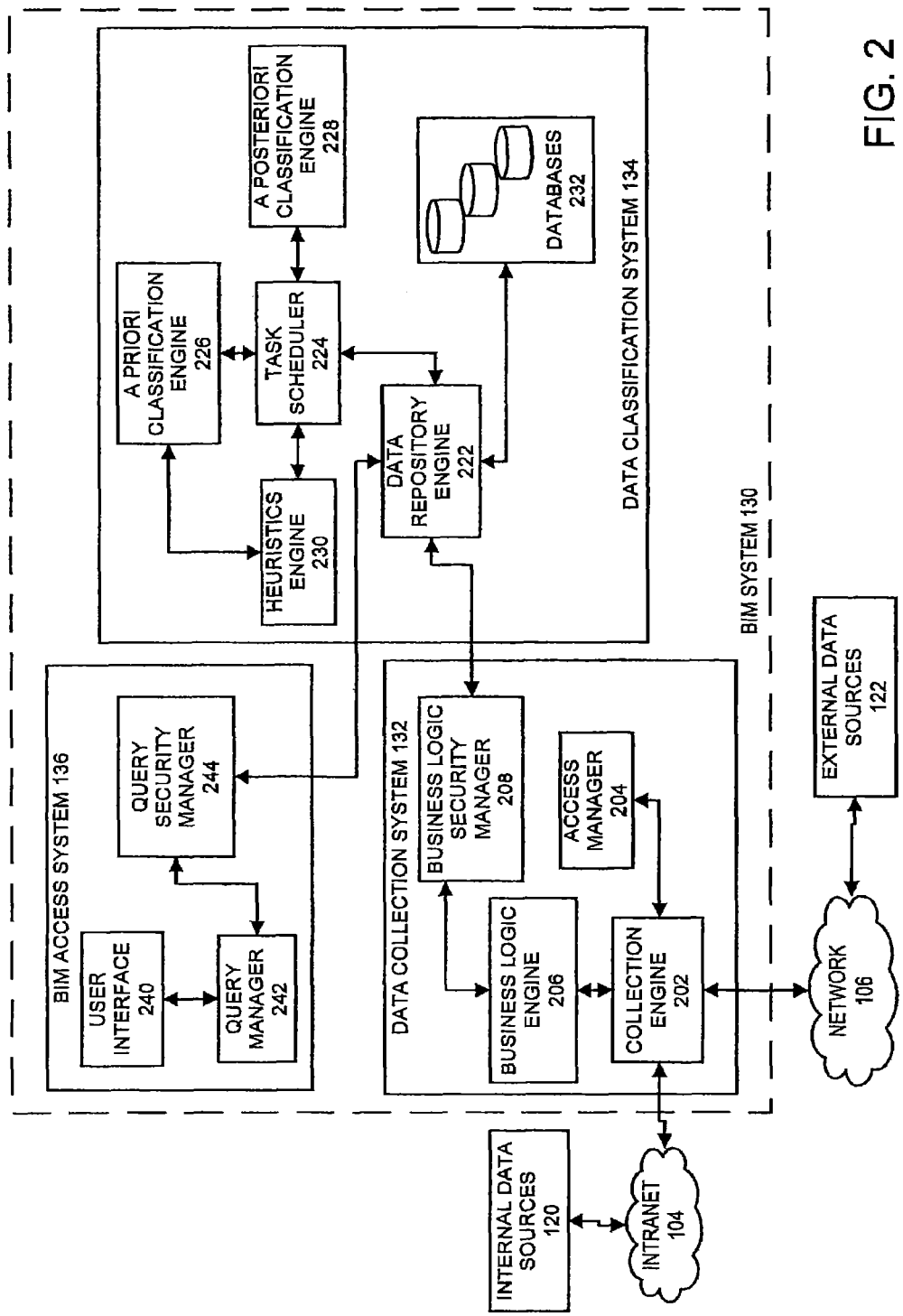
FIG. 2 illustrates an embodiment of a Business Insight on Messaging (BIM) system.

FIG. 2 illustrates an embodiment of an implementation of the BIM system 130. As previously described above, the BIM system 130 can include a data collection system 132 configured to, among other things, collect data from the internal data sources 120 and/or the external data sources 122. The data collection system 132 can include a collection engine 202, an access manager 204, a business logic engine 206, and a business logic security manager 208.

Generally, the collection engine 202 may access the internal data sources 120 thereby providing the BIM system 130 with access to data that is stored by or generated by the internal data sources 120. This data can include any data that may be created, accessed, or received by a user or in response to the actions of a user who is associated with the computing environment 102. Further, in some embodiments, the collection engine 202 can access the external data sources 122 thereby providing the BIM system 130 with access to data from the external data sources 122. In some embodiments, the data can include metadata. For example, supposing that the collection engine 202 accesses a file server, the data can include metadata associated with the files stored on the file server, such as the file name, file author, file owner, time created, last time edited, etc.

In some cases, a number of internal data sources 120 and/or external data sources 122 may require a user or system to be identified and/or authenticated before access to the data source is granted. Authentication may be required for a number of reasons. For example, the data source may provide individual accounts to users, such as a social networking account, email account, or collaboration system account. As another example, the data source may provide different features based on the authorization level of a user. For example, a billing system may be configured to allow all employees of an organization to view invoices, but to only allow employees of the accounting department to modify invoices.

For data sources that require authentication or identification of a specific user, the access manager 204 can facilitate access to the data sources. The access manager 204 can manage and control credentials for accessing the data sources. For example, the access manager 204 can store and manage user names, passwords, account identifiers, certificates, tokens, and any other information that can be used to access accounts associated with one or more internal data sources 120 and/or external data sources 122. For instance, the access manager 204 may have access to credentials associated with a business's Facebook™ or Twitter™ account. As another example, the access manager may have access to credentials associated with an LDAP directory, a file management system, or employee work email accounts.

In some embodiments, the access manager 204 may have credentials or authentication information associated with a master or super user account enabling access to some or all of the user accounts without requiring credentials or authentication information associated with each of the users. In some cases, the collection engine 202 can use the access manager 204 to facilitate accessing internal data sources 120 and/or external data sources 122.

The business logic engine 206 can include any system that can modify or transform the data collected by the collection engine 202 into a standardized format. In some embodiments, the standardized format may differ based on the data source accessed and/or the type of data accessed. For example, the business logic engine 206 may format data associated with emails, data associated with files stored at the computing environment 102, data associated with web pages, and data associated with research files differently. However, each type of data may be formatted consistently. Thus, for example, data associated with product design files may be transformed or abstracted into a common format regardless of whether the product design files are of the same type. As a second example, suppose that the business logic engine 206 is configured to record time using a 24-hour clock format. In this second example, if one email application records the time an email was sent using a 24-hour clock format, and a second email application uses a 12-hour clock format, the business logic engine 206 may reformat the data from the second email application to use a 24-hour clock format In some embodiments, a user may define the format for processing and storing different types of data. In other embodiments, the business logic engine 206 may identify a standard format to use for each type of data based on, for example, the format that is most common among similar types of data sources, the format that reduces the size of the information, or any other basis that can be used to decide a data format.

The business logic security manager 208 can include any system that can implement security and data access policies for data accessed by the collection engine 202. In some embodiments, the business logic security manager 208 may apply the security and data access policies to data before the data is collected as part of a determination of whether to collect particular data. For example, an organization may designate a private folder or directory for each employee and the data access policies may include a policy to not access any files or data stored in the private directory. Alternatively, or in addition, the business logic security manager 208 may apply the security and data access policies to data after it is collected by the collection engine 202. Further, in some cases, the business logic security manager 208 may apply the security and data access policies to the abstracted and/or reformatted data produced by the business logic engine 206. For example, suppose the organization associated with the computing environment 102 has adopted a policy of not collecting emails designated as personal. In this example, the business logic security manager 208 may examine email to determine whether it is addressed to an email address designated as personal (e.g., email addressed to family members) and if the email is identified as personal, the email may be discarded by the data collection system 132 or not processed any further by the BIM system 130.

In some embodiments, the business logic security manager 208 may apply a set of security and data access policies to any data or metadata provided to the classification system 134 for processing and storage. These security and data access policies can include any policy for regulating the storage and access of data obtained or generated by the data collection system 132. For example, the security and data access policies may identify the users who can access the data provided to the data classification system 134. The determination of which users can access the data may be based on the type of data. The business logic security manager 208 may tag the data with an identity of the users, or class or role of users (e.g., mid-level managers and more senior) who can access the data. As another example, of a security and data access policy, the business logic security manager 208 may determine how long the data can be stored by the data classification system 134 based on, for example, the type of data or the source of the data.

After the data collection system 132 has collected and, in some cases, processed the data obtained from the internal data sources 120 and/or the external data sources 122, the data may be provided to the data classification system 134 for further processing and storage. The data classification system 134 can include a data repository engine 222, a task scheduler 224, an a priori classification engine 226, an a posteriori classification engine 228, a heuristics engine 230 and a set of databases 232.

The data repository engine 222 can include any system for storing and indexing the data received from the data collection system 132. The data repository engine 222 can store the data, including any generated indexes, at the set of databases 232, which can include one or more databases or repositories for storing data. In some cases, the set of databases 232 can store data in separate databases based on any factor including, for example, the type of data, the source of data, or the security level or authorization class associated with the data and the class of users who can access the data.

In some implementations, the set of databases 232 can dynamically expand and, in some cases, the set of databases 232 may be dynamically structured. For example, if the data repository engine 222 receives a new type of data that includes metadata fields not supported by the existing databases of the set of databases 232, the data repository engine 222 can create and initialize a new database that includes the metadata fields as part of the set of databases 232. For instance, suppose the organization associated with the computing environment 102 creates its first social media account for the organization to expand its marketing initiatives. Although the databases 232 may have fields for customer information and vendor information, it may not have a field identifying whether a customer or vendor has indicated they "like" or "follow" the organization on its social media page. The data repository engine 222 can create a new field in the databases 232 to store this information and/or create a new database to capture information extracted from the social media account including information that relates to the organization's customers and vendors.

In certain embodiments, the data repository engine 222 can create abstractions of and/or classify the data received from the data collection system 132 using, for example, the task scheduler 224, the a priori classification engine 226, the a posteriori classification engine 228, and the heuristics engine 230. The task scheduler 224 can include any system that can manage the abstraction and classification of the data received from the data collection system 132. In some embodiments, the task scheduler 224 can be included as part of the data repository engine 222.

Data that is to be classified and/or abstracted can be supplied to the task scheduler 224. The task scheduler 224 can supply the data to the a priori classification engine 226, which can include any system that can classify data based on a set of user-defined, predefined, or predetermined classifications. These classifications may be provided by a user (e.g., an administrator) or may be provided by the developer of the BIM system 130. Although not limited as such, the predetermined classifications generally include objective classifications that can be determined based on attributes associated with the data. For example, the a priori classification engine 226 can classify communications based on whether the communication is an email, an instant message, or a voice mail. As a second example, files may be classified based on the file type, such as whether the file is a drawing file (e.g., an AutoCAD™ file), a presentation file (e.g., a PowerPoint™ file), a spreadsheet (e.g., an Excel™ file), a word processing file (e.g., a Word™ file), etc. Although not limited as such, the a priori classification engine 226 generally classifies data at or substantially near the time of collection by the collection engine 202. The a priori classification engine 226 can classify the data prior to the data being stored in the databases 232. However, in some cases, the data may be stored prior to or simultaneously with the a priori classification engine 226 classifying the data. The data may be classified based on one or more characteristics or pieces of metadata associated with the data. For example, an email may be classified based on the email address, a domain or provider associated with the email (e.g., a Yahoo® email address or a corporate email address), or the recipient of the email.

In addition to, or instead of, using the a priori classification engine 226, the task scheduler 224 can provide the data to the a posteriori classification engine 228 for classification or further classification. The a posteriori classification engine 228 can include any system that can determine trends with respect to the collected data. Although not limited as such, the a posteriori classification engine 228 generally classifies data after the data has been collected and stored at the databases 232. However, in some cases, the a posteriori classification engine 228 can also be used to classify data as it is collected by the collection engine 202. Data may be processed and classified or reclassified multiple times by the a posteriori classification engine 228. In some cases, the classification and reclassification of the data occurs on a continuing basis. In other cases, the classification and reclassification of data occurs during specific time periods of events. For example, data may be reclassified each day at midnight or once a week. As another example, data may be reclassified each time one or more of the a posteriori algorithms is modified or after the collection of new data.

In some cases, the a posteriori classification engine 228 classifies data based on one or more probabilistic algorithms. The probabilistic algorithms may be based on any type of statistical analysis of the collected data. For example, the probabilistic algorithms may be based on Bayesian analysis or probabilities. Further, Bayesian inferences may be used to update the probability estimates calculated by the a posteriori classification engine 228. In some implementations, the a posteriori classification engine 228 may use machine learning techniques to optimize or update the a posteriori algorithms. In some embodiments, some of the a posteriori algorithms may determine the probability that a piece or set of data (e.g., an email) should have a particular classification based on an analysis of the data as a whole. Alternatively, or in addition, some of the a posteriori algorithms may determine the probability that a set of data should have a particular classification based on the combination of probabilistic determinations associated with subsets of the data, parameters, or metadata associated with the data (e.g., classifications associated with the content of the email, the recipient of the email, the sender of the email, etc.).

For example, continuing with the email example, one probabilistic algorithm may be based on the combination of the classification or determination of four characteristics associated with the email, which may be used to determine whether to classify the email as a personal email, or non-work related. The first characteristic can include the probability that an email address associated with a participant (e.g., sender, recipient, BCC recipient, etc.) of the email conversation is used by a single employee. This determination may be based on the email address itself (e.g., topic based versus name based email address), the creator of the email address, or any other factor that can be used to determine whether an email address is shared or associated with a particular individual. The second characteristic can include the probability that keywords within the email are not associated with peer-to-peer or work-related communications. For example, terms of endearment and discussion of children and children's activities are less likely to be included in work-related communications. The third characteristic can include the probability that the email address is associated with a participant domain or public service provider (e.g., Yahoo® email or Google® email) as opposed to a corporate or work email account. The fourth characteristic can include determining the probability that the message or email thread can be classified as conversational as opposed to, for example, formal. For example, a series of quick questions in a thread of emails, the use of a number of slang words, or excessive typographical errors may indicate that an email is likely conversational. The a posteriori classification engine 228 can use the determined probabilities for the above four characteristics to determine the probability that the email communication is personal as opposed to, for example, work-related, or spam email.

The combination of probabilities may not total 100%. Further, the combination may itself be a probability and the classification can be based on a threshold determination. For example, the threshold may be set such that an email is classified as personal if there is a 90% probability for three of the four above parameters indicating the email is personal (e.g., email address is used by a single employee, the keywords are not typical of peer-to-peer communication, at least some of the participant domains are from known public service providers, and the message thread is conversational).

As another example of the a posteriori classification engine 228 classifying data, the a posteriori classification engine 228 can use a probabilistic algorithm to determine whether a participant of an email is a customer. The a posteriori classification engine 228 can use the participant's identity (e.g., a customer) to facilitate classifying data that is associated with the participant (e.g., emails, files, etc.). To determine whether the participant should be classified as a customer, the a posteriori classification engine 228 can examiner a number of parameters including a relevant Active Directory Organizational Unit (e.g., sales, support, finance) associated with the participant and/or other participants in communication with the participant, the participant's presence in forum discussions, etc. In some cases, characteristics used to classify data may be weighted differently as part of the probabilistic algorithm. For example, email domain may be a poor characteristic to classify a participant in some cases because the email domain may be associated with multiple roles. For instance, Microsoft® may be a partner, a customer, and a competitor.

In some implementations, a user (e.g., an administrator) can define the probabilistic algorithms used by the a posteriori classification engine 228. For example, suppose customer Y is a customer of business X and that the management of business X is interested in tracking the percentage of communication between business X and customer Y that relates to sales. Further, suppose that a number of employees from business X and a number of employees from business Y are in communication via email. Some of these employees may be in communication to discuss sales. However, it is also possible that some of the employees may be in communication for technical support issues, invoicing, or for personal reasons (e.g., a spouse of a business X employee may work at customer Y). Thus, in this example, to track the percentage of communication between business X and customer Y that relates to sales the user may define a probabilistic algorithm that classifies communications based on the probability that the communication relates to sales. The algorithm for determining the probability may be based on a number of pieces of metadata associated with each communication. For example, the metadata may include the sender's job title, the recipient's job title, the name of the sender, the name of the recipient, whether the communication identifies a product number or an order number, the time of communication, a set of keywords in the content of the communication, etc.

Using the a posteriori classification engine 228, data may be classified based on metadata associated with the data. For example, the communication in the above example can be classified based on whether it relates to sales, supplies, project development, management, personnel, or is personal. The determination of what the data relates to can be based on any criteria. For example, the determination may be based on keywords associated with the data, the data owner, the data author, the identity or roles of users who have accessed the data, the type of data file, the size of the file, the data the file was created, etc.

In certain embodiments, the a posteriori classification engine 228 can use the heuristics engine 230 to facilitate classifying data. Further, in some cases, the a posteriori classification engine 228 can use the heuristics engine 230 to validate classifications, to develop probable associations between potentially related content, and to validate the associations as the data collection system 132 collects more data. In certain embodiments, the a posteriori classification engine 228 may base the classifications of data on the associations between potentially related content. In some implementations, the heuristic engine 230 may use machine learning techniques to optimize or update the heuristic algorithms.

In some embodiments, a user (e.g., an administrator) can verify whether the data or metadata has been correctly classified. Based on the result of this verification, in some cases, the a posteriori classification engine 228 may correct or update one or more classifications of previously processed or classified data. Further, in some implementations, the user can verify whether two or more pieces of data or metadata have been correctly associated with each other. Based on the result of this verification, the a posteriori classification engine 228 using, for example, the heuristics engine 230 can correct one or more associations between previously processed data or metadata. Further, in certain embodiments, one or more of the a posteriori classification engine 228 and the heuristics engine 230 may update one or more algorithms used for processing the data provided by the data collection system 132 based on the verifications provided by the user.

In some embodiments, the heuristics engine 230 may be used as a separate classification engine from the a priori classification engine 226 and the a posteriori classification engine 228. Alternatively, the heuristics engine 230 may be used in concert with one or more of the a priori classification engine 226 and the a posteriori classification engine 228. Similar to the a posteriori classification engine 228, the heuristics engine 230 generally classifies data after the data has been collected and stored at the databases 232. However, in some cases, the heuristics engine 230 can also be used to classify data as it is collected by the collection engine 202.

The heuristics engine 230 can use any type of heuristic algorithm for classifying data. For example, the heuristics engine 230 can determine whether a number of characteristics are associated with the data and based on the determination, classify the data. For example, data that mentions a product, includes price information, addresses (e.g., billing and shipping addresses), and quantity information may be classified as sales data. In some cases, the heuristics engine 230 can classify data based on a subset of characteristics. For example, if a majority or two-thirds of characteristics associated with a particular classification are identified as existing in a set of data, the heuristics engine 230 can associate the classification with the set of data. In some cases, the heuristics engine 230 determines whether one or more characteristics are associated with the data. In other words, the heuristics engine can determine whether a particular characteristic is or is not associated with the data. Alternatively, or in addition, the heuristics engine 230 can determine the value or attribute of a particular characteristic associated with the data. The value or attribute of the characteristic may then be used to determine a classification for the data. For example, one characteristic that may be used to classify data is the length of the data. For instance, in some cases, a long email may make one classification more likely that a short email.

The a priori classification engine 226 and the a posteriori classification engine 228 can store the data classification at the databases 232. Further, the a posteriori classification engine 228 and the heuristics engine 230 can store the probable associations between potentially related data at the databases 232. In some cases, as classifications and associations are updated based on, for example, user verifications or updates to the a posteriori and heuristic classification and association algorithms, the data or metadata stored at the databases 232 can be modified to reflect the updates.

Users can communicate with the BIM system 130 using a client computing system (e.g., client 114, client 116, or client 118). In some cases, access to the BIM system 130, or to some features of the BIM system 130, may be restricted to users who are using clients associated with the computing environment 102. As described above, in some cases, at least some users can access the BIM system 130 to verify classifications and associations of data by the data classification system 134. In addition, in some cases, at least some users can access at least some of the data and/or metadata stored at the data classification system 134 using the BIM access system 136. The BIM access system 136 can include a user interface 240, a query manager 242, and a query security manager 244.

The user interface 240 can generally include any system that enables a user to communicate with the BIM system 130. Further, the user interface 240 enables the user to submit a query to the BIM system 130 to access the data or metadata stored at the databases 232. Moreover, the query can be based on any number of or type of data or metadata fields or variables. Advantageously, in certain embodiments, by enabling, a user to create a query based on any number or type of fields, complex queries can be generated. Further, because the BIM system 130 can collect and analyze data from a number of internal and external data sources, a user of the BIM system 130 can extract data that is not typically available by accessing a single data source. For example, a user can query the BIM system 130 to locate all personal messages sent by the members of the user's department within the last month. As a second example, a user can query the BIM system 130 to locate all helpdesk requests received in a specific month outside of business hours that were sent by customers from Europe. As an additional example, a product manager may create a query to examine customer reactions to a new product release or the pitfalls associated with a new marketing campaign. The query may return data that is based on a number of sources including, for example, emails received from customers or users, Facebook® posts, Twitter® feeds, forum posts, quantity of returned products, etc.

Further, in some cases, a user can create a relatively simple query to obtain a larger picture of an organization's knowledge compared to systems that are incapable of integrating the potentially large number of information sources used by some businesses or organizations. For example, a user can query the BIM system 130 for information associated with customer X over a time range. In response, the BIM system 130 may provide the user with all information associated with customer X over the time range, which can include who communicated with customer X, the percentage of communications relating to specific topics (e.g., sales, support, etc.), the products designed for customer X, the employees who performed any work relating to customer X and the employees' roles, etc. This information may not be captured by a single source. For example, the communications may be obtained from an email server, the products may be identified from product drawings, and the employees and their roles may be identified by examining who accessed specific files in combination with the employees' human resources (HR) records.

The query manager 242 can include any system that enables the user to create the query. The query manager 242 can cause the available types of search parameters for searching the databases 232 to be presented to a user via the user interface 240. These search parameter types can include any type of search parameter that can be used to form a query for searching the databases 232. For example, the search parameter types can include names (e.g., employee names, customer names, vendor names, etc.), data categories (e.g., sales, invoices, communications, designs, miscellaneous, etc.), stored data types (e.g., strings, integers, dates, times, etc.), data sources (e.g., internal data sources, external data sources, communication sources, sales department sources, product design sources, etc.), dates, etc. In some cases, the query manager 242 can also parse a query provided by a user. For example, some queries may be provided using a text-based interface or using a text-field in a Graphical User Interface (GUI). In such cases, the query manager 242 may be configured to parse the query.

The query manager 242 can further include any system that enables the user to create or select a query package that serves as the query. In certain embodiments, the query manager 242 can maintain query packages for each user, group of users, and/or the like. The query packages can be stored, for example, in a SQL database that maintains each user's query packages in a table by a unique identifier. In some embodiments, each user may have a profile that includes a list of package identifiers for that user. The query manager 242 can cause query packages associated with the user to be presented and made selectable via the user interface 240. In various embodiments, the query manager 242 can also facilitate creation of new query packages. New query packages can be made accessible to users in various ways. For example, the new query packages can be created by the user, shared with the user by another user, pushed to the user by an administrator, or created in another fashion.

Further, the query manager 242 can cause any type of additional options for querying the databases 232 to be presented to the user via the user interface 240. These additional options can include, for example, options relating to how query results are displayed or stored.

In some cases, access to the data stored in the BIM system 130 may be limited to specific users or specific roles. For example, access to the data may be limited to "Bob" or to senior managers. Further, some data may be accessible by some users, but not others. For example, sales managers may be limited to accessing information relating to sales, invoicing, and marketing, technical managers may be limited to accessing information relating to product development, design and manufacture, and executive officers may have access to both types of data, and possibly more. In certain embodiments, the query manager 242 can limit the search parameter options that are presented to a user for forming a query based on the user's identity and/or role.

The query security manager 244 can include any system for regulating who can access the data or subsets of data. The query security manager 244 can regulate access to the databases 232 and/or a subset of the information stored at the databases 232 based on any number and/or types of factors. For example, these factors can include a user's identity, a user's role, a source of the data, a time associated with the data (e.g., the time the data was created, a time the data was last accessed, an expiration time, etc.), whether the data is historical or current, etc.

Further, the query security manager 244 can regulate access to the databases 232 and/or a subset of the information stored at the databases 232 based on security restrictions or data access policies implemented by the business logic security manager 208. For example, the business logic security manager 208 may identify all data that is "sensitive" based on a set of rules, such as whether the data mentions one or more keywords relating to an unannounced product in development. Continuing this example, the business logic security manager 208 may label the sensitive data as, for example, sensitive, and may identify which users or roles, which are associated with a set of users, can access data labeled as sensitive. The query security manager 244 can then regulate access to the data labeled as sensitive based on the user or the role associated with the user who is accessing the databases 232.

Although illustrated separately, in some embodiments, the query security manager 244 can be included as part of the query manager 242. Further, in some cases, one or both of the query security manager 244 and the query manager 242 can be included as part of the user interface 240. In certain embodiments, some or all of the previously described systems can be combined or further divided into additional systems. Further, some or all of the previously described systems may be implemented in hardware, software, or a combination of hardware and software.

Example Data Collection Process

Figure 3:
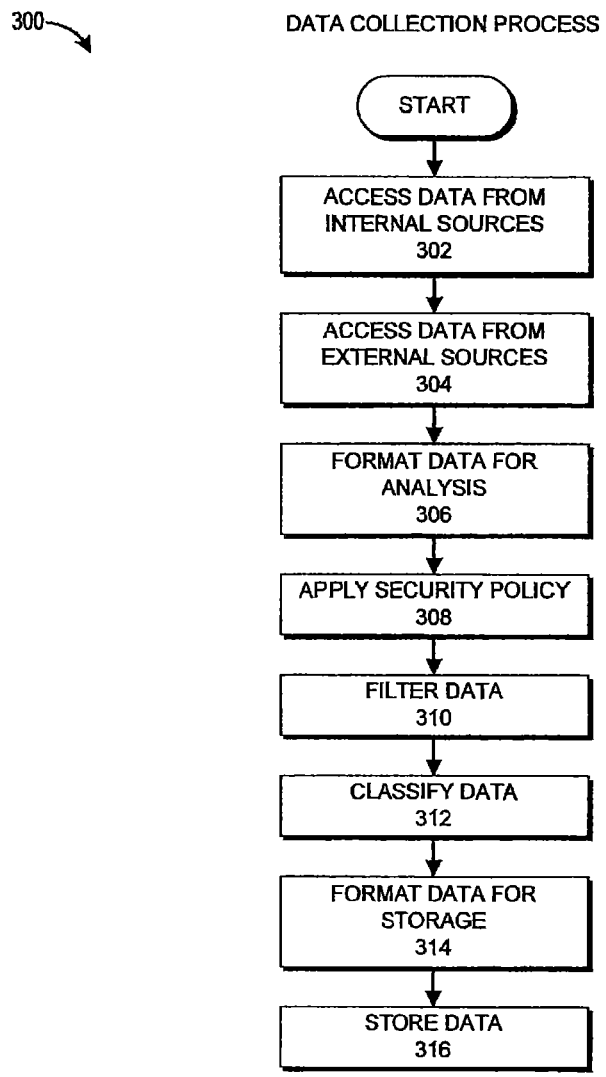
FIG. 3 presents a flowchart of an example of a data collection process.

FIG. 3 presents a flowchart of an example of a data collection process 300. The process 300 can be implemented by any system that can access one or more data sources to collect data for storage and analysis. For example, the process 300, in whole or in part, can be implemented by one or more of the data collection system 132, the collection engine 202, the access manager 204, the business logic engine 206, and the business logic security manager 208. In some cases, the process 300 can be performed generally by the BIM system 130. Although any number of systems, in whole or in part, can implement the process 300, to simplify discussion, the process 300 will be described in relation to specific systems or subsystems of the BIM system 130.

The process 300 begins at block 302 where, for example, the collection engine 202 accesses data from the internal data sources 120. At block 304, the collection engine 202 accesses data from the external data sources 122. In some cases, either the block 302 or 304 may be optional. Accessing the data may include obtaining the data or a copy of the data from the internal data sources 120. Further, accessing the data may include accessing metadata associated with the data. In some embodiments, the collection engine 202 may obtain copies of the metadata or access the data to obtain or determine metadata associated with the data without obtaining a copy of the data. For example, in some cases, the collection engine 202 may access email from an email server to obtain metadata (e.g., sender, recipient, time sent, whether files are attached, etc.) associated with email messages with or, in some cases, without obtaining a copy of the email.

As previously described, accessing one or more of the internal data sources 120 and the external data sources 122 may involve using one or more credentials or accessing one or more accounts associated with the data sources. In such embodiments, the collection engine 202 may use the access manager 204 to access the credentials and/or to facilitate accessing the data sources.

Generally, although not necessarily, the data obtained at blocks 302 and 304 is raw data that is obtained in the format that the data is stored at the data sources with little to no modification. At block 306, the business logic engine 206, as described above, can reformat or transform the accessed or collected data for analysis and/or storage. Reformatting the accessed or collected data can include formatting the data to enable further processing by the BIM system 130. Further, reformatting the accessed or collected data can include formatting the data in a format specified by a user (e.g., an administrator). In addition, in certain cases, reformatting the data can include extracting metadata from the accessed or collected data. In some cases, block 306 can include abstracting the data to facilitate analysis. For example, assuming the data under analysis is an email, a number of users may be identified. For instance, an email may include a sender, one or more recipients, which may also include users that are carbon copied, or listed on the CC line, and Blind Carbon Copied, or listed on the BCC line, and, in some cases, non-user recipients, such as lists or email addresses that result in a copy of the email being placed in an electronic folder for storage. Each of these users can be abstracted as "communication participant." The data can then be analyzed and/or stored with each user identified, for example, as a "communication participant." As another example of abstracting the data, the text content of each type of message can be abstracted as "message body." Thus, an email, a Twitter® post, and a Facebook® post, and a forum post, and a product review can all be abstracted as "message body." By abstracting data, the BIM system 130 enables more in-depth searching across multiple data sources. For example, a user can search for all messages associated with communication participant X. The result of the search can include any type of message that is associated with user X including emails sent by user X, emails received by user X, product review by user X, Twitter® posts by user X, etc. In some embodiments, the databases 232 may store the abstracted or transformed data and the original data or references to the original sources of data. In other embodiments, the databases 232 may store the abstracted or transformed data in place of the original data.

In some cases, reformatting the data may be optional. For example, in cases where the collection engine 202 collects metadata from sources that share a common or substantially similar data storage format, the block 306 may be unnecessary.

At block 308, the business logic security manager 208 applies a security or data access policy to the collected data. Applying the security policy can include preventing the collection engine 202 from accessing some data. For example, applying the security policy can include preventing the collection engine 202 from accessing encrypted files, files associated with a specific project or user, or files marked private. Further, applying the security policy can include marking or identifying data, based on the security policy, that should not be stored at the databases 232, that should be accessible by a set of users or roles, or that should be inaccessible by a set of users or roles. The business logic security manager 208 can filter any data marked for exclusion from storage in the databases 232 at block 310. Further, the business logic security manager 208 and/or the business logic engine 206 can filter out any data to be excluded based on a data access policy, which can be based on any type of factor for excluding data. For example, data may be filtered based on the age of the data, such as files created more than five years ago or emails more than two years old.

Figure 4:
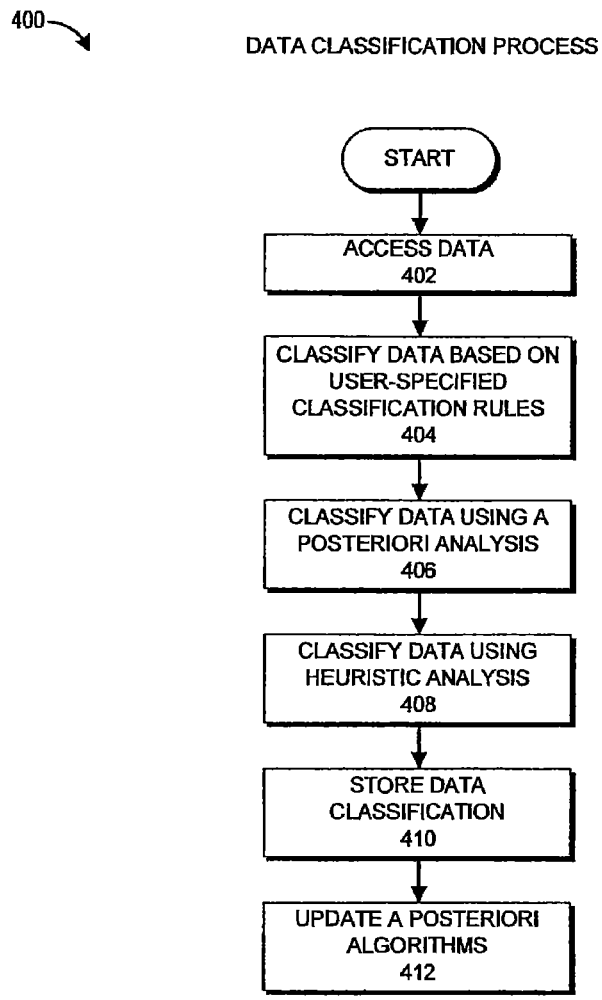
FIG. 4 presents a flowchart of an example of a data classification process.

At block 312, the business logic engine 206 or the business logic security manager 208 may classify the collected and/or filtered data. The data may be classified based on, for example, who can access the data, the type of data, the source of the data, or any other factor that can be used to classify data. In some embodiments, the data may be provided to the data classification system 134 for classification. Some non-limiting embodiments of a process for classifying the data are described in further detail below with respect to the process 400, which is illustrated in FIG. 4.

The business logic engine 206 further formats the data for storage at block 314. Formatting the data for storage can include creating a low-level abstraction of the data, transforming the data, or extracting metadata for storage in place of the data. In some cases, block 314 can include some or all of the embodiments described above with respect to the block 306. In some embodiments, data may go through one abstraction or transformation process at the block 306 to optimize the data for analysis and go through another abstraction or transformation process at the block 314 to optimize the data for storage and/or query access. In some embodiments, the metadata may be stored in addition to the data. Further, the metadata, in some cases, may be used for querying the databases 232. For example, a user can search the databases 232 for information based on one or more metadata fields. In some embodiments, one or more of the blocks 306 and 314 may be optional.

At block 316, the data collection system 132 can cause the data to be stored at, for example, the databases 232. This stored data can include one or more of the collected data, the metadata, and the abstracted data. In some embodiments, storing the data can include providing the data to the data repository 222 for indexing. In such embodiments, the data repository 222 can store the indexed data at the databases 232.

Although the process 300 was presented above in a specific order, it is possible for the operations of the process 300 to be performed in a different order or in parallel. For example, the business logic security manager 208 may perform the block 308, at least in part, prior to or in parallel with the blocks 302 and 304. As a second example, the business logic engine 206 may perform the block 306 as each item of data is accessed or after a set of data is accessed at the blocks 302 and 304.

Example Data Classification Process

FIG. 4 presents a flowchart of an example of a data classification process 400. The process 400 can be implemented by any system that can classify data and/or metadata. For example, the process 400, in whole or in part, can be implemented by one or more of the data classification system 134, the data repository engine 222, the task scheduler 224, the a priori classification engine 226, the a posteriori classification engine 228, and the heuristics engine 230. In some cases, the process 400 can be performed generally by the BIM system 130. Although any number of systems, in whole or in part, can implement the process 400, to simplify discussion, the process 400 will be described in relation to specific systems or subsystems of the BIM system 130.

The process 400 begins at block 402 where, for example, the data collection system 132 accesses data from one or more of the internal data sources 120 and the external data sources 122. The data collection system 132 may use the collection engine 202 to access the data. Further, the block 402 can include some or all of the embodiments described above with respect to the blocks 302 and 304. Moreover, some or all of the process 300 described above can be performed as part of the process performed at block 402. In some embodiments, the process 400 can be performed as part of the block 312 above. In such embodiments, the block 402 may include the data collection system 132 providing the data, a reformatted version of the data, an abstraction of the data, and/or metadata to the data classification system 134. In some implementations, the process 400 may be performed separately or independently of the data collection process. In such embodiments, the block 402 may include accessing the data from the databases 232. In some cases, the databases 232 may include a database for classified data and a separate database for data that has not yet been classified.

At block 404, the a priori classification engine 226 classifies the data based on a set of user-specified classification rules. As previously mentioned, a developer of the BIM system 130 or a user (e.g., an administrator) may specify the classification rules. Further, the classification rules can include any rules for classifying data based on the data or metadata associated with the data. For example, data may be classified based on the author of the data, the owner of the data, the time the data was created, etc.

At block 406, the a posteriori classification engine 228 classifies the data using a posteriori analysis. This may include the a posteriori classification engine 228 using one or more probabilistic algorithms to determine one or more classifications for the data. The a posteriori classification engine 228 can use any type of probabilistic algorithm for classifying the data. For example, the classification may be based on one or more Bayesian probability algorithms. As another example, the a posteriori classification may be based on clustering of similar or dissimilar pieces of data. One example of such an approach that can be adapted for use herein is the Braun-Blanquet method that is sometimes used in vegetation science. One or both of the a priori classification and the a posteriori classification may be based on one or more variables or criteria associated with the data or metadata.

In some embodiments, the a posteriori classification engine 228 may use the heuristics engine 230 to facilitate calculating the probabilistic classifications of the data. For example, the a posteriori classification engine 228 can modify the probabilities used to classify the data based on a determination of the heuristics engine 230 of the accuracy of the classification of previously classified data. The heuristics engine 230 may determine the accuracy of the classification of previously classified data based on, for example, feedback by the user. This feedback may include, for example, manual reclassification of data, indications by a user of the accuracy of prior classifications, indications of the accuracy or usefulness of query results from querying the databases 232 that include the classified data, etc. Further, the heuristics engine 230 may determine the accuracy of the classification of previously classified data based on, for example, the classifications of data accessed more recently than the previously classified data. In some cases, the more recent data may have been accessed before or at the same time as the previously classified data, but may be classified after the previously classified data.

At block 408, the heuristics engine 230 can classify data using a heuristics analysis. As previously described, in some cases, the heuristics engine 230 can classify the data based on the number or percentage of characteristics or attributes associated with the data that match a particular classification.

In some embodiments, the task scheduler 224 schedules one or more of the blocks 404, 406, and 408. Further, in some cases, the task scheduler 224 may determine whether to perform the process 400 and/or one or more of the blocks 404, 406, and 408. In some cases, one or more of the blocks 404, 406, and 408 may be optional. For instance, an initial classification may be associated with data when it is collected via the process associated with the block 404. The data may then be further classified or reclassified at collection, or at a later time, using the process associated with the block 406, the block 408, or a combination of the blocks 406 and 408.

At block 410, the data repository engine 222 stores or causes to be stored the data and the data classifications at the databases 232. In some cases, the data repository engine 222 may store metadata associated with the data at the databases 232 instead of, or in addition to, storing the data.

At block 412, the data repository engine 222 can update the a posteriori algorithms based on the classifications determined for the data. In addition, or alternatively, the a posteriori algorithms may be updated based on previously classified data. The a posteriori algorithms may be updated based on customer feedback and/or the determination of the heuristics engine 230 as described above with respect to the block 406. Further, updating the a posteriori algorithms may include modifying the probabilistic weights applied to one or more variables or pieces of metadata used to determine the one or more classifications of the data. Moreover, updating the a posteriori algorithms may include modifying the one or more variables or pieces of metadata used to determine the one or more classifications of the data. In some cases, the block 412 can include modifying the heuristic algorithms used at the block 408. For example, the number of characteristics required to classify the data with a particular classification may be modified. In addition, or alternatively, the weight applied to each of the characteristics may be modified at the block 412.

As with the process 300, it is possible for the operations of the process 400 to be performed in a different order or in parallel. For example, the blocks 404 and 406 may be performed in a different order or in parallel.

Example Data Query Process Using User-Provided Query

Figure 5:
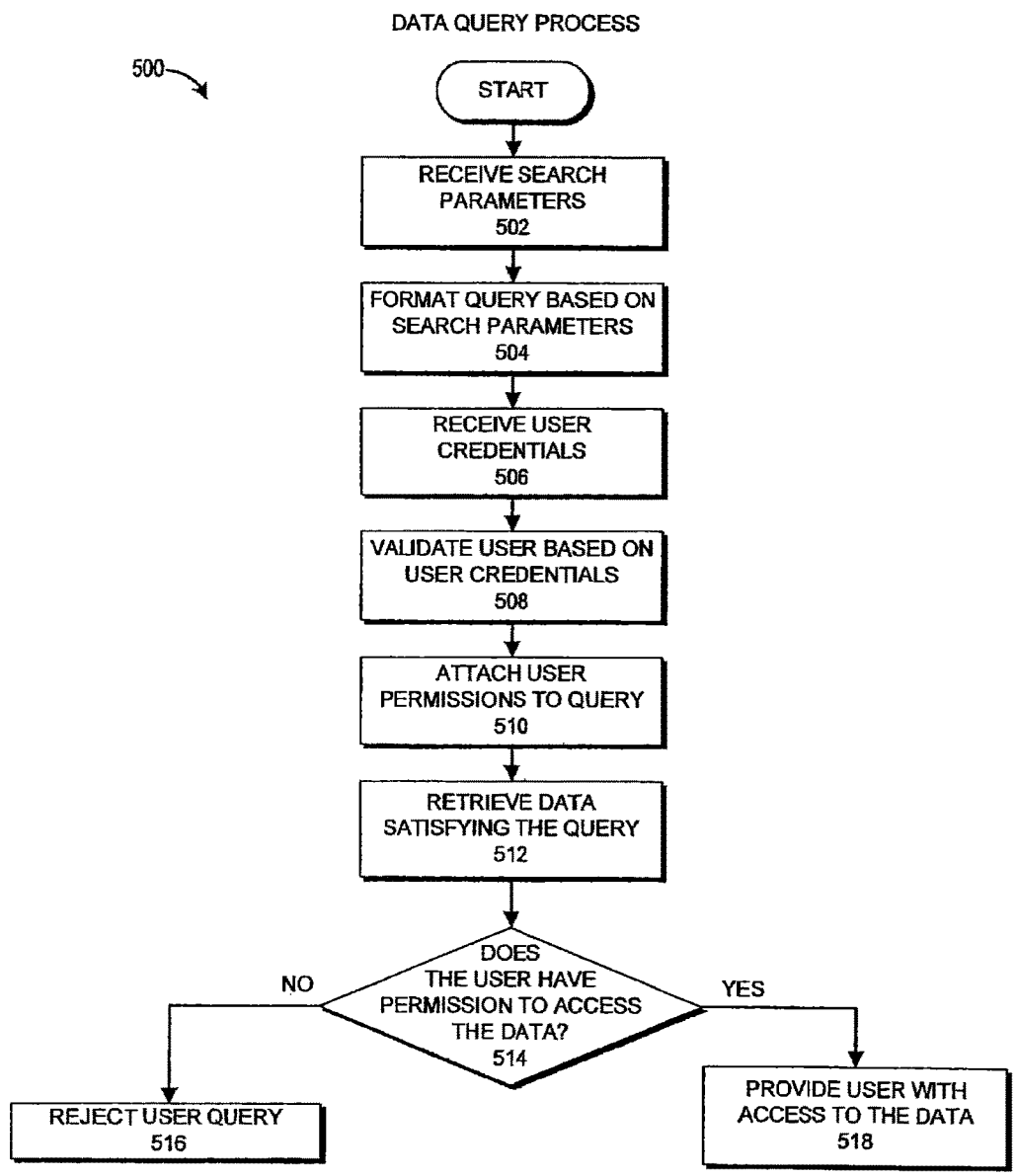
FIG. 5 presents a flowchart of an example of a data query process.

FIG. 5 presents a flowchart of an example of a data query process 500. The process 500 can be implemented by any system that can process a query provided by a user or another system and cause the results of the query to be presented to the user or provided to the other system. For example, the process 500, in whole or in part, can be implemented by one or more of the BIM access system 136, the user interface 240, the query manager 242, and the query security manager 244. In some cases, the process 500 can be performed generally by the BIM system 130. Although any number of systems, in whole or in part, can implement the process 500, to simplify discussion, the process 500 will be described in relation to specific systems or subsystems of the BIM system 130.

The process 500 begins at block 502 where, for example, the user interface 240 receives a set of one or more search parameters from a user via a client (e.g., the client 114). In some embodiments, the search parameters may be provided by another computing system. For example, in some embodiments, an application running on a server (not shown) or a client (e.g., the client 116) may be configured to query the BIM system 130 in response to an event or at a predetermined time. The application can then use the result of the query to perform an application-specific process. For instance, an application or script may be configured to query the BIM system 130 every month to determine the workload of each employee or of the employees in a specific department of an organization to determine, for example, whether additional employees are needed or whether the allocation of human resources within different departments should be redistributed. In this example, the application can determine whether to alert a user based on the result of the determination.

In some implementations, a user can provide a text-based query to the user interface 240. This text-based query can be parsed by, for example, the user interface 240 and/or the query manager 242. Alternatively, or in addition, the user interface 240 can provide a set of query options and/or fields that a user can use to formulate a query of the BIM system 130. The query options or fields can include any type of option or field that can be used to form a query of the BIM system 130. For example, the query options or fields can include tags, classifications, time ranges, keywords, user identifiers, user roles, customer identifiers, vendor identifiers, corporate locations, geographic locations, etc. In some embodiments, the query options and/or search fields presented to a user may be generated based on the data stored in the databases 232. For example, if the databases 232 includes email data, a sender field and a recipient field may be available for generating a query. However, if the databases 232 lacks any email data, the sender and recipient fields may not be available for generating a query.

In some cases, the query security manager 244 can limit or determine the fields or options that the user interface 240 can present to the user based on, for example, the user's permissions or the user's role. For example, fields relating to querying the BIM system 130 regarding the content of a business's email may be unavailable to a user who is not authorized to search the contents of collected email. For instance, searching the content of emails may be limited to the legal department for compliance purposes. Other users may be prohibited from searching the email content for privacy reasons.

At block 504, the query manager 242 formats a query based on the search parameters received at block 502. Formatting the query may include transforming the search parameters and query options provided by the user into a form that can be processed by the data repository engine 222. In certain embodiments, the block 504 may be optional. For example, in some cases the search parameters may be provided by the user in a form of a query that can be processed by the BIM system 130 without modification.

At block 506, the user interface 240 receives one or more user credentials from the user. In some cases, the user credentials may be received from an application. The user credentials can include any type of credential or identifier that can be used to identify a user and/or determine a set of permissions or a level of authorization associated with the user. At block 508, the query security manager 244 can validate the user, or application, based at least in part on the user credentials received at the user interface 240. Validating the user can include identifying the user, identifying permissions associated with the user, the user's role, and/or an authorization level associated with the user. In some embodiments, if the query security manager 244 is unable to validate the user or determines that the user lacks authorization to access the BIM system 130 and/or query the databases 232, the query security manager 244 may reject the user's query. Further, the user interface 240 may inform the user that the user is not authorized to access the BIM system 130 or to query the databases 232. In some implementations, if the user identifies as a guest or if the query security manager 244 is unable to validate the guest, the user may be associated with a guest identity and/or a set of guest permissions, which may permit limited access to the BIM system 130 or the data stored at the databases 232. In some cases, a guest may receive full access to the BIM system 130. However, the actions of the guest may be logged or logged differently than the actions of an identified user.

At block 510, the query security manager 244 attaches the user permissions to the query. Alternatively, or in addition, the query security manager may attach the user's identity, role, and/or authorization level to the query. In some embodiments, one or more of the blocks 506, 508, and 510 may be optional.

At block 512, the query manager 242 retrieves data, and/or metadata, satisfying the query. In some implementations, the block 512 may include providing the query to the data repository engine 222 for processing. The data repository engine 222 can then query the databases 232 to obtain data that satisfies the query. This data can then be provided to the query manager 242.

At decision block 514, the query security manager 244 can determine whether the user has permission, or is authorized, to access the data that satisfies the query. Determining whether the user has permission to access the data may be based on any type of factor that can be used to determine whether a user can access data. For example, the determination may be based, at least in part, on the user's credentials, the user's permissions, a security level associated with the data, etc. In some cases, the data repository engine 222 may perform the decision block 514 as part of the process associated with the block 512.

If the query security manager 244 determines that the user does not have permission to access the data, the query security manager 244 rejects the user query at block 516. In some cases, rejecting the user query may include informing the user that the query is not authorized and/or that the user is not authorized to access the data associated with the query. In other cases, rejecting the user query may include doing nothing or presenting an indication to the user that no data satisfies the user's query.

If the query security manager 244 determines that the user does have permission to access the data, the user interface 240 provides the user with access to the data at block 518. Providing the user with access to the data can include presenting the data on a webpage, in an application-generated window, in a file, in an email, or any other method for providing data to a user. In some cases, the data may be copied to a file and the user may be informed that the data is ready for access by, for example, providing the user with a copy of the file, a link to the file, or a location associated with the file.

With some queries, a user may be authorized to access some data that satisfies the query, but not other data that satisfies the query. In such cases, the user may be presented with the data that the user is authorized to access. Further, the user may be informed that additional data exists that was not provided because, for example, the user was not authorized to access the data. In other cases, the user may not be informed that additional data exists that was not provided.

In some embodiments, the decision block 514 and block 516 may be optional. For example, in some cases where the search parameters available to a user are based on the user's permissions, decision block 514 may be superfluous. However, in other embodiments, both the search parameters available to the user and the data the user can access are independently determined based on the user's permissions.

Advantageously, in certain embodiments, the process 500 can be used to identify new information and/or to determine trends that would be more difficult or identify or not possible to identify based on a single data source. For example, the process 500 can be used to identify the most productive and least productive employees of an organization based on a variety of metrics. Examining a single data source may not provide this information because employees serve different roles. Further, different employees are unproductive in different ways. For example, some employees may spend time an inordinate amount of time on social networking sites or emailing friends. Other employees may procrastinate by playing games or by talking in the kitchen. Thus, examining only email use or Internet activity may not provide an accurate determination of which employees are more productive. In addition, some employees can accomplish more work in less time than other employees. Thus, to determine which employees are the most productive during working hours requires examining a number of data sources. The BIM system 130 makes this possible by enabling a user to generate a query that relates the amount of time in the office to the amount of time spent procrastinating at different types of activities to the number of work-related tasks that are accomplished.

As a second example, the BIM system 130 can be used to identify the salespersons and the communications techniques that are most effective for each customer. For instance, a user can generate a query that relates sales, the method of communication, the content of communication, the salespersons contacting each of the customers, and the customers. Based on the result of this query, a manager may be able to determine that certain salespersons generate larger sales when using a particular communication method with a particular customer while other salespersons may be more effective with a different communication method with the particular customer or may be more effective with other customers.

An additional example of an application of the BIM system 130 can include gauging employee reaction to an executive memorandum or a reorganization announcement. Queries can be generated to access all communications associated with the memorandum or announcement. Alternatively, or in addition, queries can be generated to identify the general mood of employees post memorandum or announcement. These queries can examine the tone of emails and other communications (e.g., social networking posts, etc.). Additional examples of applications for using the BIM system 130 can include determining whether employees are communicating with external sources in a manner that adheres to corporate policies, communicating with customers in a timely fashion, or accessing data that is unrelated to their job role.

Example of a Heuristics Engine

Figure 6:
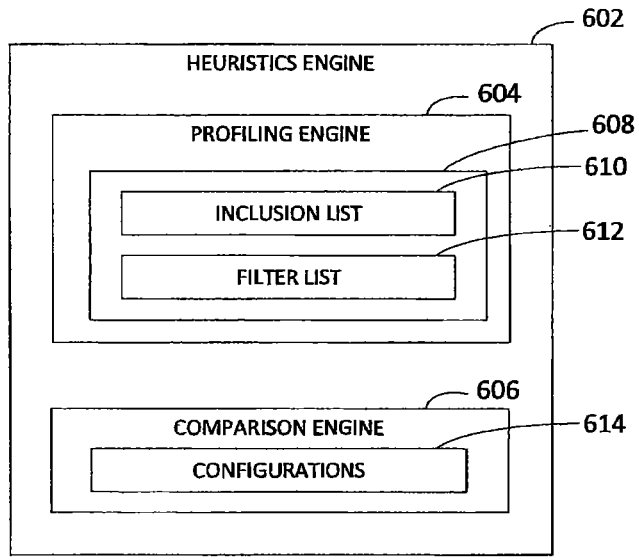
FIG. 6 illustrates an example of a heuristics engine.

FIG. 6 illustrates an example of a heuristics engine 602. In a typical embodiment, the heuristics engine 602 operates as described with respect to the heuristics engine 230 of FIG. 2. In a typical embodiment, the heuristics engine 602 is operable to perform a heuristics analysis for each of a plurality of different classifications and thereby reach a classification result for each classification. The classification result may be, for example, an indication whether a given classification should be assigned to given data. For purposes of simplicity, the heuristics engine 602 may be periodically described, by way of example, with respect to a single classification.

The heuristics engine 602 includes a profiling engine 604 and a comparison engine 606. In a typical embodiment, the profiling engine 604 is operable to develop one or more profiles 608 by performing, for example, a multivariate analysis. For example, in certain embodiments, the one or more profiles 608 may relate to what constitutes a personal message. In these embodiments, the profiling engine 604 can perform a multivariate analysis of communications known to be personal messages in order to develop the one or more profiles 608. In some embodiments, the one or more profiles 608 can also be manually established.

In typical embodiment, the one or more profiles 608 can each include an inclusion list 610 and a filter list 612. The inclusion list 610 can include a list of tokens such as, for example, words, that have been determined to be associated with the classification to which the profile corresponds (e.g., personal message, business message, etc.). In a typical embodiment, for each token in the inclusion list 610, the appearance of the token in a communication makes it more likely that the communication should be assigned the classification. The filter list 612 can include a list of tokens such as, for example, words, that have been determined to have little to no bearing on whether a given communication should be assigned the classification. In some embodiments, the filter list 612 may be common across all classifications.

In certain embodiments, the inclusion list 610 may be associated with statistical data that is maintained by the profiling engine 604. Based on the statistical data, the one or more profiles 608 can provide means, or expected values, relative to the inclusion list 610. In some embodiments, the expected value may be based on an input such as a length of a given communication (e.g., a number of characters or words). According to this example, the expected value may be an expected number of "hits" on the inclusion list 610 for a personal message of a particular length. The particular length may correspond to a length of the given communication. By way of further example, the expected value may be an expected percentage of words of a personal message that are "hits" on the inclusion list 610. Optionally, the expected percentage may be based on a length of the given communication in similar fashion to that described above with respect to the expected number of "hits."

The comparison engine 606 is operable to compare data to the one or more profiles 108 based on configurations 614. The configurations 614 typically include heuristics for establishing whether data should be classified into the classification. In particular, the configurations 614 can include one or more thresholds that are established relative to the statistical data maintained by the profiling engine 604. For example, each threshold can be established as a number of standard deviations relative to an expected value.

For example, continuing the personal-message classification example described above, the configurations 614 may require that an actual value of a given metric for a new communication not be more than two standard deviations below the expected value of the given metric. In this fashion, if the actual value is not more than two standard deviations below the expected value, the new communication may be assigned the classification. The given metric may be, for example, a number or percentage of "hits" as described above.

Example of a Heuristics Process

Figure 7:
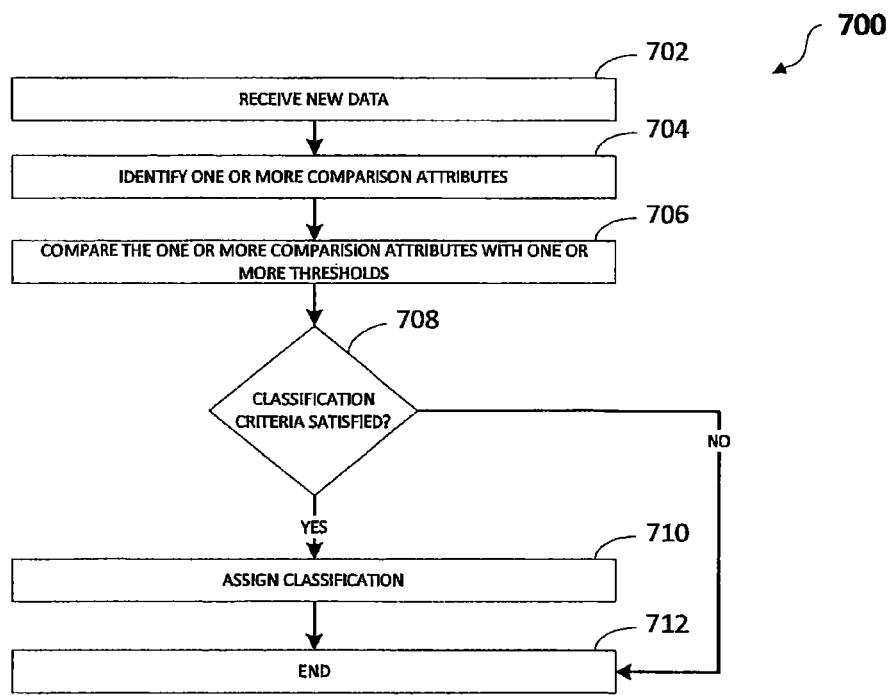
FIG. 7 presents a flowchart of an example of a heuristics process.

FIG. 7 presents a flowchart of an example of a heuristics process 700 for classifying data into a classification. The process 700 can be implemented by any system that can classify data and/or metadata. For example, the process 700, in whole or in part, can be implemented by a heuristics engine such as, for example, the heuristics engine 230 of FIG. 2 or the heuristics engine 602 of FIG. 6. In some cases, the process 700 can be performed generally by the BIM system 130. Although any number of systems, in whole or in part, can implement the process 700, to simplify discussion, the process 700 will be described in relation to the heuristics engine. The process 700 begins at step 702.

At step 702, the heuristics engine receives new data. The new data may be considered to be representative of any data, inclusive of metadata, for which classification is desired. The new data may be, for example, a new communication. From step 702, the process 700 proceeds to step 704. At step 704, the heuristics engine identifies one or more comparison attributes in the new data. For example, the one or more comparison attributes may be actual values for given metrics such as, for example, a number or percentage of "hits" on an inclusion list such as the inclusion list 610 of FIG. 6. From step 704, the process 700 proceeds to step 706.

At step 706, the heuristics engine compares the one or more comparison attributes with one or more thresholds. The one or more thresholds may be defined as part of configurations such as, for example, the configurations 614 of FIG. 6. From step 706, the process 700 proceeds to step 708. At step 708, the heuristics engine determines whether classification criteria has been satisfied. In a typical embodiment, the classification criteria is representative of criteria for determining whether the new data should be assigned the classification. The classification criteria may specify, for example, that all or a particular combination of the one or more thresholds be satisfied.

If it is determined at step 708 that the classification criteria not been satisfied, the process 700 proceeds to step 712 where the process 700 ends without the new data being assigned the classification. If it is determined at step 708 that the classification criteria has been satisfied, the process 700 proceeds to step 710. At step 710, the heuristics engine assigns the classification to the new data. From step 710, the process 700 proceeds to step 712. At step 712, the process 700 ends.

Example of Query Packages

In certain embodiments, data queries as described with respect to FIGS. 1-5 may also be accomplished using query packages. A query package generally encapsulates package attributes such as, for example, search parameters as described above with respect to queries, as long with other package attributes that enable enhanced functionality. For example, a query package can further encapsulate a package attribute that specifies a type of data visualization that is to be created using the queried data. The type of data visualization can include, for example, scatterplots, pie charts, tables, bar charts, geospatial representations, heat maps, chord charts, interactive graphs, bubble charts, candlestick charts, stoplight charts, spring graphs, and/or other types of charts, graphs, or manners of displaying data.

In some embodiments, query packages may run one specific query. In various other embodiments, query packages may run multiple queries. Table 1 below lists exemplary package attributes that can be included in a given query package.

TABLE 1

| PACKAGE ATTRIBUTE(S) | DESCRIPTION |
| --- | --- |
| Package Name | A name by which the query package can be referenced. |
| Package Description | A description of the query package's operation. |
| Security Scope | Optionally specify a security and data access policy as described with respect to FIG. 2. |
| Visualization | Specifies a type of data visualization such as, for example, scatterplots, pie charts, tables, bar charts, geospatial representations, heat maps, chord charts, interactive graphs, bubble charts, candlestick charts, stoplight charts, spring graphs, and/or other types of charts, graphs, or manners of displaying data. In cases where the package is representative of multiple queries, the visualization attribute may be represented as an array of visualizations that can each have a visualization type, a data source, and a target entity (e.g., entity that is being counted such as, for example, messages, message participants, etc.) |
| Default Group-By Field | Retrieves data according to, for example, one or more data columns (e.g., by location, department, etc.). |
| Aggregation Period | A time period such as, for example, daily, hourly, etc. |

TABLE 1-continued

| PACKAGE ATTRIBUTE(S) | DESCRIPTION |
| --- | --- |
| Data-Smoothing Attributes | Specifies one or more algorithms that attempt to capture important patterns in the data, while leaving out noise or other fine-scale structures/rapid phenomena. |
| Visualization-Specific Attributes | Certain types of visualizations may require additional attributes such as, for example, specification of settings for sorting, number of elements in a data series, etc. |
| Facet Names | Data (or fields) related to the query that can be used to categorize data. Particular values of facets can be used, for example, to constrain query results. |
| Array of Entities | An array of entities that can each have, for example, a name, entity type (e.g., message), filter expression, and a parent-entity property. |
| Array of Facets | An array of facets that can each have, for example, a name, group-by field, and a minimum/maximum number of results to show. |

In a typical embodiment, query packages can be shared among users or distributed to users, for example, by an administrator. In a typical embodiment, one user may share a particular query package with another user or group of users via the user interface 240. In similar fashion the other user or group of users can accept the query package via the user interface 240. Therefore, the query manager 242 can add the shared query package for the user or group of users. As described above, the query manager 242 generally maintains each user's query packages in a table by a unique identifier. In a typical embodiment, query packages further facilitate sharing by specifying data and data sources in a relative fashion that is, for example, relative to a user running the query. For example, package attributes can refer to data owned by a user running the query or to data that is owned by users under the supervision of the user running the query rather than to specific data or users.

Example Data Query Process Using Query Packages

Figure 8:
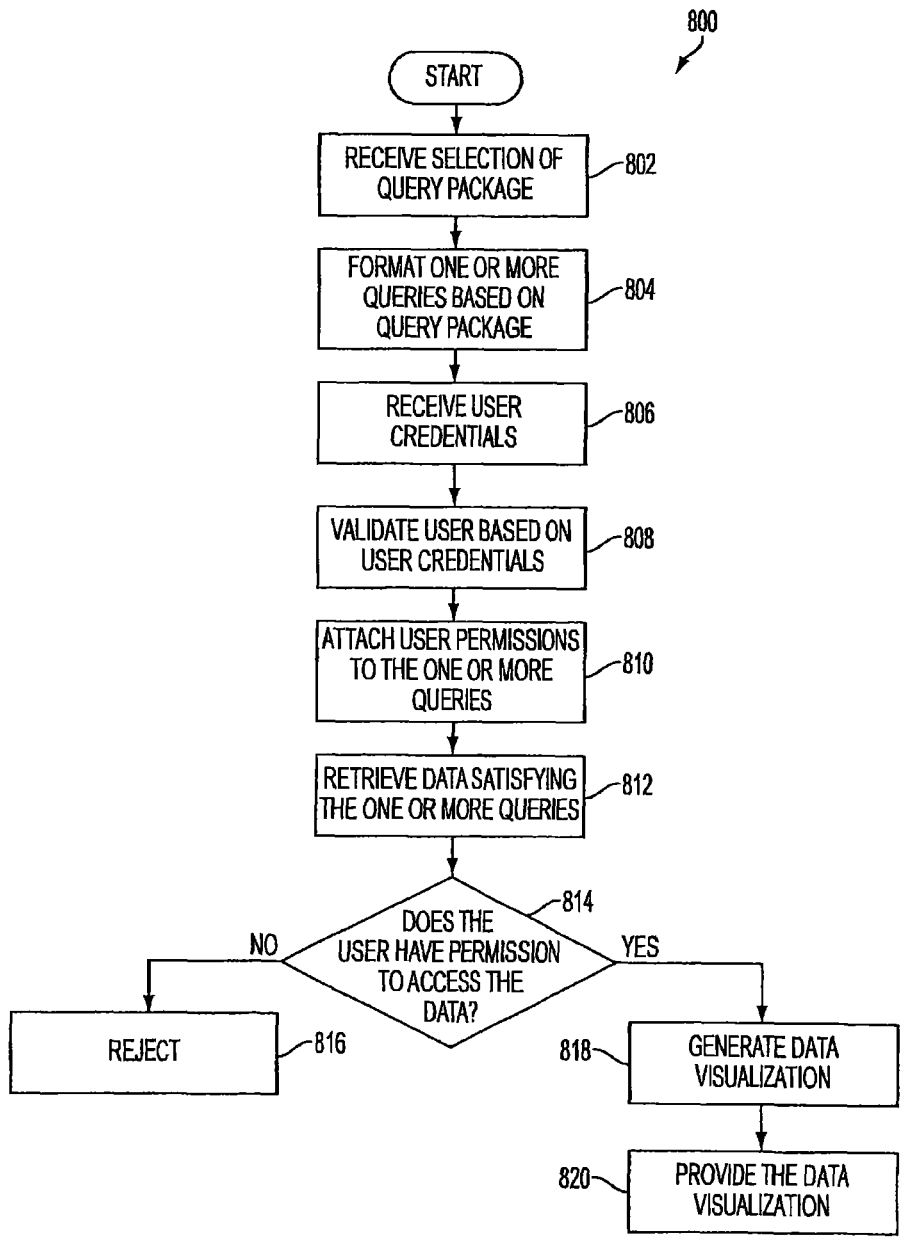
FIG. 8 presents a flowchart of an example of a data query process.

FIG. 8 presents a flowchart of an example of a data query process 800 that uses query packages. The process 800 can be implemented by any system that can process a query package provided by a user or another system and cause the results of a query encapsulated therein to be presented to the user or provided to the other system. For example, the process 800, in whole or in part, can be implemented by one or more of the BIM access system 136, the user interface 240, the query manager 242, and the query security manager 244. In some cases, the process 800 can be performed generally by the BIM system 130. Although any number of systems, in whole or in part, can implement the process 800, to simplify discussion, the process 800 will be described in relation to specific systems or subsystems of the BIM system 130.

The process 800 begins at block 802 where, for example, the user interface 240 from a user a selection of a query package. In various embodiments, the query package may be selected from a list or graphical representation of query packages. As described above, the query package typically specifies a data visualization based on a data query. In various embodiments, the query package may specify more than one data visualization and/or be based on more than one data query. At block 804, the query manager 242 formats one or more queries based on the query package selected at block 802. In certain embodiments, the block 804 may be optional. For example, in some cases the query package may already include a query that can be processed by the BIM system 130 without modification.

At block 806, the user interface 240 receives one or more user credentials from the user. In some cases, the user credentials may be received from an application. The user credentials can include any type of credential or identifier that can be used to identify a user and/or determine a set of permissions or a level of authorization associated with the user. At block 808, the query security manager 244 can validate the user, or application, based at least in part on the user credentials received at the user interface 240. Validating the user can include identifying the user, identifying permissions associated with the user, the user's role, and/or an authorization level associated with the user. In some embodiments, if the query security manager 244 is unable to validate the user or determines that the user lacks authorization to access the BIM system 130 and/or query the databases 232, the query security manager 244 may reject the one or more queries. Further, the user interface 240 may inform the user that the user is not authorized to access the BIM system 130 or to query the databases 232. In some implementations, if the user identifies as a guest or if the query security manager 244 is unable to validate the guest, the user may be associated with a guest identity and/or a set of guest permissions, which may permit limited access to the BIM system 130 or the data stored at the databases 232. In some cases, a guest may receive full access to the BIM system 130. However, the actions of the guest may be logged or logged differently than the actions of an identified user.

At block 810, the query security manager 244 attaches the user permissions to the one or more queries. Alternatively, or in addition, the query security manager may attach the user's identity, role, and/or authorization level to the one or more queries. In some embodiments, one or more of the blocks 806, 808, and 810 may be optional.

At block 812, the query manager 242 retrieves data, and/or metadata, satisfying the one or more queries. In some implementations, the block 812 may include providing the one or more queries to the data repository engine 222 for processing. The data repository engine 222 can then query the databases 232 to obtain data that satisfies the one or more queries. This data can then be provided to the query manager 242.

At decision block 814, the query security manager 244 can determine whether the user has permission, or is authorized, to access the data that satisfies the one or more queries. Determining whether the user has permission to access the data may be based on any type of factor that can be used to determine whether a user can access data. For example, the determination may be based, at least in part, on the user's credentials, the user's permissions, a security level associated with the data, etc. In some cases, the data repository engine 222 may perform the decision block 814 as part of the process associated with the block 812.

If the query security manager 244 determines that the user does not have permission to access the data, the query security manager 244 rejects the one or more queries at block 816. In some cases, rejecting the one or more queries may include informing the user that the query package not authorized and/or that the user is not authorized to access the data associated with the query package. In other cases, rejecting the one or more queries may include doing nothing or presenting an indication to the user that no data satisfies the query package.

If the query security manager 244 determines that the user does have permission to access the data, the query manager 242 (or a separate visualization component) generates the data visualization at block 818. At block 820, the user interface 240 provides the data visualization to the user. Providing the user the data visualization can include presenting the data visualization on a webpage, in an application-generated window, in a file, in an email, or any other method for providing data to a user. In some cases, the data visualization may be copied to a file and the user may be informed that the data visualization is ready for access by, for example, providing the user with a copy of the file, a link to the file, or a location associated with the file.

FIG. 9 illustrates an example of a user interface that can be used by a user to select a query package.

FIG. 10 illustrates an example of a user interface that can be used by a user to create or modify a query package.

Example of a Data Model

Table 2 below provides an example of a data model that can be utilized by a BIM system such as, for example, the BIM system 130. In particular, Table 2 illustrates several entities that can be used to model communications such as, for example, personal communications or business communications.

TABLE 2

| ENTITY | FIELD | DATA TYPE |
|---|---|---|
| Message | Body | String |
|  | Classifications | Strings |
|  | Content | String |
|  | Date | Date Time |
|  | External Recipients | Entities (Message Participant) |
|  | File Attachments | Entities (File) |
|  | In reply to | Entity (Message) |
|  | Internal Recipients | Entities (Message Participant) |
|  | Is Encrypted | Boolean |
|  | Message Attachments | Entities (Messages) |
|  | Message IDs | Strings |
|  | Original Message ID | String |
|  | Participants | Entities (Message Participant) |
|  | Platform | Enum |
|  |  | (Message Platform type) |
|  | Recipients | Entities (Message Participant) |
|  | Send Date | Date Time |
|  | Send Time of Day | Time |
|  | Sender | Entity (Message Participant) |
|  | Size | Integer |
|  | Subject | String |
|  | Thread | Entity (Message Thread) |
|  | Type | Enum |
|  |  | (Message Address Type) |
| Message | Date | Date Time |
| Participant | Deletion Date | Date Time |
|  | Delivery Time | Time Span |
|  | Has Been Delivered | Boolean |
|  | ID | String |
|  | Is Addressed in BCC | Boolean |
|  | Is Addressed in CC | Boolean |
|  | Is Addressed in TO | Boolean |
|  | Is External Recipient | Boolean |
|  | Is Internal Recipient | Boolean |
|  | Is Recipient | Boolean |
|  | Is Sender | Boolean |
|  | MessgeAsSender | Entity (Message) |
|  | MessageAsInternalRecipient | Entity (Message) |
|  | MessageAsExternal Recipient | Entity (Message) |
|  | Message Address | Entity (Message Address) |
|  | Person | Entity (Person Snapshot) |
|  | Receipt Date | Date Time |
|  | Receipt Time of Day | Time |

TABLE 2-continued

| ENTITY | FIELD | DATA TYPE |
|---|---|---|
|  | Responses | Entity (Message) |
|  | Response Time | Time Span |
| Message | Domain | Entity (ONS Domain) |
| Address | Is External | Boolean |
|  | Is Internal | Boolean |
|  | Name | String |
|  | Platform | Enum |
|  |  | (Message Platform Type) |
|  | Type | Enum |
|  |  | (Message Address Type) |
| DNS | Name | String |
| Domain | Address | Entities (Messaging Address) |
| Person | All Reports | Entities (Person Snapshot) |
| Snapshot | Company | String |
|  | Department | String |
|  | Direct Reports | Entities (Person Snapshot) |
|  | First Name | String |
|  | Full Name | String |
|  | History | Entity (Person History) |
|  | ID | String |
|  | Initials | String |
|  | Job Title | String |
|  | Last Name | String |
|  | Manager | Entity (Person Snapshot) |
|  | Managers | Entities (Person Snapshot) |
|  | Messaging Addresses | Entities (Message Address) |
|  | Message Participants |  |
|  | Office | String |
|  | OU | String |
|  | Snapshot Date | Date Time |
|  | Street Address | Complex Type |
|  |  | (Street Address) |
|  | Telephone Numbers | Strings |
| Street | City | String |
| Address | Country or Region | String |
|  | PO Box | String |
|  | State or Province | String |
|  | Street | String |
|  | Zip or Postal Code | String |
| Person | Current | Entity (Person) |
| History | Historic | Entities (Person) |
|  | ID | String |
|  | Messages | Entities (Message) |
|  | Timestamp | Date Time |
| Message | ID | String |
| Thread | Messages | Entities (Message) |
|  | Participants | Entities (Message Participant |
|  | Thread subject | String |
|  | Timestamp | Date Time |
| File | Filename | String |
|  | ID | String |
|  | Messages | Entities (Message) |
|  | Modified Date | Date Time |
|  | Size | Integer |
|  | Hash | String |

Examples of Utilization of a BIM Access System

Table 3, Table 4, and Table 5 below provide several examples of how a BIM access system such as, for example, the BIM access system 136, can be utilized. In various embodiments, each example may be implemented as user-generated queries or query packages as described above. In particular, Table 3 illustrates uses cases for gleaning operational insights. Table 4 illustrates use cases for gleaning business insights. Table 5 illustrates uses cases for gleaning compliance insights.

TABLE 3

| USE CASE | USER PERSONA | POTENTIAL OBJECTIVE(S) | INPUT | OUTPUT |
|---|---|---|---|---|
| Find Lost Message | Helpdesk Personnel | 1. Help a mail user unders7tand why they (or a recipient) apparently | Sender name, recipient name, | Indication whether message |

TABLE 3-continued

| USE CASE | USER PERSONA | POTENTIAL OBJECTIVE(S) | INPUT | OUTPUT |
|---|---|---|---|---|
| (Helpdesk) | | didn't receive a message; 2. Help that user prove whether the message was delivered or not, or whether message was caught by junk filter; and 3. Escalate the problem to IT if there is a system problem. | message date range, and message subject. | was delivered and, if not, a location of where message was last located. |
| Find Lost Message (Self-Service) | Mail User | 1 Understand why someone apparently didn't receive a message I sent them. 2. Discover whether the message was actually delivered. 3. Report a system problem to IT if necessary. | Sender name, recipient name, message date/time, message subject | Was message delivered or is it in transit |
| Track Anticipated Message | Mail User | 1. Determine whether a specific person sent a message that was expected to be sent. 2. Determine whether the message was actually sent, or lost in transit. | Sender name, recipient name, message date range | Was message sent and delivered or is it in transit |
| Measure Internal Mail Delivery time Compliance | IT Manager | 1. Track the average and maximum message delivery times of internal mail system. | Source (mailbox/site), target (mailbox/site) | Textual output of compliance results, drill-into the "Analyze Internal Mail Delivery Times" scenario (and accompanying charts) to find out where your SLA was NOT met. |
| Analyze Internal Mail Delivery Times | Messaging Administrator | 1. Show and trend the delivery times between internal servers. 2. Identify problem areas, or future problem areas, regarding inter-organization mail delivery. | Source (mailbox/site), target (mailbox/site), filter (maximum delivery time between 2 end-points) | Trend charts of overall, site to site, or server to server average/maximum delivery times |
| Diagnose Slow or Lost Delivery for a Particular Message | Messaging Administrator | 1. Investigate why a particular message was slow to be delivered. 2. Determine whether there is a problem with the mail system 3. Take any necessary corrective action, | Sender, recipient, message date/time, subject wildcard, Filter on message header (including x-headers) | Details of message delivery path and timing |
| Compare and Trend Usage across Communication Systems | IT Manager, Executive | 1. Regularly compare and trend the usage of different communications systems. 2. Perform capacity planning and make infrastructure investment decisions. 3. Track changes in user behavior to communication usage directives. | Date range, data sources (Exchange, Lync/OCS), users (department/site) | Trend of relative platform usage over time, point-in-time chart |
| Analyze Non-Delivery Reports (NDR's) | Messaging and Messaging Administrator | 1. Show point-in-time, and trending, of an aggregate number and type of NDRs (e.g., rejected, bounced, blocked, email error). 2. Detect and troubleshoot NDR issues with my messaging system, and identify trends BIM | Date time range, target domain, site, server, sender | Table with aggregate numbers by type, Charts for trending of NDRs by type, Optimal: Pivot Viewer to slice- and-dice the data (which senders are generating NDR's, etc . . . to help you diagnose the problem) |
| View List of Messages Details of a Message Stats Report | Messaging Administrator, Management | 1. Drill into the details of a message report to see a list of messages sent or received by a particular user. 2. Perform light-weight auditing and forensics. 3. Further understand the message report (e.g., what is the subject of messages going to a particular email domain). | Date range, mailbox, type of message (sent or received) | List of messages and corresponding details |
| Ensure Encrypted | Messaging Administrator, | 1. Understand who and how many encrypted messages are being sent on | "Network" (identified by | Show me all encrypted |

TABLE 3-continued

| USE CASE | USER PERSONA | POTENTIAL OBJECTIVE(S) | INPUT | OUTPUT |
|---|---|---|---|---|
| Message Usage | Management | which network.<br>2. Track adherence to corporate policy on encrypted message use. | domain, ip-subnet, ip-address). Recipient, date range. | messages that didn't meet the criteria. Volume number + textual output of messages in violation |
| Understand Connector Capacity and Distribution | Messaging Administrator | 1. See aggregate number of messages and specific message-level details being sent or received over a particular MTA, where MTA can be, for example, an Exchange Server (2003 Front-End or 2007 HUB Transport) or Exchange HUB Receive Connector.<br>2. Understand how busy the connectors are and plan for over/under saturated connectors accordingly.<br>3. Report on which external peripheral mail servers and other systems are sending messages over which connectors. | Filter (DSN or NDR, External vs. Internal), Date time range, Exchange Server or Connector and Edge servers | Aggregate message counts by connector (chart), individual message details (including client-ip, client-hostname, server-ip, server-hostname, connector-id, event-id, recipient-address, total-bytes, recipient-count, sender-address, message-subject), Topology Visualization |
| Troubleshoot Connector Message Flow | Messaging Administrator | 1. See real-time message activity across connectors.<br>2. Troubleshoot a message flow issue which could be caused by either a connector issue or an external event (e.g. DOS attack, SPAM, looping message). | Exchange Server or Connector and Edge servers, inbound or outbound, domain or queue (associated with the connector). | Aggregate message counts by connector (chart), individual message details (including client-ip, client-hostname, server-ip, server-hostname, connector-id, event-id, recipient-address, total-bytes, recipient-count, sender-address, message-subject), Topology Visualization |
| Understand User Client Usage | IT Manager, Messaging Administrator, Executives | 1. Compare usage across messaging clients (Outlook/OWA/BlackBerry/ActiveSync). Understand usage of desktop vs. mobile and justify ROI where necessary, possible risk mobile assessment usage.<br>2. Determine whether people are trending towards not using desktop computers. | Date time range, users, groups, devices | Aggregate numbers for users and groups, Charting, Trending, Comparison across users and groups, Pivot Viewer |
| Understand Mobile Infrastructure Usage | Messaging Administrator | 1. Understand mobile (e.g., BlackBerry, ActiveSync) usage on my messaging infrastructure Perform capacity planning for my mobile growth | Server End-points, Date time range, devices | Overall aggregate numbers for end-point, Trending |
| Understand Usage of "Special" Messages (using message headers) | Messaging Administrator | 1. Find all the messages that have originated from specific end-user mail clients or servers.<br>2. Assess risks or determine usage. Special messages generally have particular metadata in the X-Headers such as mail classification. | Date time range, users, specific message header information | Charts, pivots of aggregate numbers, aggregate trends, List of messages and details, message volumes grouped by header information. |
| Search for "Special Messages" (customer defined) | Messaging Administrator | 1. Find all the messages that have particular message header criteria<br>2. Discover messages sent from non-Exchange servers and flexible specific message searches. | Date time range, major header fields (date/time, sender, recipient(s), subject, etc . . .) | List of messages and details |
| Alert on Abnormal Message Volume | Messaging Administrator | 1. Learn about abnormal message volumes for a user, server, connector, or queue.<br>2. Be alerted of a potential problem | Date time range, server/queue, connector, use | Notification |

TABLE 3-continued

| USE CASE | USER PERSONA | POTENTIAL OBJECTIVE(S) | INPUT | OUTPUT |
|---|---|---|---|---|
| | | and investigate (see next scenario). | | |
| Investigate Abnormal Message Volume | Messaging Administrator | 1. Investigate a period of abnormal message volume (could be on a user, server, connector, or a queue). Determine if it's spam being received or sent or some other problem that needs to be addressed. | Date time range, target filter (server, queue, user, filter) | Topology, list of messages with details, message volumes grouped by time |
| Investigate Potential Spam Messages Originating from my Organization | Messaging Administrator | 1. Investigate suspicious messages being sent from within my organization (open relay or spoofed header). Are messages being sent with open relays within my organization? 2. Stop abusive behavior by users. | Date time range | List of messages and message details, server/relay involved, client IPs |
| View Internal Infrastructure Distribution | IT Manager, Messaging Administrator | 1. Understand the load distribution of my internal messaging infrastructure components (servers, stores, connectors). Budget for growth accordingly and optimize perfomiance. | Infrastructure components (user defined), date range | Topological View, Charts for trending of messages load |

TABLE 4

| USE CASE | USER PERSONA | POTENTIAL OBJECTIVE(S) | INPUT | OUTPUT |
|---|---|---|---|---|
| Understand User Response Times | Manager | 1. Track average and maximum response times of members of my department (or another group) to "customer" messages overtime. 2. Track compliance against my customer SLA's. 3. Identify areas for improvement and measure performance. | List of mailboxes, AD groups, filters (such as types of messages, internal vs. external, recipient domains), date range | Trending with charts with overall or individual response times, list of messages (including message level details), Pivot Table to explore |
| Investigate Employee Communications | Manager, Messaging Administrator | 1. Review all communications between one of my employees and another user or domain Respond to a complaint or review the usage of my employee for HR purposes | Target user, types of messages to include/exclude, date range | Details of all communications by my employee (list of messages and the ability to access message level details) |
| Measure User Productivity | Manager | 1. Track and compare the productivity profiles (volume of messages sent and received and the response times) of my employees and groups of employees. 2. Gain insight into my employees' time and performance as it pertains to messaging usage. 3. Compare productivity from a messaging perspective of users within a group. Identify areas for improvement. | List of mailboxes or AD groups, a selected group of employees that can be compared | Productivity report (message volumes and response times) and trending, statistics such as averages, pivot for exploring |
| Track After-Hours Communications | Manager, Administrator | 1. Regularly review a list of messages that arrive during a certain time of day. 2. Bill my customers extra for after-hours support. 3. Audit the usage of the messaging system after hours. 4. Look at my messaging load during a specific time of day. | Customer Definition of 'Time of Day', Senders, recipients, message date range, time of day range, message filter defining what types messages to include (i.e. don't include SPAM messages) | Text - list of messages (with details), volume report, ability export |
| Track Outlook Categorization & Flag | Manager | Report on user Outlook Category and Flag usage. Measure adherence to business or workflow processes and directives. | Recipients, Category and/or Flag, Date Range, Message Filter (type of messages to include) | Aggregate ratios, Charts to trend of overall or individual Outlook category usage, trend individual |

TABLE 4-continued

| USE CASE | USER PERSONA | POTENTIAL OBJECTIVE(S) | INPUT | OUTPUT |
|---|---|---|---|---|
| | | | | Categories, ability to drill into individual messages, Pivot Table to explore the categories use among groups and individuals. |
| Track User Outlook Actions | | 1. Track by status of tasks (usage number per each status available). 2. Track task of attaching pictures, images and attachments to a task in Outlook. 3. Track by address types and phone types (usage number per each address/phone type. 4. Track Untimed tasks in Outlook (e.g., where start date and due date is equal to none. 5. Determine average activities and tasks created per day. 6. Ascertain the current usage of notes in Outlook. For example, can we get examples of what people are putting in the notes section? 7. Track the journal capability attached to contacts in Outlook. Is anyone using this? Can we get examples of this? | | |
| Audit Adherence to Message Addressing Rules | Manager | 1. Check if a particular type of message (TBD by the customer) is being sent to the appropriate people as per a predefined business process 2. Track adherence to company policy | Type of message (i.e. class definition, e.g. subject string identifier), recipient, recipient addressing type (BCC, CC), sender, date range List of messages (daily/weekly reports), list of non-compliant users, aggregate volume | List of messages (daily/weekly reports), list of non-compliant users, aggregate volume |
| View Customer, Partner and Competitive Communications (Distribution & Trends) | Manager, Executive | 1. View the distribution of messages for specified recipients and external domains over a given period. 2. Understand my communications with Customers, Partners, and Competitors. For example, determine who is my business talking to and why. 3. Understand the relationship with your customers, partners, and competitors. | Recipients, sender, date range, defined recipient groups and/or external domains | Charts for trend of messages volume (all or top 10), messages from pre-defined group, group by recipients or domains, Pivot Viewer for exploring the data. |
| Audit Customer, Partner or Competitive Communications | Manager, Executive | 1. View message details of communication with a specific partner, customer, or competitor 2. Audit or understand my company's communication on a particular partner, customer, or competitor event or issue. | Recipients, sender, date range, defined recipient groups and/or external domains | Message List and Details |
| Understand Personal Messaging System Use | Management, Messaging Administrator | 1. Understand the distribution of messages going to and from personal messaging systems such as Yahoo!, Hotmail, and Gmail. 2. Measure employee productivity and gauge use and misuse of the corporate messaging system. 3. Identify usage trends. | Personal messaging system (as defined by the user), recipients, sender, date range, defined recipient groups and/or external domains | Charts for trend of messages volume (all or top 10), messages from pre-defined group, group by recipients or domains, Pivot Viewer to find out top personal messaging users/groups, etc. |

TABLE 4-continued

| USE CASE | USER PERSONA | POTENTIAL OBJECTIVE(S) | INPUT | OUTPUT |
|---|---|---|---|---|
| View Relayed Traffic | Management | 1. As a messaging provider, understand volumes of re-routed messages.<br>2. Understand how my messaging business is performing. | Message type (filter of messages to include), Date range | Charts for trending aggregate volume |
| Understand Communication Patterns in my Organization | Manager | 1. View communication trends between users and groups in my organization; includes multiple communication platforms.<br>2. Compare the number of messages sent to a particular users, divided by TO:, CC:, BCC:<br>3. Understand how my business is operating (e.g. what "silo groups" exist, which groups are talking to most to each other).<br>4. Understand how my business is adhering to corporate directives. | Target Users and Groups, date range, Message Type Filter | Charts for trending of messages volume, Topological Views, Pivot View |
| Understand the Usage of Different Types of Messages | Management, IT Manager | 1. Trend and see the use of different types of messages in my messaging system.<br>2. Determine the ratio of internal vs. external communication.<br>3. Get insight into specific business usage of my messaging system. | Message Type (user defined), Date range | Charts for trends of different types of messages, Pivot Viewer |
| Assess Mobile Data Leakage Risk | Management | 1. See what messages were stored or sent from a mobile device.<br>2. Perform a mobile device data leakage audit. | Date range, inbound/outbound, message type (sender, recipient, etc . . ., "mobile message" is inherent) | List of message and message details. Charts for mobile message usage |
| Track Implicit Acknowledgement of Important Message | IT Manager, Management | 1. Track the percentage of employees that have received and read an important message.<br>2. Report to HR or legal the progress and completion of the distribution of the message. | Message subject, sender | Distribution of message status (received, read, deleted without being read), with the option of detailed list of status per people |
| Track Sensitive Message Leakage | HR Manager, IT Manager, Management | 1. Track the distribution path of a sensitive message.<br>2. Audit unauthorized distribution of sensitive information, | Message subject, sender, date time range, type (FWD, etc.) | Full message delivery path (people & endpoint) of the message forwarding and delivery, and actions taken by users |
| Analyze Usage of Encrypted Message | Messaging Administrator, Management | 1. Understand who, and how many encrypted messages are being sent<br>2. Ensure that the correct format is being used on my classified/non-classified networks | Recipient(s), date range | Count/ratio of encrypted messages, message-detail on encrypted messages. |

TABLE 5

| USE CASE | USER PERSONA | POTENTIAL OBJECTIVE(S) | INPUT | OUTPUT |
|---|---|---|---|---|
| Track CAN-SPAM Message Header Compliance | IT Manager, Management | 1. Alert or report whenever external messages are sent with potentially false header information (for example, From, To, Reply To or other routing information that doesn't match corporate domains or other server configurations).<br>2. Ensure that my company is adhering to CAN-SPAM requirements | Configure report (domain and other routing specifications) | Alert (email notification, dashboard). Report (sender, recipient, # of recipients, message contents) |
| Track CAN-SPAM Message Content | IT Manager, Management | 1. Alert or report whenever external messages are sent without obligatory information (Physical postal address, disclosure that message is an ad, | Configure report (enter "static" search strings) | Alert (email notification, dashboard), Report (sender, |

TABLE 5-continued

| USE CASE | USER PERSONA | POTENTIAL OBJECTIVE(S) | INPUT | OUTPUT |
|---|---|---|---|---|
| Omissions | | information on opting out of mailing list).<br>2. Ensure that my company is adhering to CAN-SPAM requirements. | | recipient, message contents, which string(s) missing) |
| Audit CAN-SPAM Compliance for 3rd Party Mailers | IT Manager, Management | 1. Ensure that a 3rd party contractor who's sending marketing messages on my (ensure verified header information and required content strings),<br>2. Ensure that my company is adhering to CAN-SPAM requirements. | Domains, routing info, required strings | Report (sender, recipient, message contents, which string(s) missing) |
| Monitor Outgoing/ Incoming Messages for Credit Card #s (PCI-DSS) | IT Manager, Management | 1. Alert or report whenever outgoing or incoming messages are sent containing unauthorized personal data (such as CC numbers).<br>2. Ensure adherence to PCI-DSS requirements. | Configure report (specify likely string formats) | Alert (email notification, dashboard), Report (sender, recipient, flagged string, report/ allow) |
| Monitor Routing of Sensitive Information | IT Manager, Management | 1. Alert or report whenever outgoing or incoming messages are sent containing specific corporate information not intended for distribution (Financial disclosures, trade secrets, IPR).<br>2. Ensure adherence to the USAPATRIOT requirements. | Configure report (specify identity strings) | Alert (email notification, dashboard), Report (sender, recipient, flagged string) |
| Monitor Overall Messaging Environment to Identify Potential Vulnerabilities | IT Manager, Management | 1. Audit the messaging infrastructure for the purpose of general risk-management and mitigation against system health Identify failures, threats, intrusions, viruses, or other vulnerabilities that may impact confidence in the integrity of the system.<br>2. Perform regular assessments of risk will assist in meeting corporate commitments for Sarbanes-Oxley/ Gramm-Leach-Billey, Basel, etc. | Report criteria, specify network components, compliance benchmarks | Executive/ Detailed Report for risk areas, overall risk benchmark, export |

II. Data Loss Prevention

In various embodiments, many of the principles described above can be further leveraged to facilitate data loss prevention (DLP). In a typical embodiment, a cross-platform DLP system as described herein enables utilization of cross-platform DLP policies. For purposes of this patent application, a DLP policy refers to a standard or guideline designed, at least in part, to prevent, detect, or mitigate data loss. By way of example, DLP policies can restrict a number or size of communications, participants in communications, contents of communications, particular communication patterns, etc.

For purposes of this patent application, a cross platform DLP policy refers to a DLP policy that can be enforced, monitored, and/or applied across multiple heterogeneous communications platforms. In many cases, the heterogeneous communications platforms may provide a certain degree of native DLP functionality. In other cases, some or all of the heterogeneous platforms may provide no native DLP functionality. To the extent native DLP functionality is provided, the heterogeneous communications platforms generally use an assortment of non-standard data structures and formats to contain a DLP policy.

Figure 11:
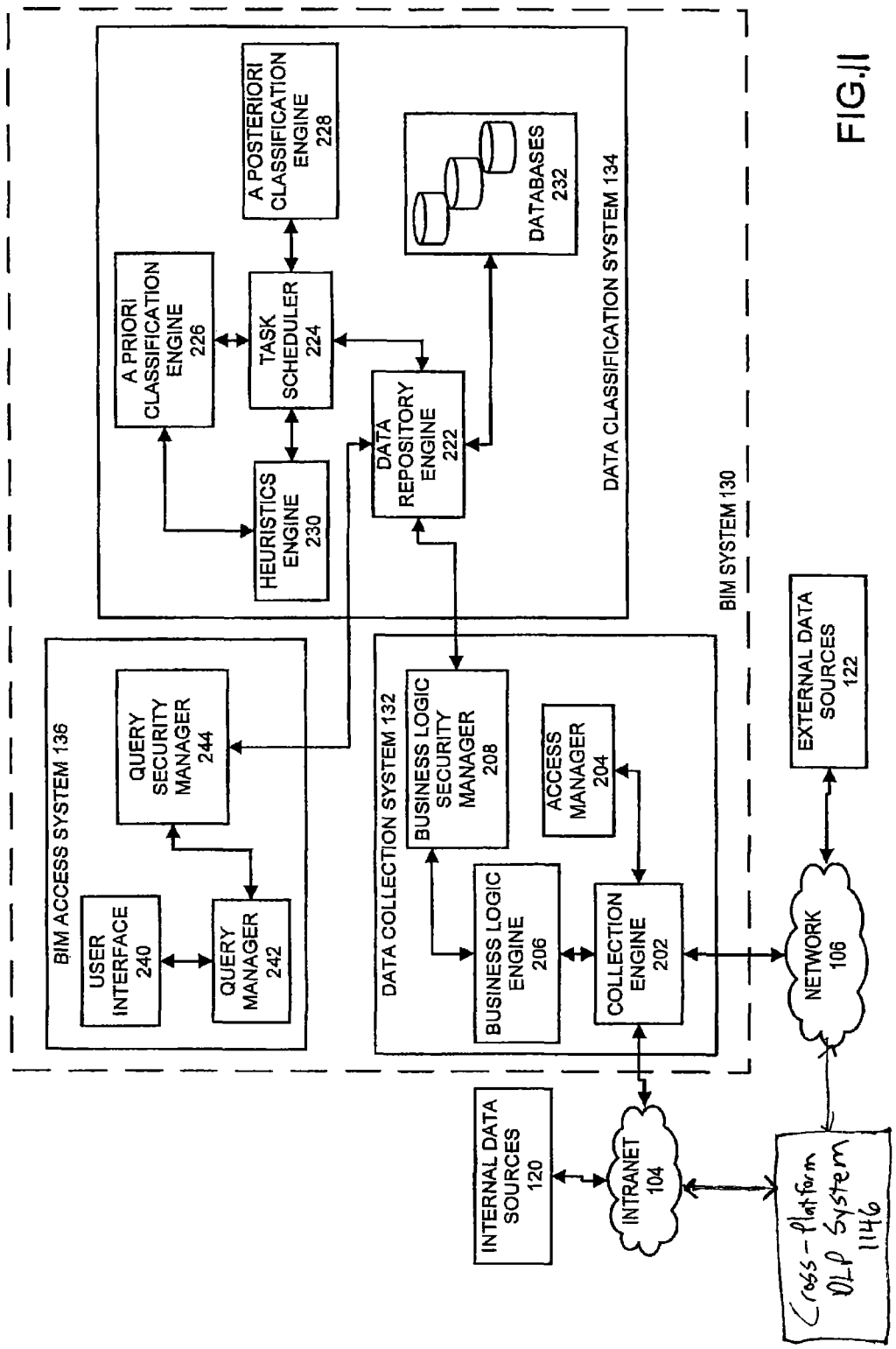
FIG. 11 illustrates an embodiment of an implementation of a system for performing data loss prevention (DLP).

FIG. 11 illustrates an embodiment of an implementation of a system 1100 for performing DLP. The system 1100 includes the BIM system 130, the internal data sources 120, the intranet 104, the network 106, and the external data sources 122. In a typical embodiment, the BIM system 130, the internal data sources 120, the intranet 104, the network 106, and the external data sources 122 operate as described above with respect to FIGS. 1-2. The system 1100 additionally includes a cross-platform DLP system 1146.

In general, each of the internal data sources 120 and each of the external data sources 122 can be considered a distinct communications platform that is internal and external, respectively. The cross-platform DLP system 1146 communicates with the internal data sources 120 over the intranet 104 and with the external data sources 122 over the network 106. In certain embodiments, the cross-platform DLP system 1146 is operable to interact with the BIM system 130 over either the intranet 104 or the network 106 as illustrated. In certain other embodiments, the cross-platform DLP system 1146 can be contained within the BIM system 130 such that no communication over the intranet 104 or the network 106 needs to occur. In general, the cross-platform DLP system 1146 collaborates with the BIM system 130, the internal data sources 120, and the external data sources 122 to implement cross-platform DLP policies. An example of the cross-platform DLP system 1146 will be described in greater detail with respect to FIG. 12.

Figure 12:
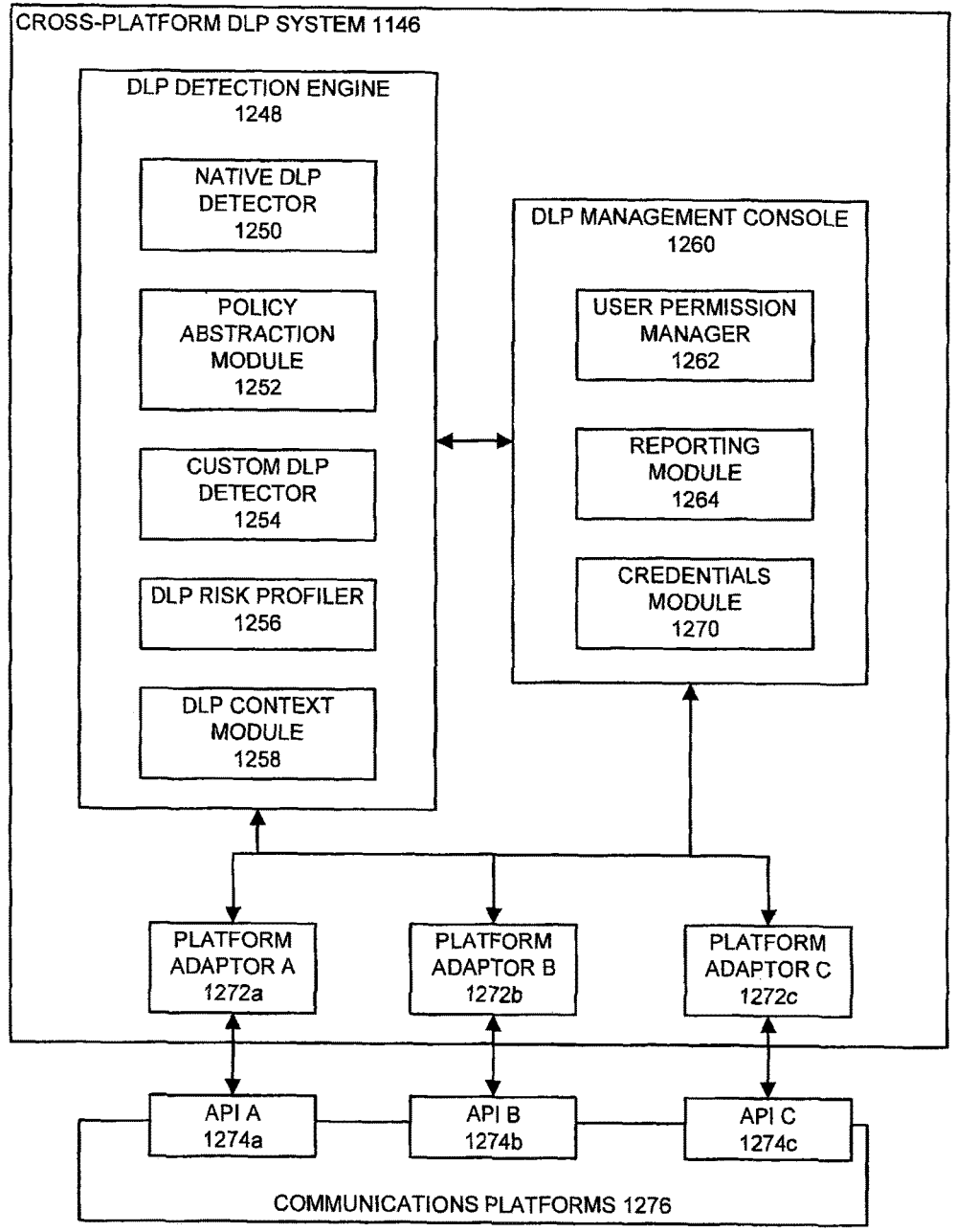
FIG. 12 illustrates an embodiment of an implementation of a cross-platform DLP system.

FIG. 12 illustrates an embodiment of an implementation of the cross-platform DLP system 1146. The cross-platform DLP system 1146 includes a DLP detection engine 1248 and a DLP management console 1260. The DLP detection engine 1248 typically performs operations that create and/or activate cross-platform DLP policies. The DLP detection engine 1248 can also monitor communications to identify violations of those cross-platform DLP policies. In a typical embodiments, the DLP management console 1260 performs operations that report and/or enforce cross-platform DLP policies responsive, for example, to violations detected by the DLP detection engine 1248.

As part of performing their respective functionality, the DLP detection engine 1248 and the DLP management console 1260 are operable to communicate with communications platforms 1276. The communications platforms 1276, in general, are representative of the internal data sources 120 and the external data sources 122 as illustrated in FIG. 11. For ease of illustration and description, the internal data sources 120 and the external data sources 122 are shown collectively as the communications platforms 1276.

In the illustrated embodiment, the communications platforms 1276 include an application programming interface (API) A 1274a, an API B 1274b, and an API C 1274c (collectively, APIs 1274). The APIs 1274 may each be considered a logical encapsulation of functions and operations provided by a distinct communications platform of the communications platforms 1276. In many cases, it may be that such functions and operations are not exposed by each of the communications platforms 1276 via a common API but rather via a plurality of native APIs and/or access interfaces. It should be appreciated that some or all of the communications platforms may not provide any API. Likewise, although the APIs 1274 are shown for illustrative purposes, it should be appreciated that the communications platforms 1276 can include any number of APIs and any number of communications platforms.

Each of the APIs 1274 provides an interface to native DLP support provided by a given communications platform of the communications platforms 1276. Examples of native DLP support that can be provided by the given communications platform include specifying a native DLP policy in a structure and format understood by that communications platform, activating a native DLP policy, implementing enforcement actions allowed by that communications platform (e.g., placing restrictions on a user or group of users), and/or the like. It should be appreciated that the APIs 1274 may not provide homogenous functionality. For example, the API A 1274a might permit certain enforcement actions but might not include any functionality for specifying and/or activating native DLP policies. Continuing this example, the API B 1274b might include all such functionality. By way of further example, different APIs of the APIs 1274 may enable different enforcement actions and/or specification or selection of different types of native DLP policies.

In a typical embodiment, the cross-platform DLP system 1146 enables a common interface into the APIs 1274 via a platform adaptor A 1272a, a platform adaptor B 1272b, and a platform adaptor C 1272c (collectively, platform adaptors 1272). In similar fashion to the APIs 1274, the number of platform adaptors 1272 is illustrative in nature. Each of the platform adaptors 1272 typically maps a standard set of functionality to corresponding sets of calls to the APIs 1274. In that way, the platform adaptors 1272 can be collectively considered a standard API that is operable to be called, for example, by components of the DLP detection engine 1248 and the DLP management console 1260. The standard API of the platform adaptors 1272 can include, for example, functions that specify a native DLP policy on a given communications platform, functions that activate a native DLP policy, functions that implement specific enforcement actions, etc. By way of example, the platform adaptor A 1272a can map each call of the standard API to a corresponding API call on the API A 1274a to the extent such a corresponding API call exists. The platform adaptor A 1272a can include, for example, a capabilities call that results in all capabilities of the API A 1274a being returned. The capabilities can include, for example, features of the standard API that the API A 1274a supports. The platform adaptor B 1272b and the platform adaptor C 1272c can be similarly configured relative to the API B 1274b and the API C 1274c, respectively.

In the illustrated embodiment, the DLP detection engine 1248 includes a native DLP detector 1250, a policy abstraction module 1252, a custom DLP detector 1254, a DLP risk profiler 1256, and a DLP context module 1258. The policy abstraction module 1252 provides an interface for an appropriate user such as, for example, an administrator, to create and/or activate cross-platform DLP policies. The policy abstraction module 1252 typically creates the cross-platform DLP policies in a standardized policy format. The standardized policy format can generally be any format for specifying rules and/or Boolean conditions. In some cases, the standardized policy format may correspond to a format natively supported by one or more of the communications platforms 1276. In a typical embodiment, how the cross-platform DLP policies are activated on the communications platforms 1276 can depend on, among other things, an extent to which each of the communications platforms 1276 provides DLP support, administrator preference, etc.

In many cases, some or all of the communications platforms 1276 may provide at least some native DLP support. In these cases, if it is desired to activate a given cross-platform DLP policy natively on the communications platforms 1276, the policy abstraction module 1252 can provide the given cross-platform DLP policy in a corresponding call to the platform adaptors 1272. In a typical embodiment, the platform adaptors 1272 are operable to receive the given cross-platform DLP policy in the standardized policy format and re-specify it in a respective native format expected by each of the communications platforms 1276, for example, by translating the given cross-platform DLP policy from the standardized policy format to the respective native format. In some cases, some of the communications platforms 1276 may have a pre-existing native DLP policy that is deemed equivalent to a given cross-platform DLP policy. In these cases, no new native DLP policy usually needs to be specified. Rather, a corresponding platform adaptor of the platform adaptors 1272 can maintain a mapping to the equivalent native DLP policy. Once the given cross-platform DLP policy has been created and/or natively activated, as appropriate, the native DLP detector 1250 can perform DLP detection. Operation of the native DLP detector 1250 will be described in greater detail below.

As mentioned above, some or all of the communications platforms 1276 may either provide no DLP support or provide DLP support that is insufficient in some respect for natively activating the given cross-platform DLP policy. In addition, even if sufficient DLP support is provided by the communications platforms 1276, it may otherwise be desirable by the administrator for the cross-platform DLP system 1146 to centrally activate the given cross-platform DLP policy for a particular set of communications platforms of the communications platforms 1276. Central activation typically means that, as to the particular set of communications platforms, violation detection is performed centrally by the cross-platform DLP system 1146 without relying on native DLP functionality, if any, of the particular set of communications platforms. Under these circumstances, the policy abstraction module 1252 can provide the given cross-platform DLP policy to the custom DLP detector 1254 for storage and implementation. The custom DLP detector 1254 will be described in greater detail below.

In a typical embodiment, the policy abstraction module 1252 centrally maintains all cross-platform DLP policies, for example, in a database, persistent file-based storage, and/or the like. In some cases, all cross-platform DLP policies can be maintained on the BIM system 130, for example, in one or more of the databases 232. In addition, the policy abstraction module 1252 generally tracks how each cross-platform DLP policy is activated on each of the communications platforms 1276. As described above, cross-platform DLP policies can be activated natively on the communications platforms 1276, centrally activated by the cross-platform DLP system 1146, and/or a combination thereof. The manner of activation can be maintained by the policy abstraction module 1252 as part of its tracking functionality.

The native DLP detector 1250 typically manages violation detection for native activations of cross-platform DLP policies. In a typical embodiment, the native DLP detector 1250 can import violations of native DLP policies, for example, from logs that are generated by such platforms. In some cases, the logs can be accessed via, for example, the platform adaptors 1272 and the APIs 1274. In other cases, it may be possible to access such logs without the platform adaptors 1272 and/or the APIs 1274 if, for example, a network storage location of the logs is known.

The custom DLP detector 1254 typically manages violation detection for central activations of cross-platform DLP policies. In a typical embodiment, the custom DLP detector 1254 centrally performs violation detection on communications centrally collected and stored by the BIM system 130 as described above. In this fashion, with respect to the central activations, the cross-platform DLP policy can be applied and evaluated against such communications for purposes of identifying violations.

The DLP risk profiler 1256 is operable to identify quasi-violations, assess risk of cross-platform DLP policies being violated and/or quasi-violated, and/or the like. A quasi-violation, as used herein, refers to user activity or behavior that does not literally violate a given policy but that is measurably and configurably close to doing so. An actual violation, as used herein, refers to user activity or behavior that literally violates a given policy. For purposes of this disclosure, the term violation can encompass both actual violations and quasi-violations. What constitutes measurably close can be empirically defined, for example, via statistical, mathematical, and/or rule-based methods.

For instance, a particular cross-platform DLP policy could prohibit sending files (e.g., email attachments) that are larger than a maximum size (e.g., ten megabytes). According to this example, measurably close could be empirically defined as being within a certain percentage of the maximum size (e.g., five percent), being within a certain numeric range relative to the maximum size (e.g., greater than nine megabytes but less than ten megabytes), etc. Measurably close could be further defined to include a repetition factor. For example, quasi-violations could be limited to cases where a given user has met the above-described empirical definition at least a specified number of times (e.g., five) within a specified window of time (e.g., one hour, one day, one week, etc.). Quasi-violations could also be limited to such cases where a number of times that the user has sent such files is within a certain number of standard deviations of an expected value for the specified window of time. It should be appreciated that similar principles could be applied to automatically identify quasi-violations for other types of cross-platform DLP policies that specify, for example, values and/or thresholds.

In various embodiments, the DLP risk profiler 1256 can also trigger a quasi-violation based on, for example, an assessment that a cross-platform DLP policy is in imminent risk of being violated. For example, certain DLP policies may relate to values that tend to increase over time or that exhibit a pattern (e.g., linear or exponential). For example, a given policy could limit each user to a certain quantity of instant messages per day (e.g., 100). If it appears that a particular user is projected to reach the certain quantity (e.g., based on a linear trend) or is within a defined range of the certain quantity (e.g., ninety-five instant messages before 2:00 pm local time), a quasi-violation could be triggered. A quasi-violation could also be triggered if, for example, a characteristic precursor to an actual violation has been detected. For example, a particular cross-platform DLP policy could specify that communications to customer A cannot occur via email. In that case, a characteristic precursor to an actual violation could be the appearance in a user's email contacts of an email address specifying Customer A's domain (e.g., example.com).

In various embodiments, the DLP risk profiler 1256 can also be utilized for on-demand risk assessment. For example, designated users (as described further below), administrators, and/or the like can use the DLP risk profiler 1256 to perform a risk query. In various embodiments, the risk query can be equivalent to a cross-platform DLP policy. For example, the risk query can be embody a prospective cross-platform DLP policy. An administrator, for example, could use the risk query to search communications collected by the BIM system 130 to determine a business impact of implementing the cross-platform DLP policy. The risk query is typically tailored to identify information related to the business impact. After execution of the risk query, the information is returned to the administrator. Based on the information returned by the risk query, the administrator could determine, inter alia, a volume of users exhibiting behaviors prohibited by the prospective cross-platform DLP policy, an overall number of past communications within a certain period of time that would have been implicated by the prospective cross-platform DLP policy, which departments or organizational units would be most impacted by the prospective cross-platform DLP policy, etc.

The DLP context module 1258 is operable to dynamically acquire context information responsive, for example, to a detected violation. In various embodiments, what constitutes context information for a violation of a given cross-platform DLP policy can be pre-defined as a query package as described above. Responsive to a violation of the given cross-platform DLP policy, the query package can be executed to yield the context information. An example of defining and executing a query package will be described in greater detail with respect to FIGS. 14 and 16. Also, in some embodiments, all or part of what constitutes context information can be specified, for example, by designated users upon receipt of an alert. In these embodiments, the designated users can request particular data points that are of interest given the contents of the alert. It should be appreciated that the context information can be acquired from any of the communications platforms 1276. For example, if a user were to violate the cross-platform DLP policy on an email platform, the context information could include information related to the user's contemporaneous communications on each of an instant-messaging platform, an enterprise social-networking platform, and/or any of the communications platforms 1276.

The DLP management console 1260 includes a user permission manager 1262, a reporting module 1264, and a credentials module 1270. In a typical embodiment, the user permission manager 1262 maintains an access profile for each user of the cross-platform DLP system 1146. The access profile can be created based on, for example, directory information (e.g., Active Directory). In some embodiments, the access profile can be created by an administrator.

The access profile typically specifies a scope of violations that the user is authorized to view and/or for which the user should receive alerts or reports (e.g., all staff, all employees beneath the user in an employee hierarchy, etc.). The access profile also typically specifies enforcement actions that the user is allowed to take if, for example, DLP violations have occurred. In some cases, the user's ability to take the enforcement action may be conditioned on violation(s) having occurred. In other cases, some or all of the enforcement actions may be available to the user unconditionally. For purposes of this disclosure, a given user may be considered a designated user with respect to those cross-platform DLP policies for which the given user is authorized to view violations, receive reports or alerts on violations, and/or take enforcement actions.

The reporting module 1264 provides an interface to display to designated users information pertaining to violations of cross-platform DLP policies and any context information. In various embodiments, the reporting module 1264 is operable to initiate alerts or present reports using, for example, any of the communications platforms 1276. The reports and/or alerts can be presented using, for example, SMS text message, email, instant message, a dashboard interface, social media messages, web pages, etc. The reporting module 1264 can also provide via, for example, a dashboard interface, any enforcement actions that each designated user is authorized to take. The enforcement actions can include, for example, blocking particular domains (e.g., example.com), suspending a user account on all or selected ones of the communications platforms 1276, blocking sending communications, blocking receiving communications, and/or the like. In some embodiments, the enforcement actions, can include a "kill" option that suspends a user or group of users' access to all of the communications platforms 1276.

The credentials module 1270 typically stores administrative credentials for accessing each of the communications platforms 1276 via, for example, the APIs 1274. In various embodiments, the credentials module 1270 enables designated users to execute administrative actions (e.g., enforcement actions) that the designated users would ordinarily lack permission to perform, thereby saving time and resources of administrators. The user permission manager 1262 can determine, via access profiles, enforcement actions that the designated users are authorized to perform. Responsive to selections by the designated users, the credentials module 1270 can execute those enforcement actions on the communications platforms 1276 using the stored administrative credentials.

Figure 13:
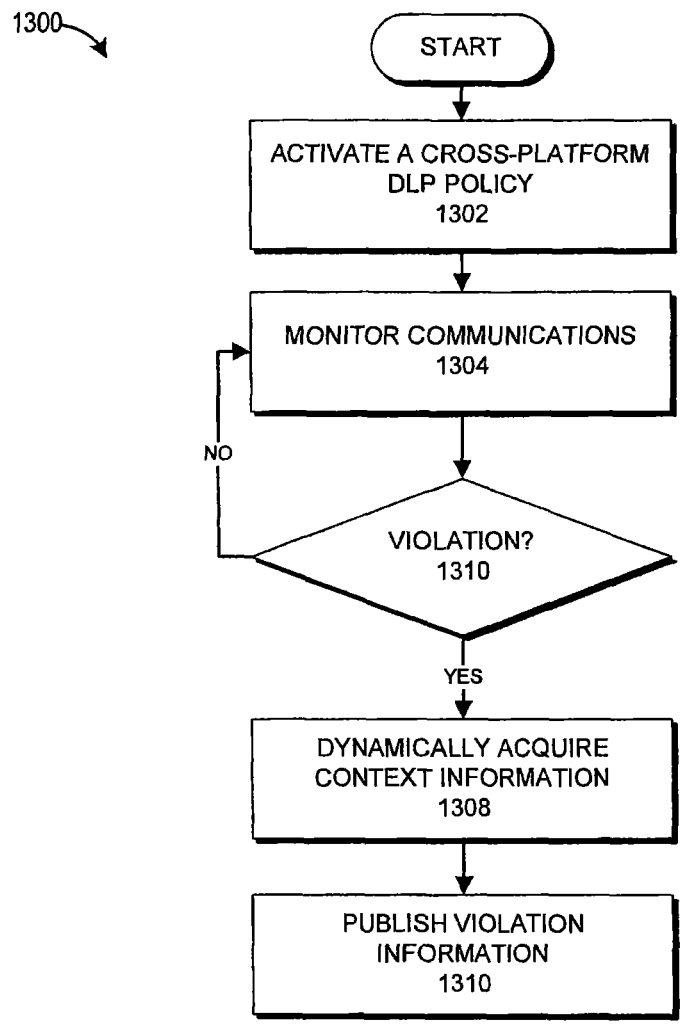
FIG. 13 illustrates an example of a process for cross-platform DLP implementation.

FIG. 13 presents a flowchart of an example of a process 1300 for cross-platform DLP implementation. The process 1300 can be implemented by any system that can access data, evaluate data, and/or interact with users. For example, the process 1300, in whole or in part, can be implemented by one or more of the BIM system 130, the DLP detection engine 1248, the DLP management console 1260, and/or components thereof. Although any number of systems, in whole or in part, can implement the process 1300, to simplify discussion, the process 1300 will be described in relation to specific systems or subsystems of the system 1100 of FIG. 11 and/or the cross-platform DLP system 1146. For illustrative purposes, the process 1300 will be described with respect to a single cross-platform DLP policy. However, it should be appreciated that the process 1300 can be repeated relative to numerous cross-platform DLP policies that will be maintained by the cross-platform DLP system 1146.

At block 1302, the DLP detection engine 1248 activates a cross-platform DLP policy on a set of communications platforms of the communications platforms 1276 for enforcement against a set of users (e.g., a user or group of users). In typical embodiment, the block 1302 includes the policy abstraction module 1252 interacting with an administrator to select and/or create the cross-platform DLP policy, select the set of users, and choose the set of communications platforms. In some cases, the set of communications platforms may include only one of the communications platforms 1276. As described above, relative to the set of communications platforms, the cross-platform DLP policy can be centrally activated, natively activated, or a combination thereof. In the case of native activation, the cross-platform DLP policy can include initiating a native DLP policy on one or more of the set of communications platforms. An example of how the cross-platform DLP policy can be created will be described with respect to FIG. 14.

At block 1304, the DLP detection engine 1248 monitors communications of the set of users on the set of communications platforms for violations of the cross-platform DLP policy. In various embodiments, the block 1304 can include monitoring for actual violations, quasi-violations, or both. In a typical embodiment, as part of the block 1304, the native DLP detector 1250 tracks violations of any native activations of the cross-platform DLP policy. The native activations can include, for example, native DLP policies that are a translated form of or are deemed equivalent to the cross-platform DLP policy. In a typical embodiment, the custom DLP detector 1254 centrally detects violations of any central activations of the cross-platform DLP policy. The central detection typically includes evaluating, against the cross-platform DLP policy, communications collected by the BIM system 130 that correspond to the central activations. In addition, the block 1304 can also include the DLP risk profiler 1256 monitoring for quasi-violations of the cross-platform DLP policy as described above.

At decision block 1306, the DLP detection engine 1248 determines whether a violation has been detected, for example, by the native DLP detector 1250, the custom DLP detector 1254, and/or the DLP risk profiler 1256. Responsive to a detected violation, the process 1300 proceeds to block 1308. Otherwise, the process 1300 returns to the block 1304 and proceeds as described above. At the block 1308, the DLP context module 1258 dynamically acquires context information for the detected violation. An example of how context information can be specified will be described with respect to FIG. 14. An example of dynamically acquiring context information will be described with respect to FIG. 15.

At block 1310, the DLP management console 1260 publishes violation information to at least one designated user. The at least one designated user can include, for example, a manager of a user who initiated the violation. The violation information can include, for example, information associated with the detected violation, the context information, and/or the like. The information associated with the detected violation can include, for example, user-identification information (e.g., name, user name, ID, etc.), violation type (e.g., identification of the particular violation if multiple violation types are allowed by the cross-platform DLP policy), a time of the violation, a communication that constituted the violation, a communication identifier for the communication that constituted the violation, and/or other information that is readily accessible at a time of violation detection. In a typical embodiment, the block 1310 results in the violation information being made accessible to the at least one designated user. In many cases, the block 1310 may include providing the at least one designated user with options for selecting one or more enforcement actions as a result of the detected violation. An example of publishing violation information will be described with respect to FIG. 16.

Figure 14:
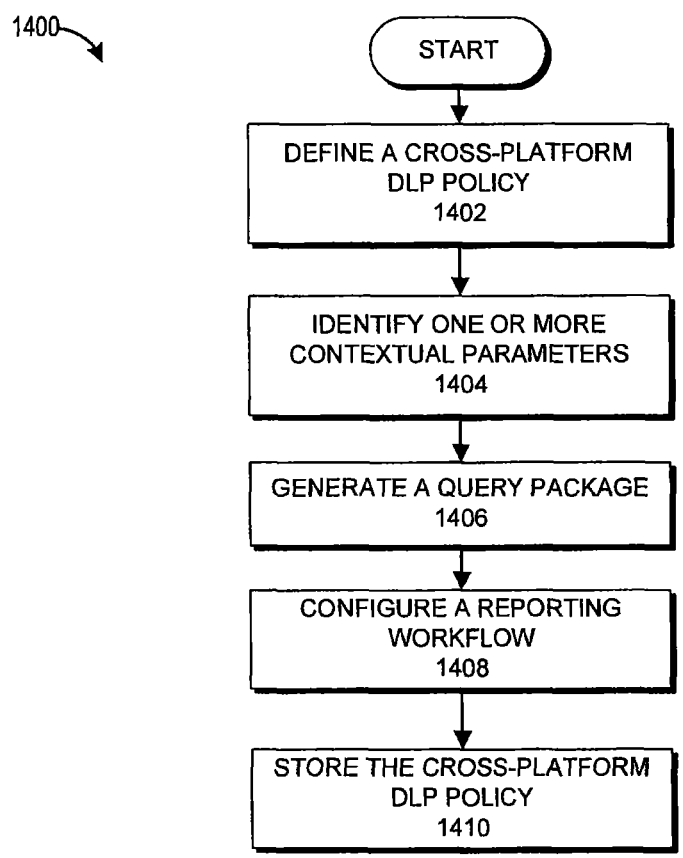
FIG. 14 illustrates an example of a process for creating a cross-platform DLP policy.

FIG. 14 presents a flowchart of an example of a process 1400 for creating a cross-platform DLP policy. The process 1400 can be implemented by any system that can access data, evaluate data, and/or interact with users. For example, the process 1400, in whole or in part, can be implemented by one or more of the BIM system 130, the DLP detection engine 1248, the DLP management console 1260, and/or components thereof. Although any number of systems, in whole or in part, can implement the process 1400, to simplify discussion, the process 1400 will be described in relation to specific systems or subsystems of the system 1100 of FIG. 11 and/or the cross-platform DLP system 1146. It various embodiments, the process 1400 can be performed as part of the block 1302 of FIG. 13.

At block 1402, the policy abstraction module 1252 defines a cross-platform DLP policy. The block 1402 can include the policy abstraction module 1252 interacting with an administrator to establish, for example, a name and/or unique identifier for the cross-platform DLP policy. The block 1402 can include, for example, empirically defining how the cross-platform DLP policy can be violated responsive to input from the administrator. The empirical definition can include defining both actual violations and quasi-violations. In some embodiments, definitions of quasi-violations can be automatically derived from the definitions of actual violations (e.g., as percentages, ranges, standard deviations relative to expected values, etc.). In some embodiments, the cross-platform DLP policy can be defined in terms of a native DLP policy of a particular communications platform of the communications platforms 1276. In these embodiments, the administrator can be permitted to identify or provide the native DLP policy, which policy the policy abstraction module 1252 can then import and re-specify in a standardized format (e.g., by translation).

At block 1404, the policy abstraction module 1252 identifies one or more contextual parameters. The contextual parameters generally represent variable, violation-specification information that will be used as a basis for generating context information. The contextual parameters can include, for example, user-identification information (e.g., name, user name, ID, etc.), violation type (e.g., identification of the particular violation if multiple violation types are allowed by the cross-platform DLP policy), a time of the violation, a communication that constituted the violation, a communication identifier for the communication that constituted the violation, and/or other information that is readily accessible at a time of violation detection.

At block 1406, the policy abstraction module 1252 generates a query package that can be used to dynamically generate context information responsive to a detected violation. The query package can be specified, for example, as described above with respect to FIGS. 1-12. In general, the query package is tailored to request, in terms of the contextual parameters, context information for violations of the cross-platform DLP policy. The requested context information can include, for example, prior violations by a violating user within a certain period of time, communications by or to the violating user within a certain period of time before and/or after the violation (e.g., including communications on any of the communications platforms 1276), the violating user's communication patterns (e.g., who the violating user communicates with most, the violating user's volume of communications, top topics discussed in communications, etc.), and/or the like. The requested context information can also include aggregated context information such as, for example, a number of violations of the cross-platform DLP platform across a given organization or enterprise, a number of violations within the violating user's department or organization unit, most frequently taken enforcement actions by other managers responsive to violations of the cross-platform DLP policy, and/or the like.

At block 1408, the policy abstraction module 1252 configures a reporting workflow for violations of the cross-platform DLP policy. The configuring can include, for example, defining one or more designated users who can view violations, receive alerts or reports of violations, and/or take enforcement actions responsive to violations. In some cases, the one or more designated users may be defined generally using, for example, directory services (e.g., Active Directory). For example, the one or more designated users could include each direct manager of a violating user. In other cases, the one or more designated users can be defined as specific users for each user that is to be covered by the policy (e.g., a manually designated user for each user or group users impacted by the cross-platform DLP policy). The configuration at the block 1408 can also include, for example, establishing one or more enforcement actions that can be taken by the one or more designated users. In various embodiments, an access profile for each of the designated users can be used to establish which enforcement actions each designated user is permitted to take.

At block 1410, the policy abstraction module stores the cross-platform DLP policy. The storage can include, for example, storage of the query package as linked to the cross-platform DLP policy. In various embodiments, the storage at the block 1410 can be in memory accessible to the policy abstraction module 1252, in the databases 232 of FIG. 11, and/or the like.

Figure 15:
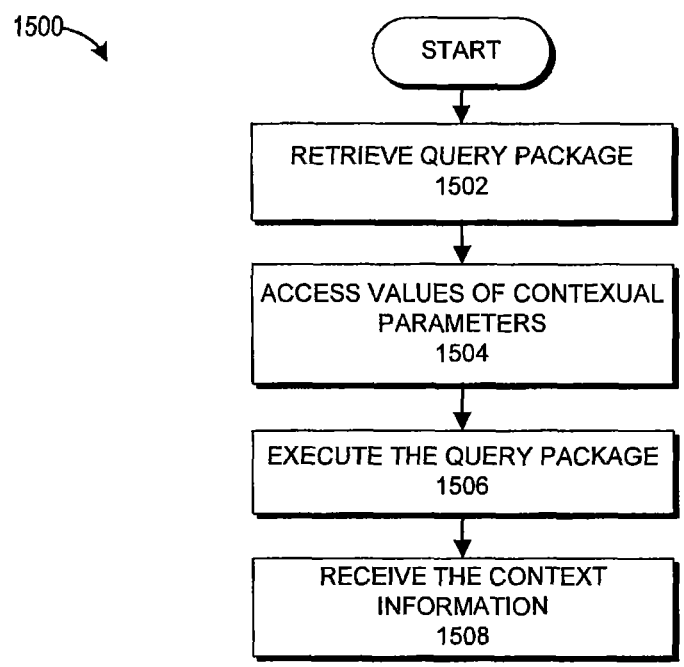
FIG. 15 illustrates an example of a process for dynamically acquiring context information.

FIG. 15 presents a flowchart of an example of a process 1500 for dynamically acquiring context information responsive to a detected violation of a cross-platform DLP policy. The detected violation may have been detected, for example, via the native DLP detector 1250, the custom DLP detector 1254, and/or the DLP risk profiler 1256. The process 1500 can be implemented by any system that can access data, evaluate data, and/or interact with users. For example, the process 1500, in whole or in part, can be implemented by one or more of the BIM system 130, the DLP detection engine 1248, the DLP management console 1260, and/or components thereof. Although any number of systems, in whole or in part, can implement the process 1500, to simplify discussion, the process 1500 will be described in relation to specific systems or subsystems of the system 1100 of FIG. 11 and/or the cross-platform DLP system 1146. It various embodiments, the process 1500 can be performed as part of the block 1308 of FIG. 13.

At block 1502, the DLP context module 1258 retrieves a query package that is linked to the cross-platform DLP policy. In a typical embodiment, the query package may have been generated at the block 1406 of FIG. 14. At block 1504, the DLP context module 1258 accesses values of contextual parameters that are needed for the query package. The values can typically be obtained from information associated with the detected violation. The information associated with the detected violation is typically obtained by the native DLP detector 1250, the custom DLP detector 1254, and/or the DLP risk profiler 1256, as appropriate. At block 1506, the DLP context module 1258 executes the query package, for example, on the BIM system 130. At block 1508, the DLP context module 1258 receives the context information responsive to the execution of the query package.

Figure 16:
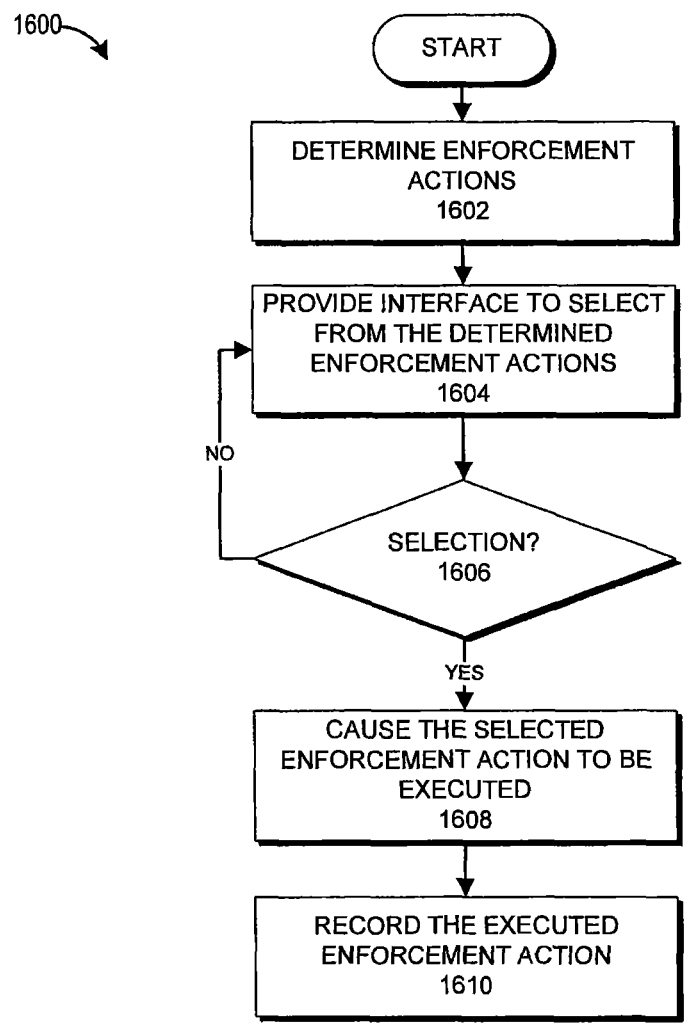
FIG. 16 illustrates an example of a process for publishing violation information.

FIG. 16 presents a flowchart of an example of a process 1600 for publishing violation information to one or more designated users responsive, for example, to a detected violation. The detected violation may have been detected, for example, via the native DLP detector 1250, the custom DLP detector 1254, and/or the DLP risk profiler 1256. The process 1600 can be implemented by any system that can access data, evaluate data, and/or interact with users. For example, the process 1600, in whole or in part, can be implemented by one or more of the BIM system 130, the DLP detection engine 1248, the DLP management console 1260, and/or components thereof. Although any number of systems, in whole or in part, can implement the process 1600, to simplify discussion, the process 1600 will be described in relation to specific systems or subsystems of the system 1100 of FIG. 11 and/or the cross-platform DLP system 1146. It various embodiments, the process 1600 can be performed as part of the block 1310 of FIG. 13.

At block 1602, the user permission manager 1262 determines which enforcement actions that each designated user has permission to perform. In a typical embodiment, the determination can be made by ascertaining which enforcement actions of a set of potential enforcement actions are allowed by each designated user's access profile. At block 1604, the reporting module 1264 provides an interface for each designated user to select the determined enforcement actions. The interface can be, for example, a web interface, an interface on one of the communications platforms 1276, and/or the like. At decision block 1606, the reporting module 1264 determines whether a designated user has selected one of the determined enforcement actions. If not, the process 1600 returns to the block 1604 and proceeds as described above. If it is determined at the decision block 1606 that the designated user has selected one of the determined enforcement actions, the process 1600 proceeds to block 1608. In a typical embodiment, the selected enforcement action can be made with respect to one or more communications platforms of the communications platforms 1276. At block 1608, the credentials module 1270 causes the selected enforcement action to be executed with administrator privileges on each of the one or more communications platforms. At block 1610, the executed enforcement action is recorded, for example, in one or more of the databases 232. The block 1610 can include recording, for example, the executed enforcement, information associated with the detected violation, any context information, and/or the like.

Figure 17:
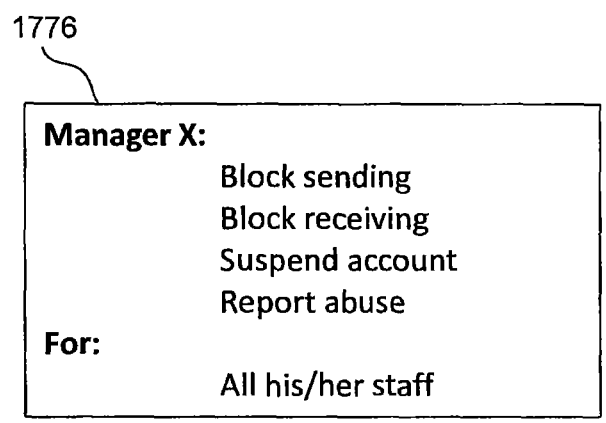
FIG. 17 illustrates an example of an access profile.

FIG. 17 illustrates an example of an access profile 1776. In the depicted embodiment, the access profile grants a "Manager X" a right to perform enforcement actions of "block sending," "block receiving," "suspend account," and "report abuse." As illustrated, the access profile 1776 grants the above-mentioned enforcement actions for "all his/her staff," which, in a typical embodiment, can be determined using, for example, directory services (e.g., Active Directory). In some cases, the access profile 1776 can include other enforcement actions such as, for example, "allow with warning." In these embodiments, any users impacted by the enforcement actions can be presented a warning that must be explicitly acknowledged and disregarded before the cross-platform DLP policy can be violated in the future.

Table 6 below provides examples of laws and standards from which, in various embodiments, cross-platform DLP standards can be derived and implemented.

TABLE 6

| USE CASE | DESCRIPTION | APPLIES TO | DLP OPPORTUNITY |
|---|---|---|---|
| Sarbanes-Oxley (Sarbox) | Enacted in the US in 2002. It targets any company that is publicly traded on an American stock exchange. Its purpose is to ensure the accuracy of the company's financial information and the reliability of the systems that generate it. The challenge to IT is to manage a secure and controlled infrastructure for data, processes, and historical information. While this act applies to large or established enterprises, it is high profile around the world has had a significant impact as to how all businesses conduct themselves. | US/Global Publicly traded companies | Provide monitoring and assessment for messaging security, virus protection, intrusion detection, vulnerability management, and user authentication. Provide audit trails for error logs, system health, and asset management (?). Monitoring of business-critical messaging/collaboration software helps provide increased confidence in the integrity of the network infrastructure. |
| Gramm-Leach-Billey (GLBA) | Gramm-Leach-Billey (GLBA) is a US act from 1999. It applies to any American financial institution, large and small. Its purpose is to ensure the integrity of financial and client data. The role of IT is to implement systems for security and authorized access, | US Finance sector, Global finance | 24 × 7 detection of security breaches and vulnerabilities and integrating with industry standards such as Microsoft Baseline Security Analyzer (MBSA) or other enterprise-class security platforms. Dashboards, alerts and notifications help ensure communications availability, Patch assessment and management (?). Infrastructure reports are integral for |

TABLE 6-continued

| USE CASE | DESCRIPTION | APPLIES TO | DLP OPPORTUNITY |
|---|---|---|---|
| | and to build safeguards against threats and hazards. Globally, similar requirements are found in The New Capital Accord (Basel II) 1998/2005. | | capacity and disaster planning. |
| USA PATRIOT Act (USA PATRIOT) | USAPATRIOT Act of 2001 applies to all US-based companies and attempts to prevent the support and financing of terrorists. It also aims to prevent intellectual property/trade secrets from being sent to certain international locations. | US Any company/ individual | Identify potential vulnerabilities to messaging access points. Identify messaging to unauthorized destinations. Detect unauthorized access. Track the flow of sensitive information. |
| Federal Food & Drug 21-CFR-11(21-CFR-11 | Federal Food & Drug 21-CFR-11(21-CFR-11) is a US law applies to any company that is regulated by the Food and Drug Administration (FDA). Its goal is to ensure the security, integrity, and availability of information. This is of particular concern to the health care industry that relies on the accuracy of patient/product information. | US Healthcare sector | Help managers to ensure secure environments and authenticated users. Infrastructure reports give overall messaging network health checks to ensure the availability of data. |
| Payment Card Industry Data Security Standard (PCI-DSS) | Payment Card Industry Data Security Standard (PCI-DSS) was created in 2004 by the major credit card companies to ensure that their merchants adhered to certain network standards to protect against vulnerabilities, and to protect cardholders from fraud. The standard applies to any CC-processing merchant, and has 5 general goals: Build and maintain a secure network; Protect transaction data; Guard against vulnerabilities; Implement strong Access Control measures; and Regularly monitor and test networks. Global Credit card merchants | Any global company accepting credit card payments | Monitor 24 × 7 any intrusion, or unauthorized access, as well as system failures that could impact prompt response. Ensure compliance of communications-based transactions. |
| Notification of Risk to Personal Data Act (NORPDA-US 2003) | The purpose of the act is to ensure that any agency notifies authorities if any personal information has been acquired by an unauthorized source. The impact to IT is to improve security and reporting systems. Similar laws in Europe include the European Data Protection Directive of 1995, among others. | Any US/ European company | Detect, investigate, and notify unauthorized access, Remote management of environments allow for rapid action against intrusion. Report regular security audits, health checks. |
| Health Information Portability & Accountability Act (HIPAA) from 1996 | This act applies to all US-based health care providers. Its purpose is to improve health care operations and to ensure patient record privacy. The impact to IT is to improve security and interoperability of information systems, as well as improve reporting systems. Related to this is the Personal Information Protection and Electronic Documents Act (PIPEDA- Canada 2000). Applying to all Canadian companies and agencies, it limits the use and disclosure of personal information obtained during the course of doing business The onus on management is to ensure proper use of personal | Any company handling personal information & US Healthcare sector | Ensure security and availability of messaging systems, as well as protecting them from unauthorized use. |

TABLE 6-continued

| USE CASE | DESCRIPTION | APPLIES TO | DLP OPPORTUNITY |
|---|---|---|---|
| | information. {There is also a significant EURO privacy act) | | |
| CAN-SPAM Controlling the Assault of Non-Solicited Pornography And Marketing Act from 2003 | This act establishes email standards for US-based companies. The act protects users against false or misleading message headers, and deceptive subject lines. Senders must identify outgoing mail as a commercial (ad) message. Sender identification must be accurate and traceable (no spoof). Mail cannot be sent using harvested mail addresses. The message must contain details about where the message is originating from, as well as information on how the recipient can "unsubscribe" to future messages. Opt-out requests from recipients must be processed within 10 business days. No fees can be charged to unsubscribe a recipient. | US companies | Ensure Can-Spam laws are met. |
| SAS-70 Compliance requirements that can be delivered efficiently and effectively | General compliance guidelines have been compiled by the auditing sector and published as SAS-70. The directive highlights 7 areas that apply to IT Information and Systems Management. | US/global companies | Ensure SAS-70 compliance. |

III. User Context Analysis and Context-Based DLP

In various embodiments, many of the principles described above can also be leveraged to generate intelligence regarding how user behavior on a remote computer system differs based, at least in part, on user context. In general, a user context is representative of one or more conditions under which one or more user-initiated events occur. A user-initiated event can be, for example, a user-initiated communication event on a communications platform. Examples of user-initiated communication events include a user creating, drafting, receiving, viewing, opening, editing, transmitting, or otherwise accessing or acting upon a communication. Communications can include, for example, emails, blogs, wikis, documents, presentations, social-media messages, and/or the like. User-initiated events can also include other user behaviors such as, for example, a user accessing or manipulating non-communication computer resources and artifacts thereof.

In various embodiments, user-initiated events can be originated via a user device in communication with a remote computer system or resource such as, for example, a communications platform. For a given user-initiated event, a corresponding user context can be defined by event-context information. The event-context information can include temporal data about the event such as, for example, information usable to identify a specific user or attributes thereof (i.e., user-identification information), information related to a physical location of a user device or attributes thereof (i.e., user-location information), information related to when a user-initiated event occurred (i.e., event-timing information), information usable to identify a user device or attributes thereof (i.e., user-device identification information), and/or the like.

In certain embodiments, a user-context-based analysis of user-initiated events can occur on demand responsive to requests from a user or system, automatically at certain scheduled times or intervals, etc. In particular, in some embodiments, a user-context-based analysis can be performed in real-time as information becomes available in order to facilitate dynamic implementation of DLP policies based, at least in part, on user context. In addition, in various embodiments, user devices can be enabled to configure the dynamic implementation based on user attestation of a risk or lack thereof. For illustrative purposes, examples will be described below relative to user-initiated communication events, often referred to herein simply as communication events. It should be appreciated, however, that the principles described can similarly be applied to other types of user-initiated events or user behaviors.

Figure 18:
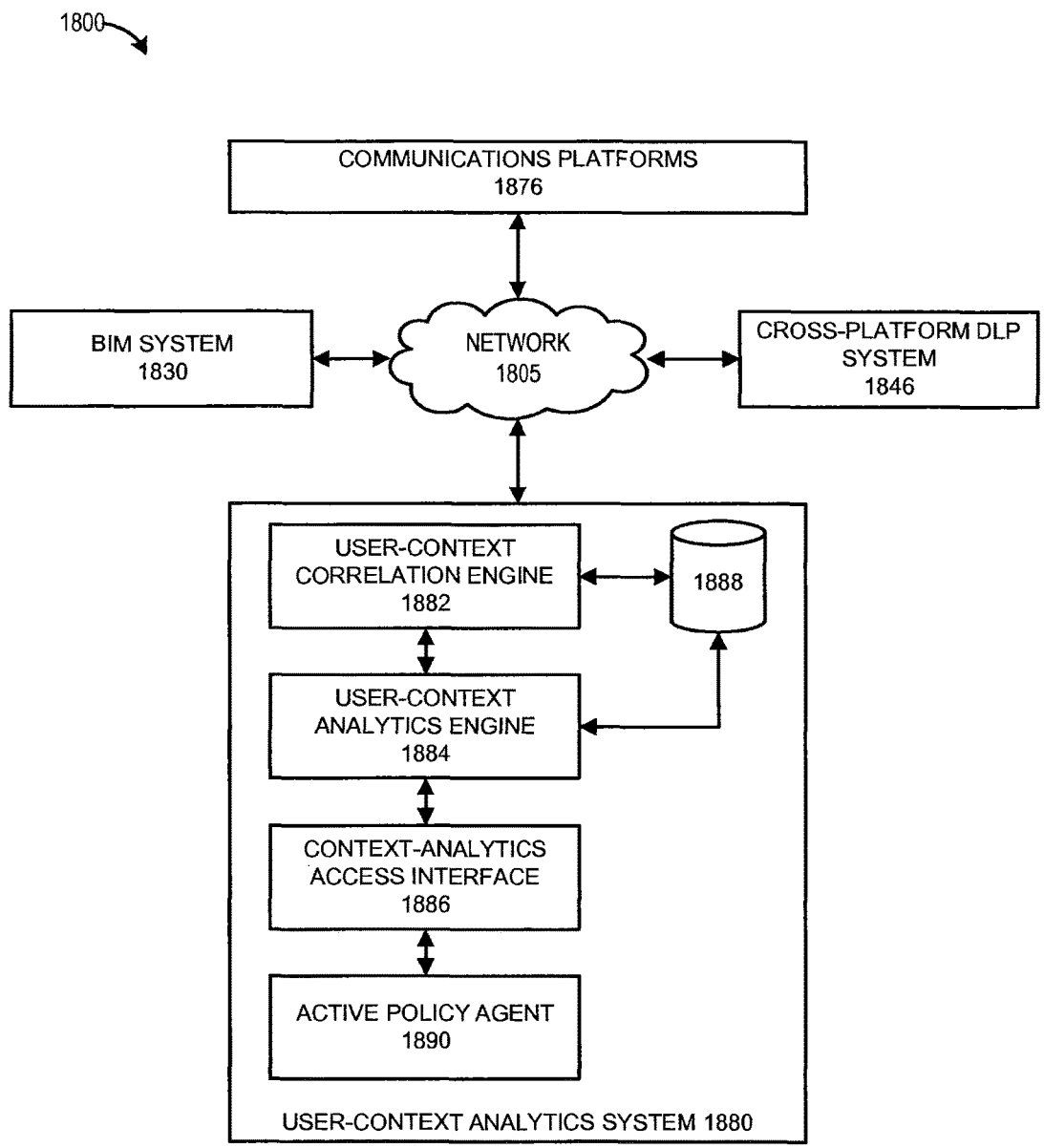
FIG. 18 illustrates an embodiment of a system for user-context-based analysis of communications.

FIG. 18 illustrates an embodiment of a system 1800 for user-context-based analysis of communications. The system 1800 includes communications platforms 1876, a BIM system 1830, a cross-platform DLP system 1846, and a user-context analytics system 1880. As shown, the communications platforms 1876, the BIM system 1830, the cross-platform DLP system 1846, and the user-context analytics system 1880 are operable to communicate over a network 1805.

The communications platforms 1876, the BIM system 1830, and the cross-platform DLP system 1846 can operate as described above with respect to the BIM system 130, the cross-platform DLP system 1146, and the communications platforms 1276, respectively. In a typical embodiment, the network 1805 can be representative of a plurality of networks such as, for example, the intranet 104 and the network 106 described above. In certain embodiments, the communications platforms 1876, the BIM system 1830, and the user-context analytics system 1880 can collaborate to generate intelligence related to how user behavior differs based, at least in part, on user context.

More particularly, the communications platforms 1876 may be considered specific examples of one or more of the internal data sources 120 and/or one or more of the external data sources 122 described above. In that way, in certain embodiments, the BIM system 1830 is operable to collect and/or generate, inter alia, information related to communications on the communications platforms 1876. It should be appreciated that, in many cases, such communications may be the result of communication events such as, for example, a user creating, drafting, receiving, viewing, opening, editing, transmitting, or otherwise accessing or acting upon the communications. For simplicity of description, information collected or generated by the BIM system 1830 with respect to the communications platforms 1876 may be referred to herein as event-assessment data.

For example, the event-assessment data can include information related to a classification assigned to particular communications. As described above, communications can be assigned classifications, for example, by components such as the a priori classification engine 226, the a posteriori classification engine 228, and the heuristics engine 230. In an example, the event-assessment data can include content-based classifications such as classifications indicative of a particular topic or classifications based on whether a communication is conversational, formal, personal, work-related, sales-related, etc. By way of further example, the event-assessment data can include participant-based classifications that are based on, for example, an email address or domain of a communication participant, whether the communication includes customers as participants, whether the communication includes internal participants, roles of the communication participants, etc. Additional examples of content-based and participant-based classifications are described in U.S. patent application Ser. No. 14/047,162 in the context of identifying subject-matter experts. U.S. patent application Ser. No. 14/047,162 is hereby incorporated by reference. As still further examples, the event-assessment data can include classifications based on a type of communication (e.g., email, instant message, voicemail, etc.), length of communication, and/or the like. Numerous other examples of event-assessment data will be apparent to one skilled in the art after reviewing the present disclosure.

The user-context analytics system 1880 can include a user-context correlation engine 1882, a user-context analytics engine 1884, a context-analytics access interface 1886, an active policy agent 1890, and a data store 1888. In certain embodiments, the user-context correlation engine 1882 is operable to determine event-context information for certain user-initiated communication events. In some cases, determining the event-context information can involve requesting and receiving, from the communications platforms 1876, user-log data. The user-log data can include, for example, stored information related to each user session, such as, for example, an IP address, a user's client application (e.g., a user's choice of web browser), network or security settings of the user's device, other characteristics of the user's device (e.g., manufacturer, model, operating system, etc.), combinations of the same, and/or the like. In a typical embodiment, the user-context analytics system 1880 can also correlate the event-context information to one or more user contexts. In various embodiments, event-context information and/or correlated event-context information can be stored in the data store 1888. Example operation of the user-context analytics system 1880 will be described in greater detail with respect to FIGS. 19-21.

In a typical embodiment, the user-context analytics engine 1884 uses correlated event-context information as described above to associate user-communication pattern(s) with user contexts. Each user-communication pattern typically characterizes activity that takes place for a given user context. In an example, consider a particular user context that aggregates all of a particular user's communication events that originate from a public location. The public location may be indicative, for example, of the user using publicly available network access offered by a place of business (e.g., restaurant, hotel, etc.), governmental unit, and/or the like. According to this example, a user-communication pattern could indicate:

(1) A level of personal activity. In an example, personal activity can be measured based, at least in part, on a number of communication events involving personal messages as described above. A given communication pattern could indicate a number, percentage, statistical evaluation, or other analysis of the number or distribution of personal messages.

(2) Types of communication participants. In an example, a given communication pattern could indicate communication events involving particular communication-participant types such as: customer participants, internal participants, participants in certain business units (e.g., executive management, legal, etc.), participants having certain roles as indicated by directory services, and/or the like. A communication-participant type can also aggregate groups of communication participants. For example, a "strategic" group could aggregate communication participants in executive management and research and development. For each communication-participant type, a given communication pattern could indicate a number, percentage, statistical evaluation, or other analysis of a number or distribution of communications involving the communication-participant type.

(3) Content classifications. In an example, a given communication pattern could indicate communication events involving communications that involve certain topics (e.g., sales). In another example, a given communication pattern could indicate communication events involving communications that are deemed conversational, formal, work-related, etc. For each content classification, a given communication pattern could indicate a number, percentage, statistical evaluation, or other analysis of a number of communications involving the content classification.

(4) Communication type. In an example, a given communication pattern could indicate communication events by communication type such as, for example, email, instant message, document, voicemail, etc. For each communication type, a given communication pattern could indicate a number, percentage, statistical evaluation, or other analysis of a number of communications involving the communication type.

It should be appreciated that the foregoing examples are merely illustrative of information that can at least partially form the basis for a communication pattern. Numerous other examples will be apparent to one skilled in the art after reviewing the present disclosure.

In certain embodiments, the user-context analytics engine 1884 can generate a communication profile based, at least in part, on a communication pattern(s) for one or more user contexts. In certain embodiments, the communication profile can include comparative communication-pattern information related to a plurality of user contexts. For example, one user context could be defined by communication events originating from a public location and a another user context could be defined by communication events originating from all other locations.

In certain embodiments, the comparative communication-pattern information can include information summarizing or otherwise indicative of communication patterns associated with each user context. In some cases, the communication profile can include a report (e.g., a chart or graph) that facilitates a side-by-side comparison of the plurality of user contexts. In various embodiments, the communication profile can further indicate differences among the plurality of user contexts. For example, the communication profile could indicate differences in degree, number, and/or the like for each of personal activity, types of communication participants, content classifications, and communication types as described above. In various embodiments, differences can be indicated by sorting and ranking according to one or more representative metrics, providing an evaluation of one or more representative metrics (e.g., indicating which is highest or lowest), etc. In general, the representative metric can relate to any number, percentage, statistical evaluation, or other analysis generated as part of a given communication pattern as described above.

The context-analytics access interface 1886 is operable to interact with users of a client information handling system over a network such as, for example, an intranet, the Internet, etc. In a typical embodiment, the context-analytics access interface 1886 receives and services communication-analytics requests from users. The context-analytics access interface 1886 typically serves the communication-analytics requests via interaction with the user-context analytics engine 1884. In certain embodiments, the context-analytics access interface 1886 can trigger the operation of the user-context correlation engine 1882 and the user-context analytics engine 1884 described above. Further examples of operation of the context-analytics access interface 1886 will be described in greater detail with respect to FIGS. 19-21.

The active policy agent 1890 is typically operable to facilitate real-time user-context analysis and DLP implementation. In a typical embodiment, the active policy agent 1890 can determine a user context for each user session with one of the communications platforms 1876. Based, at least in part, on the user context, the active policy agent 1890 can select a dynamic DLP policy. In certain embodiments, the dynamic DLP policy can include a cross-platform DLP policy, which policy can be implemented by the cross-platform DLP system 1846 as described above.

In addition to optionally including a cross-platform DLP policy, the dynamic DLP policy can specify one or more communication events of interest. In general, each user session is established between a user device and one or more of the communications platforms 1876. The active policy agent 1890 can monitor communication events originated by each such user device for the communication events of interest. For example, the communication events of interest may include a user creating, drafting, receiving, viewing, opening, editing, transmitting, or otherwise accessing or acting upon a communication in a specified manner.

If a communication underlying a particular communication event of interest meets risk-assessment criteria specified by the dynamic DLP policy, certain action can be taken. The risk-assessment criteria may target, for example, communications that involve particular types of communication participants, that have particular content classifications, that are of particular communication types, and/or the like. The actions that can be taken may include publishing a warning to the user, alerting an administrator or other designated user, preventing further actions by the user, forcing user log off, etc. In addition, in various embodiments, risk assessments of communication events of interest can be published to a real-time risk-evaluation dashboard that is visible to the user.

In a particular example, the communication events of interest can include pre-transmission communication events. Pre-transmission communication events can include the user drafting or editing a communication that has not been sent. In various embodiments, draft communications are maintained in a designated folder or other location that is resident on or otherwise accessible to at least one of the communications platforms 1876. In various embodiments, the draft communications can be accessed and classified in similar fashion to any other communication. Responsive to certain risk-assessment criteria being met as described above, transmission of such draft communications can be prevented. Further examples of operation of the active policy agent 1890 will be described below.

Figure 19:
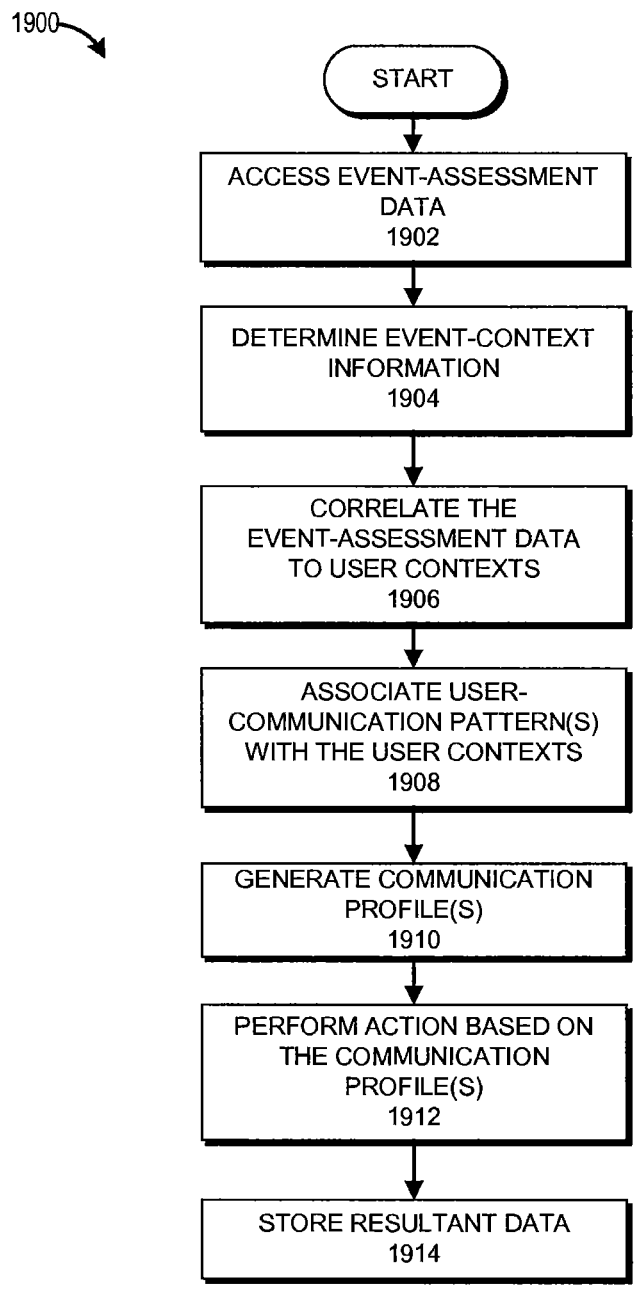
FIG. 19 presents a flowchart of an example of a process for performing user-context-based analysis of communication events.

FIG. 19 presents a flowchart of an example of a process 1900 for performing user-context-based analysis of communication events. The process 1900 can be implemented by any system that can access data, evaluate data, and/or interact with users. For example, the process 1900, in whole or in part, can be implemented by one or more of the BIM system 1830, the communications platforms 1876, the cross-platform DLP system 1846, the user-context analytics system 1880, the user-context correlation engine 1882, the user-context analytics engine 1884, the context-analytics access interface 1886, the data store 1888, and/or the active policy agent 1890. The process 1900 can also be performed generally by the system 1800. Although any number of systems, in whole or in part, can implement the process 1900, to simplify discussion, the process 1900 will be described in relation to specific systems or subsystems of the system 1800 and/or the user-context analytics system 1880. In various embodiments, the process 1900 can be initiated via a communication-analytics request received via the context-analytics access interface 1886. Such a request can be received from a user device, a computer system, or another entity.

At block 1902, the user-context correlation engine 1882 accesses event-assessment data for a plurality of communication events. In some cases, the plurality of user-initiated communication events can include all communication events of a given user (or set of users) over a certain period of time (e.g., a preceding one year, six months, etc.). It should be appreciated that the plurality of communication events may relate to different ones of the communications platforms 1876. In that way, the plurality of user-initiated communication events may be considered cross-platform communication events. In various embodiments, the plurality of user-initiated communication events, or criteria for identifying the plurality of user-initiated communication events, can be specified in a communication-analytics request.

At block 1904, the user-context correlation engine 1882 determines event-context information for each of the plurality of communication events. The event-context information can include, for example, user-identification information, user-location information, event-timing information, user-device identification information, anomalous-event information, and/or the like as described above.

In general, the user-identification information can be any information usable to identify a user or some attribute of a user who is associated with a given communication event. User-identification information can include, for example, a user name, employee identifier, or other data. In many cases, the user-identification information may be determined from the event-assessment data. In other cases, additional user-identification information may be retrieved from another system such as, for example, one or more of the communications platforms 1876. For example, in some embodiments, if a user identifier is known, the user identifier can be used to retrieve, from one or more of the communications platforms 1876, information about a corresponding user's role or responsibilities in an organization (e.g., using directory services).

In general, the user-location information can be any information related to a physical location of the user device, or attributes thereof, at a time that a given communication event occurs. The given communication event is typically originated on one of the communications platforms 1876 via a user device under control of a user. The user-location information can include multiple levels of descriptive information.

In certain embodiments, at least a portion of the user-location information can be determined by resolving an IP address associated with the user to a physical location. The IP address can be accessed, for example, from the event-assessment data and/or retrieved from a particular one of the communications platforms 1876 on which the given communication event occurred. In some cases, the IP address can be obtained from user-log data as described above. In an example, the IP address can be resolved to a city, state, province, country, etc. In addition, in various embodiments, it can be determined directly from the IP address via what network provider the user device is accessing one or more of the communications platforms 1876, whether the user device is inside or outside of a particular enterprise network, whether the user device is inside or outside of a particular city, state, province, country, etc.

In addition, or alternatively, the IP address may be looked up in an IP address registry to determine at least a portion of the user-location information. The IP address registry can associate certain network-location attributes (e.g., network addresses and network-address ranges) with a particular user's home, a public place of business (e.g., network access at a coffee shop, mall, airport, etc.), and/or the like. In embodiments that utilize the IP address registry, the user-context correlation engine 1882 can determine, as part of the event-context information, whether the user device was in a public location (e.g., coffee shop, mall, or airport), at the user's home, etc. at the time of the given communication event. In some embodiments, the IP address registry may be stored in the data store 1888 or in memory. In these embodiments, users or administrators may register the network-location attributes. In other embodiments, all or part of the IP address registry can be provided by a third-party service provider.

In general, the user-device identification information can include information descriptive of the user device, hardware or software of the user device, and/or attributes thereof. For example, the user-device identification information can include information related to a client application on the user device that is used to access one or more of the communications platforms (e.g., a user's choice of web browser), network or security settings of the user device or an application executing thereon, other characteristics of the user device (e.g., manufacturer, model, operating system, etc.), and/or the like. In many cases, some or all of the user-device identification information can be accessed from the event-assessment data. In other cases, at least a portion of the user-device identification information can be retrieved from one or more of the communications platforms 1876 (e.g., via user-log data as described above).

The event-timing information can include, for each communication event, information descriptive of when the communication event occurred. For example, the event-timing information can include time classifications such as, for example, whether the communication event occurred in the morning, in the evening, on the weekend and/or the like as measured by a corresponding user's local time. The event-timing information can also indicate whether the communication event occurred during or outside of the user's working hours. In various embodiments, the event-timing information can be determined from a timestamp for the communication event. The timestamp can be obtained, for example, from the event-assessment data or retrieved from another system such as one of the communications platforms 1876.

The anomalous-event information can indicate, for each communication event, whether the communication event is deemed anomalous. In a typical embodiment, the communication event may be considered anomalous if it is determined to be of questionable authenticity. For example, the communication event may be considered anomalous if another communication event occurred within a certain period of time (e.g., 30 minutes) of that communication event and is deemed to involve a same user (e.g., using the same user credentials), on a different user device, in a sufficiently distant physical location (e.g., two-hundred kilometers away as determined via IP address). In various embodiments, what constitutes a sufficiently distant physical location can be varied according to a period of time separating two communication events (e.g., allowing for a distance of no greater than one kilometer per minute elapsed). In various embodiments, the anomalous-event information can be determined from other event-context information. For example, the user-context correlation engine 1882 can aggregately analyze a location and timing of all of the plurality of communication events. Based, at least in part, on the analysis, the user-context correlation engine 1882 can identify anomalous communication events as described above.

At block 1906, the user-context correlation engine 1882 correlates the event-assessment data to one or more user contexts. In some cases, the one or more user contexts can be specified in a communication-analytics request as described above. In a typical embodiment, each user context is defined by a distinct subset of the event-context information. In a typical embodiment, the user-context correlation engine 1882 correlates the event-assessment data to user contexts on an event-by-event basis. That is, the event-assessment data for a given communication event is correlated to a given user context if the communication satisfies each constraint of the user context. For example, if a particular user context is directed to communication events occurring during non-working hours and at public locations, the event-assessment data for a particular communication event would be correlated to the particular user context only if the particular communication event is deemed to have occurred during non-working hours (relative to the local time of a corresponding user) and in a public location.

Each user context can include any combination of event-context information described above. For example, user-context constraints can be defined in terms of user-identification information, event-timing information, user-device identification information, user-location information, anomalous-event information, and/or other information. In the case of event-timing information, a given user context may specify one or more recurring periods of time such as, for example, time periods deemed working hours, non-working hours, etc. In addition, in some embodiments, each user context may specify a static non-overlapping period of time for a particular user (e.g., 2010-2012 for a first user context and 2013-present for a second user context). In these embodiments, the non-overlapping periods of time can enable measurement of communication-pattern evolution of users over time.

In some cases, each user context can be mutually exclusive of each other user context. In an example, one user context could be directed to communication events deemed to occur in a public location while another user context could be directed to communication events deemed to occur in all other locations. In another example, one user context could be directed to communication events deemed to occur during working hours while another user context could be directed to communication events deemed to occur during non-working hours. It should be appreciated, however, that each user context need not be mutually exclusive other user contexts. For example, one user context could be directed to communication events occurring during non-working hours, another user context could be directed to communication events occurring during working hours, and yet another user context could be directed to communication events originating from a user's home.

At block 1908, the user-context correlation engine 1882 associates one or more communication patterns with each of the one or more user contexts. In general, each communication pattern can include any of the communication-pattern information described above with respect to FIG. 18. At block 1910, the user-context correlation engine 1882 generates a communication profile for at least one user. In various embodiments, the block 1910 can include generating a communication profile for each user responsible for one of the plurality of user-initiated communication events. In general, each communication profile can include any of the information (e.g., comparative communication-pattern information) described above with respect to FIG. 18.

At block 1912, the user-context correlation engine 1882 performs actions based on the one or more communication profiles. In some embodiments, the block 1912 can include publishing the one or more communication profiles (e.g., in the form of reports) to an administrator or other designated user. In additional embodiments, the block 1912 can include performing an automated risk evaluation of comparative communication-pattern information contained in the one or more communication profiles. In various embodiments, the automated risk evaluation may use risk-assessment criteria to target certain communication profiles deemed dangerous. In various cases, the risk-assessment criteria can be maintained in the data store 1888 or in memory.

For example, the risk-assessment criteria may target communication events that involve communications to customers and are originated from a public location. The risk-assessment criteria can specify, for example, a threshold number of communication events. Responsive to the comparative communication-pattern information for a particular communication profile meeting the risk-assessment criteria, an alert can be transmitted to a designated user. Other examples of risk-assessment criteria and of automated risk evaluation will be apparent to one skilled in the art after reviewing the present disclosure.

At block 1914, resultant data is stored in the data store 1888 or in memory. The resultant data can include, for example, the accessed event-assessment data, the determined event-context information, the correlated event-assessment data, information related to user-communication patterns, the one or more communication profiles, and/or other data.

Figure 20:
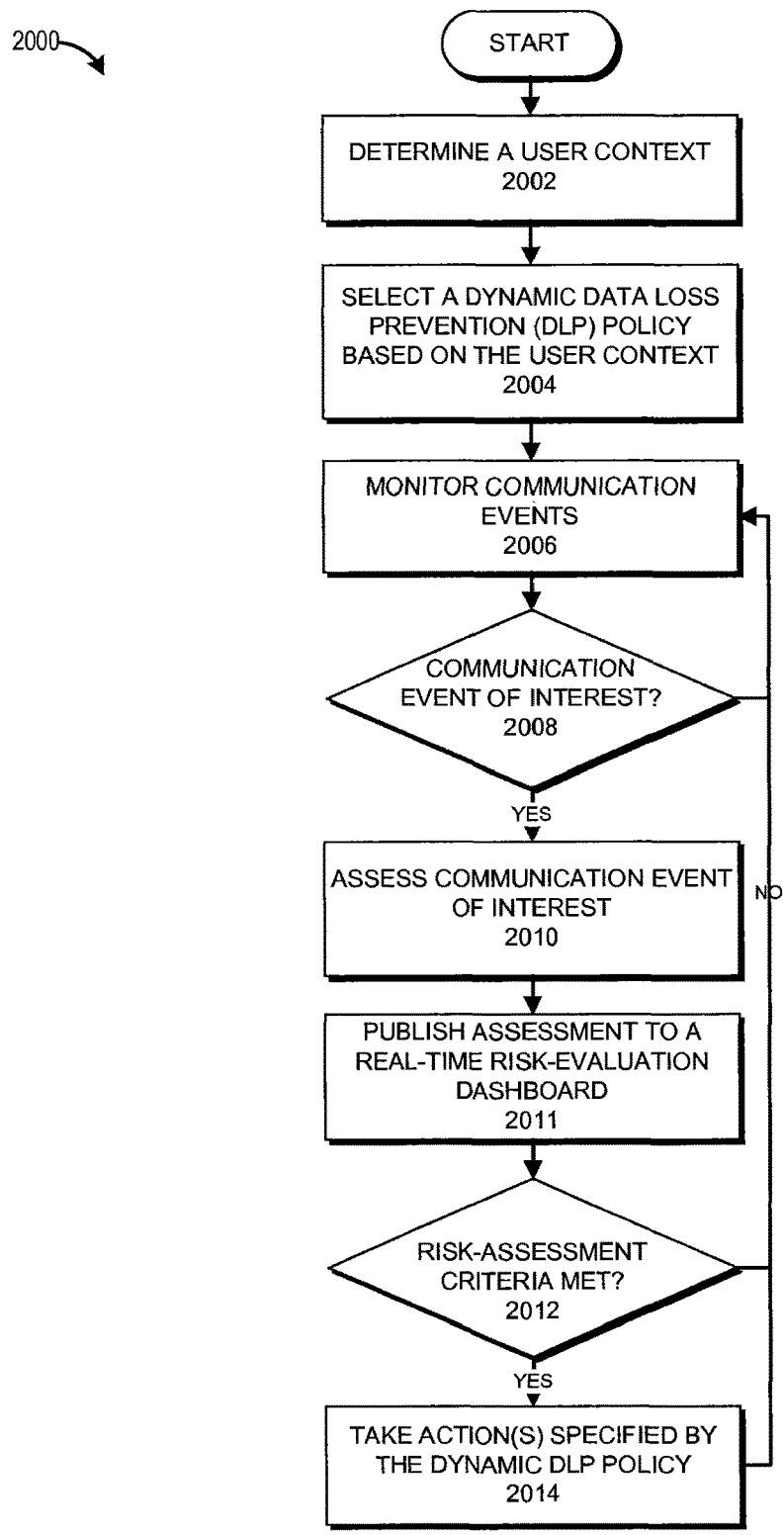
FIG. 20 presents a flowchart of an example of a process for performing dynamic DLP via a real-time user-context-based analysis.

FIG. 20 presents a flowchart of an example of a process 2000 for performing dynamic DLP via a real-time user-context-based analysis. The process 2000 can be implemented by any system that can access data, evaluate data, and/or interact with users. For example, the process 2000, in whole or in part, can be implemented by one or more of the BIM system 1830, the communications platforms 1876, the cross-platform DLP system 1846, the user-context analytics system 1880, the user-context correlation engine 1882, the user-context analytics engine 1884, the context-analytics access interface 1886, the data store 1888, and/or the active policy agent 1890. The process 2000 can also be performed generally by the system 1800. Although any number of systems, in whole or in part, can implement the process 2000, to simplify discussion, the process 2000 will be described in relation to specific systems or subsystems of the system 1800 and/or the user-context analytics system 1880.

At block 2002, the active policy agent 1890 determines a current user context of at least one user device currently accessing one of the communications platforms 1876. In general, the current user context can include any combination of information described above relative to event-context information.

At block 2004, the active policy agent 1890 selects a dynamic DLP policy based on the user context. In a typical embodiment, the dynamic DLP policy may include a cross-platform DLP policy that is implemented as described above. In addition, the dynamic DLP policy may include DLP risk-assessment criteria. In certain embodiments, the DLP risk-assessment criteria are used to assess a riskiness of communication events. If, for example, the user context indicates that the at least one user device is currently inside a given corporate firewall, the DLP risk-assessment criteria may be relaxed or nonexistent. Conversely, if, for example, the user context indicates that the at least one user device is in a public location, the DLP risk-assessment criteria may be more stringent.

More particularly, in a typical embodiment, the DLP risk-assessment criteria specifies one or more rules for determining whether a given communication event is deemed risky. In certain embodiments, the risk-assessment criteria can be based, at least in part, on content-based classifications of communications associated with communications event of interest. For example, in certain embodiments, communications related to a topic of sales may be deemed risky if the user context indicates that the at least one user device is in a public location. According to this example, communications related to the topic of sales could be specified as risky in the risk-assessment criteria. In contrast, communications related to the topic of sales may not be deemed risky if, for example, the at least one user device is determined to be at a corresponding user's home. According to this alternative example, the risk-assessment criteria may not specifically identify the topic of sales. The risk-assessment criteria can also specify other criteria such as, for example, particular communication-participant types. Other examples will be apparent to one skilled in the art after reviewing the present disclosure.

At block 2006, the active policy agent 1890 monitors communication events originated by the at least one user device. Advantageously, in certain embodiments, the block 2006 can include monitoring pre-transmission communication events as described above relative to FIG. 18. At decision block 2008, the active policy agent 1890 determines whether a communication event of interest has occurred. If not, the process 2000 returns to block 2006 and proceeds as described above. Otherwise, if it is determined at the decision block 2008 that a communication event of interest has occurred, the process 2000 proceeds to block 2010.

At block 2010, the active policy agent 1890 evaluates the communication event of interest according to the DLP risk-assessment criteria. At decision block 2012, the active policy agent 1890 determines whether the DLP risk-assessment criteria is met. If not, the process 2000 returns to block 2006 and proceeds as described above. Otherwise, if the active policy agent 1890 determines at the decision block 2012 that the DLP risk-assessment criteria is met, the process 2000 proceeds to block 2014. At block 2014, the active policy agent 1890 takes action specified by the dynamic DLP policy. For example, in the case of pre-transmission communication events, the active policy agent 1890 may prevent transmission of a communication in the fashion described above. By way of further example, the action taken can also include publishing a warning to the user, alerting an administrator or other designated user, preventing further actions by the user, forcing user log off, etc.

At block 2016, the active policy agent 1890 publishes a risk assessment to a real-time risk-evaluation dashboard on the at least one user device. In various embodiments, the risk assessment can indicate whether the communication event of interest is deemed risky, not risky, etc. In some cases, the risk assessment can be a scaled metric indicating a degree to which the communication event of interest is deemed risky. In various embodiments, the block 2016 can be omitted such that no risk assessment is published. From block 2016, the process 2000 returns to block 2006 and proceeds as described above. The process 2000 can continue indefinitely (e.g., until terminated by rule or by an administrator or other user).

Figure 21:
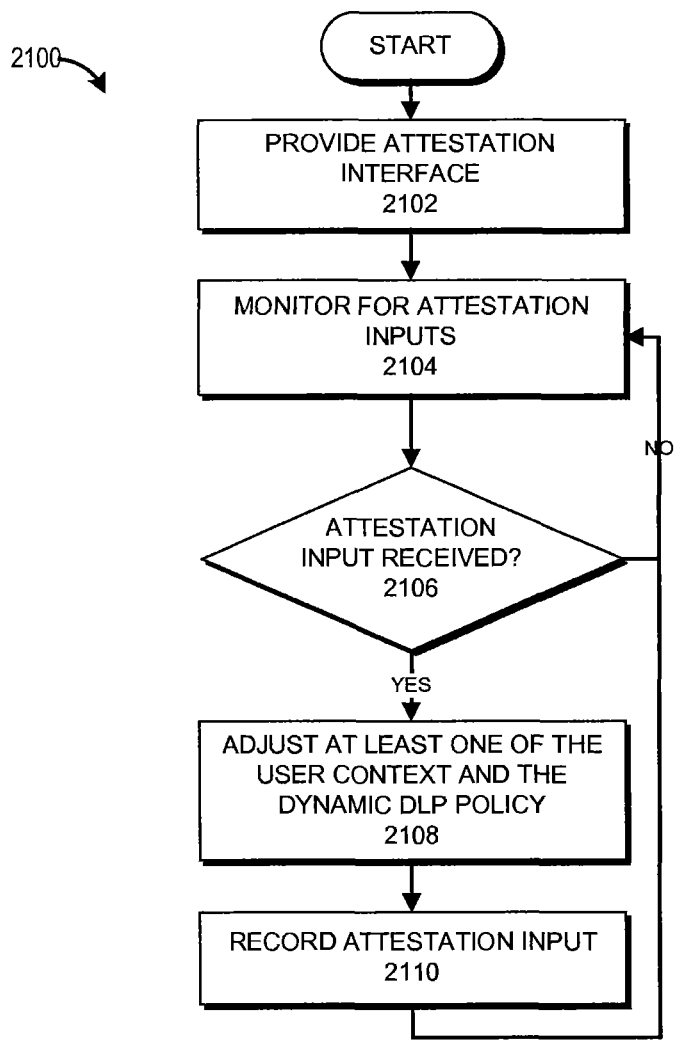
FIG. 21 presents a flowchart of an example of a process for configuring a dynamic DLP policy and/or a user context responsive to user input.

FIG. 21 presents a flowchart of an example of a process 2100 for configuring a dynamic DLP policy and/or a user context responsive to user input. The process 2100 can be implemented by any system that can access data, evaluate data, and/or interact with users. For example, the process 2100, in whole or in part, can be implemented by one or more of the BIM system 1830, the communications platforms 1876, the cross-platform DLP system 1846, the user-context analytics system 1880, the user-context correlation engine 1882, the user-context analytics engine 1884, the context-analytics access interface 1886, the data store 1888, and/or the active policy agent 1890. The process 2100 can also be performed generally by the system 1800. Although any number of systems, in whole or in part, can implement the process 2100, to simplify discussion, the process 2100 will be described in relation to specific systems or subsystems of the system 1800 and/or the user-context analytics system 1880.

At block 2102, the active policy agent 1890 provides an attestation interface to at least one user device. In a typical embodiment, the attestation interface may be provided on, or be accessible from, a real-time risk-evaluation dashboard as described with respect to FIG. 18 and with respect to block 2016 of FIG. 20. In general, the real-time risk-evaluation dashboard may indicate a determined user context of the at least one user. In addition, as described above, the real-time risk-evaluation dashboard may indicate risk assessments provided by the active policy agent 1890. In many cases, as described above relative to FIG. 20, the active policy agent 1890 may have already taken action based on the risk assessments and the determined user context.

In certain embodiments, the attestation interface can allow the user to provide attestation input that modifies how the active policy agent 1890 reacts to communication events of interest. In an example, an attestation input can allow the user to indicate that the determined user context is incorrect in determining the at least one user device to be in a public location. In another example, an attestation input can allow the user to indicate that a determined assessment of "risky" or "not risky" for a communication event of interest is incorrect.

At block 2104, the active policy agent 1890 monitors for attestation inputs. At decision block 2106, the active policy agent 1890 determines whether an attestation input has been received from the at least one user device. If not, the process 2100 returns to block 2104 and proceeds as described above. Otherwise, if it is determined at the decision block 2106 that an attestation input has been received, the process 2100 proceeds to block 2108.

At block 2108, the active policy agent 1890 adjusts at least one of the user context and the dynamic DLP policy responsive to the attestation input. In typical embodiment, the attestation input serves as a user certification, for example, that the determined user context is incorrect or that a communication event of interest has been inaccurately assessed as risky. For example, if the at least one user device is at the user's home and not in public location as suggested by the determined user context, the attestation input may so indicate and the active policy agent 1890 can modify the user context accordingly. By way of further example, if the attestation input indicates that a specific communication event of interest is incorrectly assessed as "risky," the active policy agent 1890 can modify the dynamic DLP policy to allow the communication event of interest (e.g., by adjusting a trigger threshold). In some cases, allowing the communication event of interest can involve performing an action that was previously prevented (e.g., transmitting a communication).

At block 2110, the active policy agent 1890 records the user attestation input in the data store 1888 or in memory. In various embodiments, the recordation can facilitate auditing of user attestations by administrators or other users. In some cases, all user attestations may be provided immediately to an administrator or designated user as an alert. In other cases, all user attestations can be provided in periodic reports and/or in an on-demand fashion. From block 2110, the process 2100 returns to block 2104 and proceeds as described above. The process 2100 can continue indefinitely (e.g., until terminated by rule or by an administrator or other user).

IV. Examples of Meeting Scheduling and Analytics

In various embodiments, systems and methods described above can be further leveraged to more efficaciously schedule meeting as well as facilitate collection, correlation, and analysis of meeting information. For purpose of this disclosure, meeting information may be considered any information related to a meeting or to some characteristic of a meeting. For example, meeting information can relate to when, where, and/or how a meeting is conducted, what resources are utilized at a meeting, meeting participants, and/or the like.

For purposes of this disclosure, a meeting can be any coming together of two or more people, whether scheduled or unscheduled. In various embodiments, a meeting may be a face-to-face meeting, a virtual meeting, and/or a combination thereof. A face-to-face meeting may involve two or more people coming together in a same physical location such as, for example, in a meeting or conference room, an office, etc. A virtual meeting may be mediated by communications technology. Examples of virtual meetings include conference calls, video conferences, webinars, etc. Virtual meetings can be facilitated by conference services such as CISCO WEBEX, MICROSOFT LIVEMEETING, etc.

It should be appreciated that many meetings can include both face-to-face and virtual components. For example, for a given meeting, some meeting attendees may attend in-person in a same physical location while others may join by conference call, video conference, and/or the like. In some cases, a given meeting can include two or more face-to-face meeting components mediated by communications technology. For example, a company having three offices may schedule (or desire to schedule) a company meeting such that a meeting room is reserved at each of the offices, meeting participants attend the meeting by physically appearing in one of the three meeting rooms, and meeting participants among the three offices communicate using communications technology. Other variations and combinations of virtual and/or face-to-face meetings will be apparent to one skilled in the art after reviewing the present disclosure.

In a typical embodiment, meetings may utilize meeting resources. In general, a meeting resource can be anything that facilitates scheduling, management, and/or the carrying out of a meeting. For example, in various embodiments, meeting resources can include computer systems and/or software that schedule meetings (e.g., systems include calendaring functionality such as MICROSOFT EXCHANGE, LOTUS NOTES, MOZILLA THUNDERBIRD, GOOGLE CALENDAR, APPLE ICAL, etc.), reserve resources for meetings, provide communications infrastructure for meetings (e.g., an enterprise telephony system, audio/video/web conferencing systems, etc.), facilitate collaboration or exchange of information during meetings (e.g., screen sharing. messaging tools, projectors, interactive whiteboards, displays such as monitors and televisions, etc.), manage meetings (e.g., systems that track meeting length, meeting participants who have joined, etc.), afford a physical location for meetings (e.g. a meeting or conference room), provide a service to meeting participants during meetings (e.g., wired or wireless network access), and/or the like. It should be appreciated that, in many cases, a singular resource can provide multiple aspects of the example meeting functionality described above.

Figure 22:
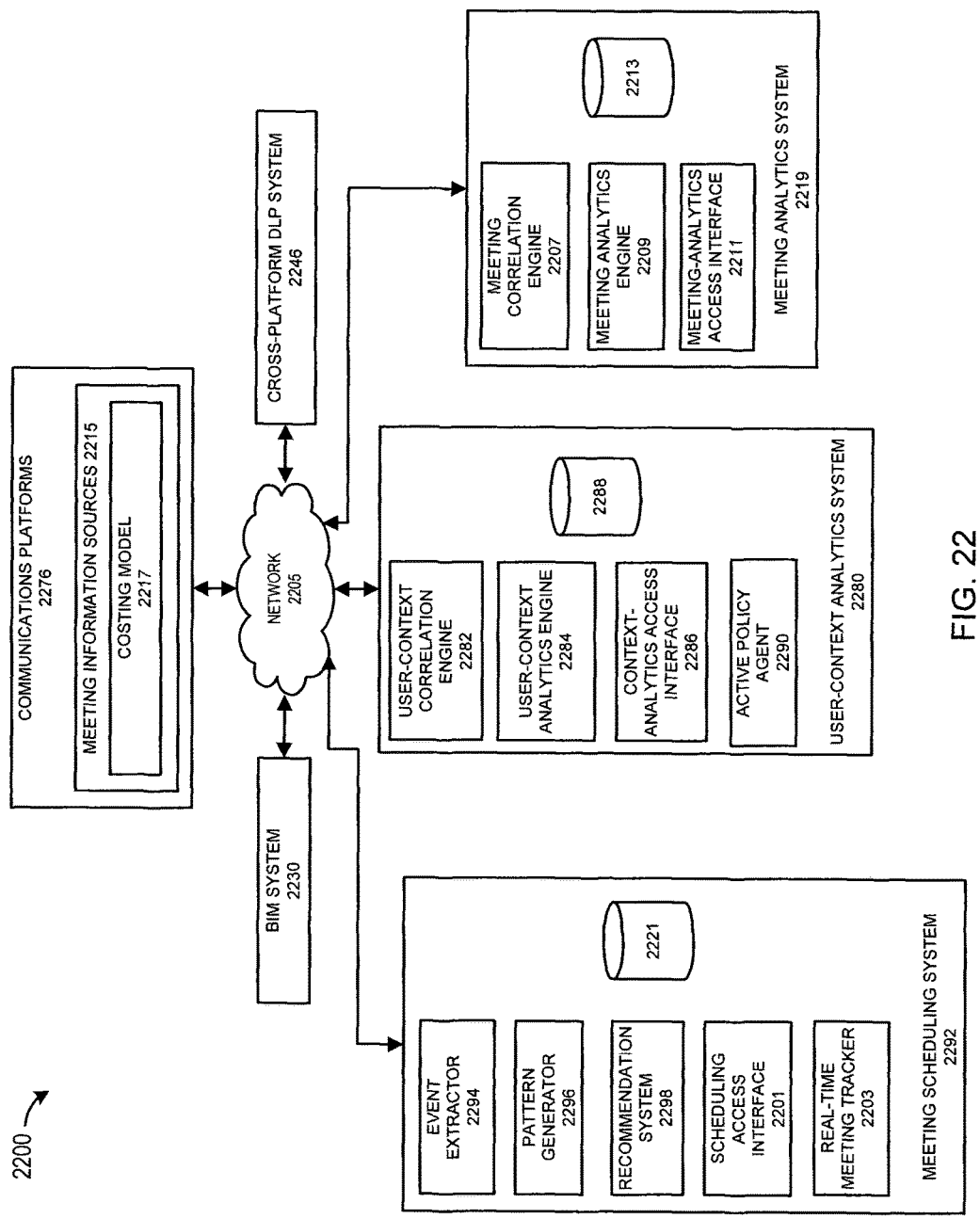
FIG. 22 illustrates an example of a system for scheduling meetings and analyzing meeting information.

FIG. 22 illustrates an embodiment of system 2200 for scheduling meetings and analyzing meeting information. The system 2200 includes communications platforms 2276, a BIM system 2230, a cross-platform DLP system 2246, a meeting scheduling system 2292, a user-context analytics system 2280, and a meeting analytics system 2219, which components are operable to communicate over a network 2205. In certain embodiments, the meeting information sources 2215, the BIM system 2230, and the meeting analytics system 2219 can collaborate to generate intelligence related to how meetings are conducted.

In general, the network 2205, the communications platforms 2276, the BIM system 2230, the cross-platform DLP system 2246, and the user-context analytics system 2280 can function or operate as described above with regard to the network 1805, the communications platforms 1876, the BIM system 1830, the cross-platform DLP system 1846, and the user-context analytics system 1880, respectively, of FIG. 18. The user-context analytics system 2280 is shown to include a user-context correlation engine 2282, a user-context analytics engine 2284, a context-analytics access interface 2286, a data store 2288 and an active policy agent 2290, which components can operate as described above with regard to the user-context correlation engine 1882, the user-context analytics engine 1884, the context-analytics access interface 1886, the data store 1888 and the active policy agent 1890, respectively, of FIG. 18.

More specifically, the communications platforms 2276 are shown to include meeting information sources 2215. The meeting information sources 2215 are representative of disparate enterprise data sources from which meeting information can be gathered. In general, the meeting information sources 2215 may be considered specific examples of one or more of the internal data sources 120 and/or one or more of the external data sources 122. In various embodiments, the meeting information sources 2215 may expose an interface such as, for example, an application programming interface (API) for accessing meeting information. In various embodiments, the meeting information sources 2215 can also expose meeting information as reports (e.g., administrative reports, usage reports, etc.), logs, and/or the like. In that way, in a typical embodiment, the BIM system 2230 is operable to collect meeting information from the meeting information sources 2215, which information can be correlated and analyzed by the meeting analytics system 2219 as described in greater detail below.

In many cases, some or all of the meeting information sources 2215 can correspond to meeting resources as described above. The meeting information sources 2215 can also include additional sources such as directory services (e.g., MICROSOFT Active Directory), content management systems, document management systems, CRM systems, HR systems (e.g., to provide labor rates of meeting participants), etc. In many cases, some of the meeting information sources 2215 can correspond to a data repository. For example, the meeting information sources 2215 can include or identify a location of site plans that specify, for example, meeting-room size, meeting-room capacity in terms of a number of people, meeting-room locations (e.g., city, building, building quadrant, building floor, coordinates, etc.), meeting-room characteristics (e.g., meeting resources provided in a meeting room, including non-technological resources such as tables, traditional whiteboards, etc.), and/or the like.

The meeting information sources 2215 can also include at least one costing model 2217. It should be appreciated that meeting resources that are available for use in a meeting generally have a cost to an enterprise. In various cases, the cost may be use-based, a flat-fee per month or year, or established in another manner. The at least one costing model 2217 typically provides a framework for allocating the costs of meeting resources to meeting instances that actually use those meeting resources. In some cases, the costs can be allocated pro rata based on an amount of time reserved, an amount of time utilized, and/or per meeting.

For example, a resource with relatively low overall utilization may result in a relatively high cost being attributed per meeting instance. Conversely, a resource with relatively high utilization may result in a relatively low cost being attributed per meeting instance. The at least one costing model 2217, or one of the meeting information sources 2215 (e.g., an HR system), can also specify whether labor rates of meeting participants should be allocated to meeting instances. In some embodiments, the at least one costing model 2217 can be representative of a plurality of costing models that each relate, for example, to a particular meeting resource or to a set of meeting resources. In other embodiments, the at least one costing model 2217 can include a singular costing model that addresses all meeting resources available for use in an enterprise.

The meeting analytics system 2219 includes a meeting correlation engine 2207, a meeting analytics engine 2209, a meeting-analytics access interface 2211, and a data store 2213. In certain embodiments, the meeting correlation engine 2207 is operable to correlate the collected meeting information to meeting instances. It should be appreciated that, in general, the meeting information sources 2215 can each include disparate types of information related to meetings. Thus, although the BIM system 2230 can collect meeting information from the meeting information sources 2215 as described above, it is not typically known when disparate pieces of information relate to a same meeting or even, in many cases, that such information is meeting information. In various embodiments, as part of its correlation functionality, the meeting correlation engine 2207 can identify meeting information and determine when meeting information relates to a same meeting instance. The meeting correlation engine 2207 can store correlated meeting data related to the meeting instances in the data store 2213. Further examples of operation of the meeting correlation engine 2207 will be described in greater detail with respect to FIGS. 23-24.

The meeting analytics engine 2209 is operable to retrieve correlated meeting data from the data store 2213 and perform analyses thereon. In an example, the meeting analytics engine 2209 can analyze how often and to what extent a particular meeting resource (or a group of meeting resources) is used in a particular set of meeting instances. In another example, the meeting analytics engine 2209 can compare utilization of a set of meeting resources. For instance, according to this example, the meeting analytics engine 2209 can perform a comparative analysis of a set of meeting rooms to determine which meeting rooms are used the most, which meeting rooms are used the least, etc. In yet another example, using the at least one costing model 2217, the meeting analytics engine 2209 can allocate a meeting cost to one or more meeting instances. A total cost of a given meeting instance can be determined, for example, by aggregating the attributable cost of each meeting resource, the attributable labor rate of each meeting participant (if applicable), and/or other costs. Further examples of operation of the meeting analytics engine 2209 will be described with respect to FIGS. 23-24.

The meeting-analytics access interface 2211 is operable to interact with users of a client information handling system over a network such as, for example, an intranet, the Internet, etc. In a typical embodiment, the meeting-analytics access interface 2211 receives and services meeting-analytics requests from users. The meeting-analytics access interface 2211 typically serves the meeting-analytics requests via interaction with the meeting analytics engine 2209. In certain embodiments, the meeting-analytics access interface 2211 can trigger the operation of the meeting analytics engine 2209 described above. Further examples of operation of the meeting-analytics access interface 2211 will be described in greater detail with respect to FIGS. 23-24.

The meeting scheduling system 2292 can include an event extractor 2294, a pattern generator 2296, a recommendation system 2298, a scheduling access interface 2201, a meeting tracker 2203, and a data store 2221. In certain embodiments, the event extractor 2294 can extract, from the user-context analytics system 2280 (e.g., via the context-analytics access interface 2286), information related to logged user-initiated events of one or more users. In general, a logged user-initiated event can be any user-initiated event for which information exists on any of the communications platforms 2276 (e.g., user-initiated communication events). The information related to logged user-initiated events which is extracted can include, for example, event-assessment data, event-context information, correlated event-assessment data, user-communication patterns, communication profiles, and/or other event information. As described with respect to FIGS. 18-21, such data may be stored in the data store 2288 of the user-context analytics system 2280. Alternatively, or in addition, in certain embodiments, the event extractor 2294 can access or generate such data in a similar fashion to that which is described relative to FIGS. 18-21.

The pattern generator 2296 is operable to generate a time-based activity pattern for a user or group of users based on, for example, information supplied by the event extractor 2294. In a typical embodiment, the pattern generator 2296 can utilize information received from the event extractor 2294 to determine, for each event of a set of logged user-initiated events of a particular user, when the event occurred, on which device the event was initiated, characteristics of the user's location (e.g., city, which company office, whether the user was in a public location, etc.), combinations of same, and/or the like. In various embodiments, the pattern generator 2296 can correlate the set of logged user-initiated events to a multidimensional time map which indicates a density of the user's events over an arrangement of recurring time intervals. The correlation can result in the time-based activity pattern of the user or group of users, which pattern can be stored in the data store 2221.

The multidimensional time map to which user-initiated events are correlated can track recurring time intervals at a configurable level of granularity. The level of granularity can be simple or complex to suit particular implementations. In an example, the multidimensional time map can include hourly intervals (or any other division) of a 24-hour day, such that each event is correlated to a particular hour based on an hour and minute at which the event occurred. In another example, the multidimensional time map can include hourly intervals (or any other division) of a 7-day week, such that each event is correlated to a particular hour based on an hour, minute, and day of the week at which the event occurred. It should be appreciated that, in certain implementations, other layers of complexity can also be tracked such as, for example, on which day of a month a particular event was initiated (e.g., first of the month), whether a given day is a holiday (e.g., a company-recognized holiday), etc. The multidimensional time map can also use a combination of the foregoing and/or other time divisions or measurements.

In certain embodiments, the pattern generator 2296 can determine or measure a density of a given user's user-initiated events across multiple levels of analysis that include, for example, particular user device used to initiate the events, particular category of user device (e.g., mobile device, workstation, etc.) used to initiate the events, particular location characteristics (e.g., city, home, public location, etc.) associated with the events, combinations of same, and/or the like. Time-based activity patterns generated by the pattern generator 2296 can include, for example, event densities for each recurring time interval of the multidimensional time map, for each level of analysis being tracked by the meeting scheduling system 2292. Each event density can be, for example, a raw number of events that were correlated to a particular recurring time interval, a normalized number of events derived from a total number user-initiated events that were correlated, combinations of same, and/or the like. As described in greater detail below, in certain embodiments, for a given element of event-context information (e.g., a defined subset of user-location information, event-timing information, and/or user-device identification information), a greater density of user-initiated events is associated with a greater degree of meeting availability.

Still referring to FIG. 22, the recommendation system 2298 is operable to provide suggestions for scheduling meetings given a set of inputs. For example, in various cases, the recommendation system 2298 can suggest meeting times, meeting participants, meeting locations, meeting resources, cost-saving measures, combinations of same, and/or the like. The recommendation system 2298 will be described in greater detail with respect to FIG. 27.

The scheduling access interface 2201 is operable to interact with users of a client information handling system over a network such as, for example, an intranet, the Internet, etc. In a typical embodiment, the scheduling access interface 2201 receives and services meeting scheduling inquiries from users. The scheduling access interface 2201 typically serves the meeting scheduling inquiries via interaction with the recommendation system 2298. In certain embodiments, the scheduling access interface 2201 can trigger the operation of the recommendation system 2298. In addition, or alternatively, the scheduling access interface 2201 can cause meetings to be scheduled via, for example, interaction with one or more of the meeting information sources 2215 (including, for example, causing meeting invitations to be sent). An example of operation of the scheduling access interface 2201 will be described in greater detail with respect to FIG. 29.

The meeting tracker 2203 can track meetings from initial scheduling to completion, or a subset thereof. Moreover, in certain embodiments, the meeting tracker 2203 can allow users to provide meeting input via social interaction. For example, in addition to "accepting" a meeting invitation, users may be permitted to provide affinity indications such as "liking" a meeting, "disliking" a meeting, "supporting" a meeting (although they may not be attending), etc.

Figure 23:
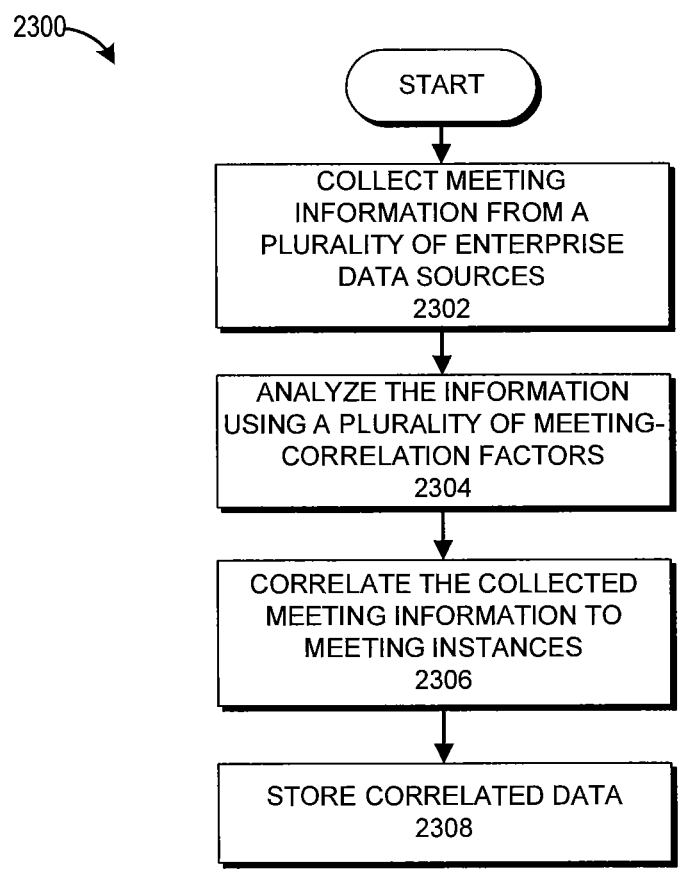
FIG. 23 illustrates an example of a process for collecting and correlating meeting information.

FIG. 23 illustrates an example of a process 2300 for collecting and correlating meeting information. For example, the process 2300, in whole or in part, can be implemented by one or more of the meeting information sources 2215, the BIM system 2230, the meeting analytics system 2219, the meeting correlation engine 2207, the meeting analytics engine 2209, the meeting-analytics access interface 2211, and/or the data store 2213. The process 2300 can also be performed generally by the system 2200. Although any number of systems, in whole or in part, can implement the process 2300, to simplify discussion, the process 2300 will be described in relation to specific systems or subsystems of the system 2200.

At block 2302, the BIM system 2230 collects meeting information from the meeting information sources 2215. The block 2302 can include the BIM system 2230 performing any of the data-collection functionality described above with respect to the BIM system 130. In an example, the block 2302 can involve, inter alia, collecting a date, a time, a scheduled start-time, a scheduled end-time, meeting invitees, and reserved meeting resources from a calendaring application. In another example, the block 2302 can involve collecting meeting-resource-utilization information from a plurality of meeting resources. In yet another example, the block 2302 can involve collecting, from meeting resources, meeting-management information such as, for example, an actual meeting start-time (e.g., when a meeting moderator joins or starts a meeting, when a last meeting participant joins, etc.), a meeting end time, which meeting invitees joined the meeting and thus became meeting participants, etc. The block 2302 can also include collecting additional information about meeting invitees, participants, and meeting locations from directory services, content management systems, CRM systems, HR systems, other data storage, etc.

At block 2304, the meeting correlation engine 2207 analyzes the collected meeting information using a plurality of meeting-correlation factors. Correlation factors are typically information usable to relate disparate meeting information to a same meeting instance. The plurality of correlation factors can include, for example, a date, time, location (e.g., city or meeting room), media channel (e.g., videoconference, audio conference, telephone call), activity, duration, meeting invitees, and/or participants, etc.

At block 2306, the meeting correlation engine 2207 correlates the collected meeting information to meeting instances based on the analysis at block 2304. It should be appreciated that configurable criteria for correlating meeting information can be hardcoded, specified in a rule-based manner and stored in the data store 2213 or memory, etc. In that way, when such configurable criteria is met, the disparate meeting-information elements can be aggregated together as correlated data.

As one example, in some cases, disparate meeting-information elements that identify a same meeting room at a same time can be correlated to a same meeting instance. In another example, disparate meeting-information elements that identify a same meeting participant at a same time can be correlated to a same meeting instance. In yet another example, disparate meeting-information elements that identify a same unique meeting resource (e.g., a particular conference bridge, a particular conference room, etc.) at a same time can be correlated to a same meeting instance. Numerous other examples of correlation will be apparent to one skilled in the art after reviewing the inventive principles contained herein.

In some embodiments, the correlation at the block 2306 can include generating new meeting information. For example, for a particular meeting instance, it may be that none of the meeting information collected by the BIM system 2230 specifies a meeting location. In certain embodiments, the meeting correlation engine 2207 can include logic to infer a meeting location from other meeting-information elements. For instance, meeting information may specify a telephone number for a conference bridge to call to connect to communications equipment in a given meeting room. In these embodiments, the meeting correlation engine 2207 can cross-reference the telephone number with other information (e.g., a meeting-room directory) to determine the meeting room to which the telephone number corresponds. According to this example, the determined meeting room can be stored as part of the correlated data for the meeting instance. A meeting location such as a city can also be determined, for example, by determining a city of meeting participants who attend (or are scheduled to attend) a meeting in-person. It should be appreciated that other missing information elements for a given meeting instance can be inferred in a similar manner.

As yet another example of generating new meeting information during the block 2306, in some embodiments, the meeting correlation engine 2207 can identify unscheduled meeting instances. For instance, in certain embodiments, an unscheduled meeting instance can be identified by matching an absence of any scheduling information (e.g., from a calendaring system) with utilization of one or more meeting resources. Stated somewhat differently, the utilization of a meeting resource without any corresponding scheduling information (e.g., from a calendaring system) can be determined to be an unscheduled meeting instance. According to this example, the unscheduled meeting instance can be reconstructed, for example, by correlating meeting information having a same date, time, location, and/or meeting participants as described above. In that way, a date, time, location, meeting resources used, and/or other information can be determined from the correlated data for the unscheduled meeting instance.

At block 2308, the meeting correlation engine 2207 stores correlated data in the data store 2213 or in memory. In various embodiments, the correlated data in the data store 2213 enables a single-pane-of-glass review of meeting information. As described above, information that was previously not known to be related to any particular meeting and/or not known to be related to a same meeting can be correlated to meeting instances that uniquely identify meetings. In this fashion, the correlated data can be accessed from the data store 2213 according to unique meeting instances. In some embodiments, the data store 2213 may identify each meeting instance by a unique ID, by a composition of meeting characteristics (e.g., time, date, location, and meeting participants), etc. The correlated data in the data store 2213 is typically available for use by the meeting analytics engine 2209. An example will be described with respect to FIG. 24.

Figure 24:
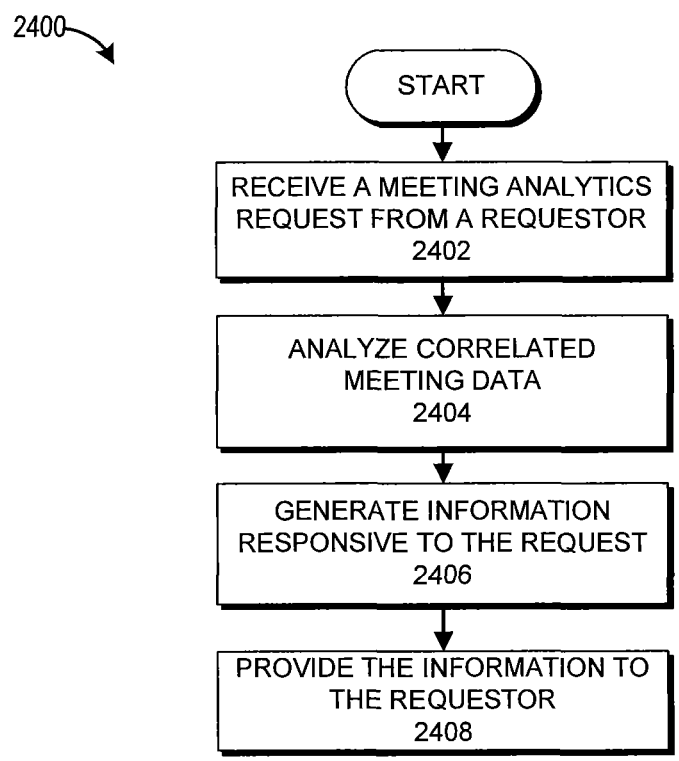
FIG. 24 illustrates an example of a process for analyzing correlated meeting data.

FIG. 24 illustrates an example of a process 2400 for analyzing correlated meeting data. For example, the process 2400, in whole or in part, can be implemented by one or more of the meeting information sources 2215, the BIM system 2230, the meeting analytics system 2219, the meeting correlation engine 2207, the meeting analytics engine 2209, the meeting-analytics access interface 2211, and/or the data store 2213. The process 2400 can also be performed generally by the system 2200. Although any number of systems, in whole or in part, can implement the process 2400, to simplify discussion, the process 2400 will be described in relation to specific systems or subsystems of the system 2200.

At block 2402, the meeting-analytics access interface receives a meeting-analytics request from a requestor. In some cases, the requestor can be an administrator or other user. In other cases, the requestor can be a computer system or software application. In some embodiments, the process 2400 can be initiated automatically, for example, as a scheduled task. In these embodiments, the requestor may be considered to be the scheduled task.

The meeting-analytics request can take various forms. In one example, the meeting-analytics requests can specify a meeting-instance scope and one or more meeting analytics. Examples of a meeting-instance scope include all meeting instances, meetings organized by a particular business unit of an organization, meetings for a particular time frame (e.g., 2014 meetings), meetings in a particular city (e.g., an organization's Portland, Oreg. office), meetings taking place in a particular conference room or floor, etc. In some cases, the one or more meeting analytics can be a data visualization. Table 7 below provides examples of analytics and data visualizations that can be requested for a given meeting-instance scope.

TABLE 7

EXAMPLE MEETING-ANALYTICS SCENARIOS

Group meeting instances by a meeting resource (e.g., compare utilization of meeting rooms by identifying most-used meeting rooms, least-used meeting rooms, etc.).
Group meeting instances by media channel (e.g., video, audio, chat, etc.)
Display top meeting participants (e.g., the ten individuals who were meeting participants in the most meeting instances within the meeting-instance scope).
Display top meeting organizers (e.g., the ten individuals who sent the most meeting invitations for meetings in the meeting-instance scope).
Display average cost per meeting for meetings in the meeting-instance scope (e.g., using a costing model).
Group by meeting-participant role (e.g., aggregate all meeting participants and group by role as determined by directory services or another source).
Group by department (e.g., aggregate all meeting participants and group by department as determined by directory services or another source).
Group by whether meeting attendance was in-person or virtual (e.g., aggregate all meeting participants and group by whether attendance was in-person or virtual).
Group by customer participant (e.g., aggregate all meeting participants and group by whether each is a customer or non-customer as determined by a CRM system or another source).
Group by over/under meeting-room capacity (e.g., aggregate all meetings utilizing conference rooms, compare each meeting's attendance to meeting-room capacity, and group meeting instances by percentage of meeting-room capacity).
Display top organizers of meetings that use a particular meeting resource (e.g., the ten individuals who scheduled the most meetings in a particular conference room).
Group by meeting instances that begin a pre-configured amount of time after a scheduled start time (where the pre-configured amount of time is greater than or equal to zero).

At block 2404, the meeting analytics engine 2209 analyzes correlated data in the data store 2213 pursuant to the request. For example, the meeting analytics engine 2209 may analyze utilization of at least one meeting resource responsive to the meeting-analytics request. In some cases, the meeting analytics engine 2209 may aggregate and/or group certain meeting information as shown above in Table 7.

At block 2406, the meeting analytics engine 2209 generates information responsive to the request based, at least in part, on the analysis at block 2404. In some embodiments, the block 2406 can include generating a requested visualization or report. At block 2408, the meeting-analytics access interface 2211 provides the generated information to the requestor.

Particular examples of using a process such as the process 2400 will now be described. For illustrative purposes, assume that it is desired to analyze utilization of a particular meeting resource (e.g., a particular teleconference product) or a particular group of meeting resources (e.g., all teleconferencing products available in the organization). In various cases, the process 2400 could be utilized to generate analytics related to meeting resources that were reserved but not used, meeting resources that are underutilized relative to other resources, etc. In an example, utilization of all teleconferencing products for an organization can be aggregated and compared by total utilization in terms of time, number of meetings, etc. Such analytics can be used to identify teleconferencing products that should be canceled, teleconferencing products that should be better promoted and publicized within the organization, etc.

In another example, meeting rooms that are routinely used in an under-capacity manner could be identified by: (1) determining, for each meeting room, an average meeting attendance as a percentage of the meeting room's capacity (e.g., for an average meeting attendance of twenty people and a meeting-room capacity of fifty people, the average meeting-room capacity would equal forty percent); (2) identifying meeting rooms having an average capacity percentage below a threshold (e.g., below fifty percent) as underutilized. Meeting rooms that are utilized in an over-capacity manner can be identified in like manner by instead targeting average capacity percentages above a certain threshold (e.g., one-hundred percent). In similar fashion, meetings that are held in meeting rooms that are smaller or larger than necessary can be identified by aggregating meeting instances that have a capacity percentage above or below a threshold, respectively. Such meeting instances can be further grouped by business unit, organizer, etc.

In yet another example, loss of employee productivity due to inefficient meeting operation can be discovered. According to this example, for a meeting instance, a meeting-start delay can be determined as a difference between a scheduled meeting start-time and an actual meeting start-time. The meeting-start delay can then be multiplied by each participant to calculate overall lost labor time. In some cases, the meeting-start delay can be multiplied by each respective labor rate for the meeting participants in order to measure lost employee productivity in terms of cost.

Processes such as the process 2400 of FIG. 24 can also be used as a basis to benchmark utilization of resources. For example, using the process 2400, it may be determined that certain resources are over-utilized, underutilized, etc. Using this information, appropriate personnel within an organization can promote better utilization of particular meeting resources and compare applicable meeting-resource-utilization over time.

Figure 25:
FIG. 25 illustrates an example of a search interface.

FIG. 25 illustrates an example of a search interface that can be provided, for example, by the meeting-analytics access interface 2211. In various embodiments, such a search interface can be used to specify a meeting-analytics request as described above.

Figure 26:
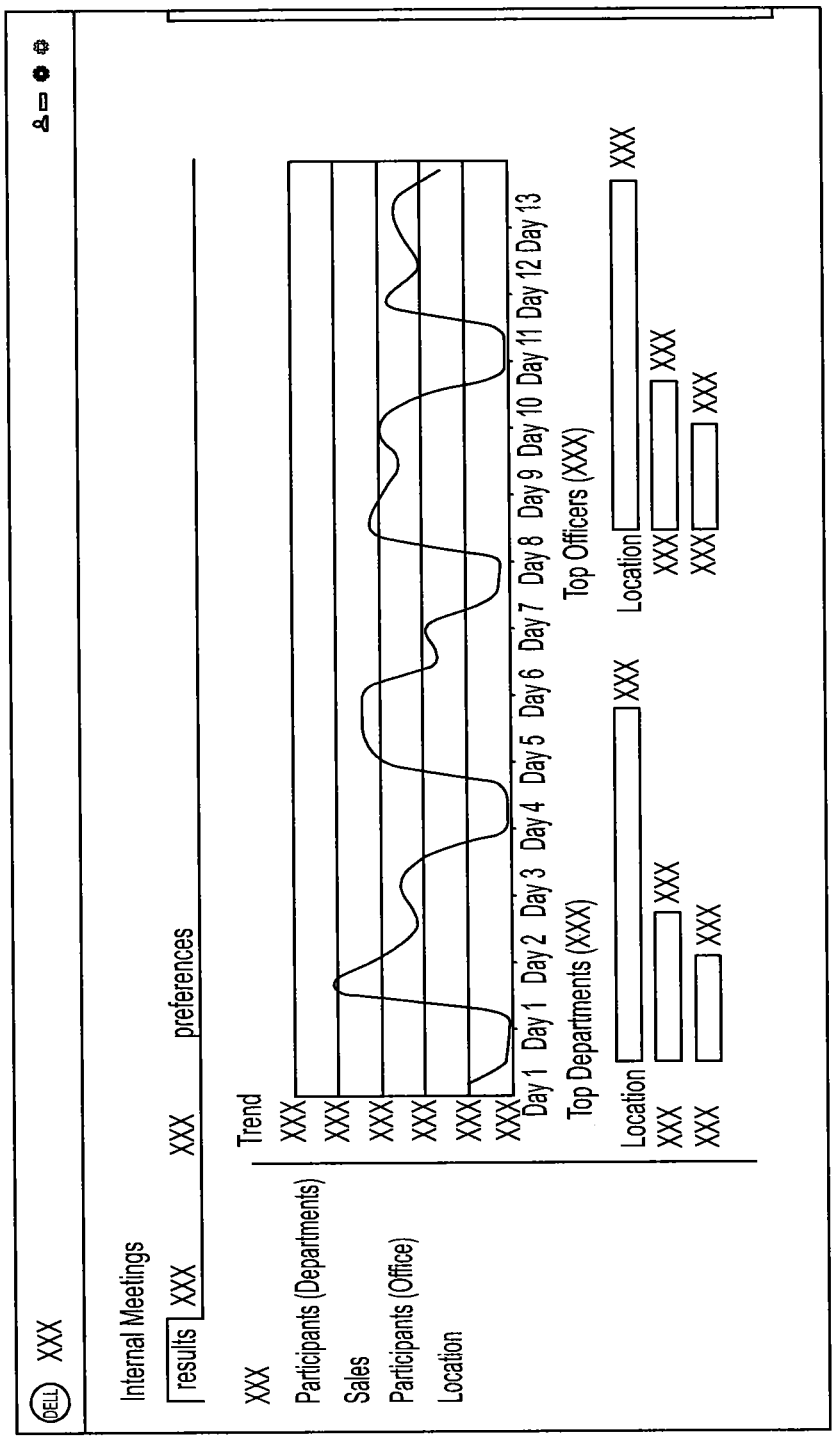
FIG. 26 illustrates an example of meeting analytics.

FIG. 26 illustrates another example of meeting analytics. In various embodiments, the meeting analytics of FIG. 26 can be generated and provided to a requestor as described with respect to the process 2400 of FIG. 24.

Figure 27:
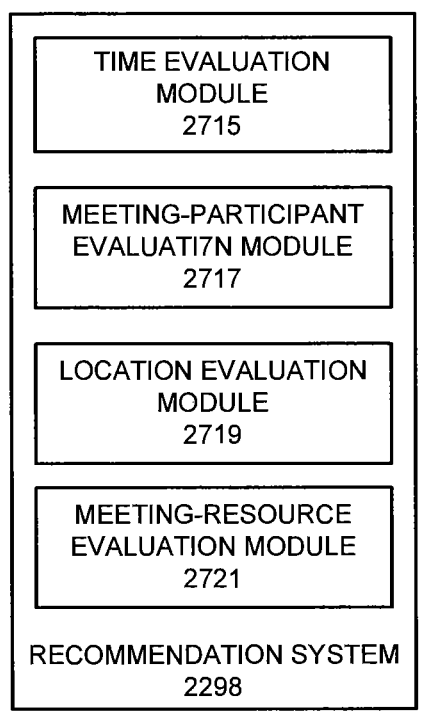
FIG. 27 illustrates an example of a recommendation system.

FIG. 27 illustrates an example of the recommendation system 2298 of FIG. 22. For illustrative purposes, the recommendation system 2298 is shown to include a time evaluation module 2715, a meeting-participant evaluation module 2717, a location evaluation module 2719, and a meeting-resource evaluation module 2721. It should be appreciated that the recommendation system 2298 can also include one or more other modules for determining other types recommendations or suggestions without deviating from the principles described herein.

The time evaluation module 2715 is operable to determine and return meeting-time information given a set of input parameters. In various cases, the input parameters can specify at least one meeting participant and, potentially, one or more event constraints. The event constraints, if any, can identify a particular characteristic or category of user-initiated events so as to limit which user-initiated events are considered by the time evaluation module 2715. In general, the time evaluation module 2715 can retrieve, from the data store 2221, a time-based activity pattern for each meeting participant specified in the input parameters, or cause such a pattern to be generated, and generate the meeting-time information requested in relation to the input parameters.

The event constraints, which as noted above can be included in the input parameters received by the time evaluation module 2715, can include any aspect of user-initiated events which is correlated, or capable of correlation, to a multidimensional time map of a given implementation. For example, the event constraints could specify a particular location or attribute thereof such as in-office user-initiated events (e.g., events which originate from a workstation in a physical company office as determined, for example, by IP address), home user-initiated events (e.g., events which originate from a location determined to be a corresponding user's home), events originated in a general geographic area (e.g., a particular city or region), etc. By way of further example, the event constraints could specify a particular device category or attribute thereof such as a mobile category (e.g., events initiated on a device determined to be a mobile device such as a smartphone or tablet), etc. The event constraints can also specify the exclusion of particular attributes or categories such as, for example, user-initiated events deemed to originate from a public location (e.g., if greater security and privacy is necessary), user-initiated events originated on a mobile category of user devices, etc.

In a more particular example, the time evaluation module 2715 could receive a request from the scheduling access interface 2201 to identify suggested meeting times in relation to a set of input parameters. The input parameters can identify a particular meeting participant and potentially one or more event constraints. In response, the time evaluation module 2715 can retrieve, from the data store 2221, a time-based activity pattern for the particular meeting participant, or cause such a pattern to be generated. Based on the input parameters, the time evaluation module 2715 can identify time intervals of comparatively high event density relative to other time intervals (in satisfaction of any constraints specified). The time intervals of comparatively high event density can be, for example, time intervals of greatest event density. In certain embodiments, the particular meeting participant can be considered to be most active, and hence most available for meetings, during time intervals of greatest event density. The suggested meeting time interval(s) that are returned can include the time intervals of greatest density, for example, as a top-N list.

In another example, the time evaluation module 2715 could receive a request from the scheduling access interface 2201 to generate comparative availability information in relation to a set of input parameters. The input parameters can identify a particular meeting participant and potentially one or more event constraints. In response, the time evaluation module 2715 can retrieve, from the data store 2221, a time-based activity pattern for the particular meeting participant. Based on the input parameters, the time evaluation module 2715 can determine event density, as constrained by the input parameters, for each recurring time interval of an applicable time map (or a subset thereof). The determined event densities can be returned by the time evaluation module 2715 as the comparative availability information, where greater event density indicates greater availability.

In still another example, the time evaluation module 2715 could receive a request to evaluate a proposed meeting-time interval for one or more possible meeting participants. The input parameters can identify the possible meeting participant(s) and potentially one or more event constraints. In response, the time evaluation module 2715 can correlate the proposed meeting-time interval to a time interval of an applicable multidimensional time map. In addition, the time evaluation module 2715 can retrieve, from the data store 2221, a time-based activity pattern for each of the possible meeting participant(s), or cause such a pattern to be generated. Based on the input parameters, the time evaluation module 2715 can compute an availability evaluation for each possible meeting participant.

Continuing the above example, in some implementations, for each possible meeting participant, the time evaluation module 2715 can determine an event density, as constrained by the input parameters, for the proposed meeting-time interval as well as for all other recurring time intervals of an applicable time map (or a subset thereof such as a working day of a requesting user or possible meeting participant). In these implementations, the event densities can be normalized values resulting from dividing an applicable event count for each time interval by a highest event count across all time intervals being considered. In some cases, the event densities can simply be output. In other cases, the time evaluation module 2715 can further compare each possible meeting participant's event density for the proposed meeting time interval to a threshold, or a series of thresholds, so as to categorize availability as "poor," (e.g., less than or equal to 0.3), "fair" (e.g., greater than 0.3 but less than or equal to 0.6), "good" (e.g., greater than 0.6 but less than or equal to 0.8), "excellent" (e.g., greater than 0.8), etc. It should be appreciated that the foregoing evaluations are merely illustrative, and that, in various embodiments, the evaluations can be conducted in numerous alternative fashions.

The meeting-participant evaluation module 2717 is operable to evaluate a potential contribution of particular users to a particular meeting given a set of input parameters. The input parameters can include, for example, a meeting description, a document that is indicative of a subject matter of a meeting, one more possible meeting participants, combinations of same, and/or the like. In certain embodiments, the meeting-participant evaluation module 2717 can perform functionality related to identifying subject-matter experts or determining subject-matter expertise of particular users as described in U.S. patent application Ser. No. 14/047,162, which application is hereby incorporated by reference.

In an example, the meeting-participant evaluation module 2717 could receive a request to identify subject-matter experts for a particular meeting. A set of input parameters can include, for example, a meeting description and, in some cases, an identification of a meeting topic. If no meeting topic is identified, in certain embodiments, the meeting-participant evaluation module 2717 can identify a topic of a particular meeting based on an analysis of a meeting description (or corresponding document). Thereafter, the meeting-participant evaluation module 2717 can determine one or more subject-matter experts on that topic as described in U.S. patent application Ser. No. 14/047,162. For example, top subject-matter experts could be returned as a top-N list.

In another example, the meeting-participant evaluation module 2717 could receive a request to identify a subject-matter expertise of a possible meeting participant. A set of input parameters can include, for example, a meeting description and, in some cases, an identification of a meeting topic. If the meeting topic is not specified, in some embodiments, the meeting topic can be identified as described above and in U.S. patent application Ser. No. 14/047,162. Thereafter, the possible meeting participant's subject-matter expertise can be determined and output, for example, to the scheduling access interface 2201.

The location evaluation module 2719 is operable to determine and return meeting-location information given a set of input parameters. The input parameters can specify, for example, at least one meeting participant and, potentially, one or more event constraints as described above. More particularly, in various cases, the input parameters may specify a particular time interval or range of time intervals. In general, the location evaluation module 2719 can retrieve, from the data store 2221, a time-based activity pattern for each meeting participant specified in the input parameters, or cause such a pattern to be generated, and generate the meeting-location information requested in relation to the input parameters.

In a more particular example, the location evaluation module 2719 could receive a request from the scheduling access interface 2201 to identify suggested meeting locations in relation to a set of input parameters. The input parameters can identify a particular meeting participant and potentially other constraints such as a particular time interval. In response, the location evaluation module 2719 can retrieve, from the data store 2221, a time-based activity pattern for the particular meeting participant, or cause such a pattern to be generated. Based on the input parameters, the location evaluation module 2719 can identify locations of comparatively high event density as compared to other locations (in satisfaction of any other constraints specified). In certain embodiments, the particular meeting participant can be considered to be most active, and hence most available for meetings, at locations of greatest event density. In certain embodiments, the locations of comparatively high event density can be the locations of greatest event density. The suggested meeting location(s) that are returned can include the locations of greatest density, for example, as a top-N list.

In another example, the location evaluation module 2719 could receive a request from the scheduling access interface 2201 to generate comparative location-availability information in relation to a set of input parameters. The input parameters can identify a particular meeting participant and potentially one or more event constraints. In response, the location evaluation module 2719 can retrieve, from the data store 2221, a time-based activity pattern for the particular meeting participant. Based on the input parameters, the location evaluation module 2719 can determine event density, as constrained by the input parameters, for each location tracked by the time map (or a subset thereof). The determined event densities can be returned by the location evaluation module 2719 as the comparative location-availability information, where greater event density indicates greater availability.

The meeting-resource evaluation module 2721 is operable to evaluate meeting resources for meetings given a set of input parameters. The input parameters can specify, for example, some aspect of a meeting such as information related to a meeting location (e.g., a particular meeting room, a particular office or city, a virtual meeting, etc.). The input parameters can, in some cases, also indicate categories of meeting resources that are desired such as audio/video/web conferencing systems, screen sharing, messaging tools, projectors, interactive whiteboards, displays such as monitors and televisions, wired or wireless network access in a meeting room, and/or the like.

In an example, the meeting-resource evaluation module 2721 could receive a request from the scheduling access interface 2201 to provide suggested meeting resources for a particular meeting that has both a physical component and a virtual component (i.e., both a meeting room and virtual meeting technology may be needed). Input parameters can specify desired meeting resources, a number of meeting participants, and/or other constraints. In certain embodiments, the meeting-resource evaluation module 2721 can query the meeting analytics system 2219 via, for example, the meeting-analytics access interface 2211, for a collection of resources that satisfy each constraint. In particular embodiments, the meeting-resource evaluation module 2721 can further request and receive cost information for each desired meeting resource, and sort, by cost, meeting-resource options. Information generated or received by the meeting-resource evaluation module 2721 can be output, for example, to the scheduling access interface 2201.

In another example, the meeting-resource evaluation module 2721 could receive a request from the schedule access interface 2201 to provide suggested meeting resources given input parameters that identify a set of meeting participants, a particular time interval, and/or other constraints. According to this example, the meeting-resource evaluation module 2721 could determine particular combinations of meeting resources that best suit the set of meeting participants. In certain embodiments, the meeting-resource evaluation module 2721 can interact with the location evaluation module 2719 to determine, for example, a meeting location for the particular time interval. In various cases, the meeting location can be, for example, a particular office or a virtual location (i.e., a determination to have a virtual meeting).

Continuing the above example, if the meeting will be a virtual meeting, the meeting-resource evaluation module 2721 can select a communications platform that best fits the set of meeting participants. For example, based on time-based activity patterns for the set of meeting participants, the meeting-resource evaluation module 2721 can determine, for the particular time interval, a location of highest event density for each meeting participant. In addition, or alternatively, the meeting-resource evaluation module 2721 can determine, for the particular time interval, a user device or user-device category of highest event density for each meeting participant. In certain embodiments, using the locations, devices and/or device categories of highest event density, the meeting-resource evaluation module 2721 can apply configurable criteria to select the communications platform to use for the virtual meeting (described in more detail below). In some implementations, the selection of a platform for a meeting can involve querying the meeting analytics system 2219 to determine a most popular communications platform among the set of meeting participants (e.g., based on historical meetings organized by and/or participated in by the set of meeting participants) and selecting that platform.

Taking the above example of selecting the platform based on configurable criteria, in some embodiments, the meeting-resource evaluation module 2721 can maintain the configurable criteria in a data store such as the data store 2221 of FIG. 22. For instance, in various implementations, the configurable criteria can indicate that, if it appears that the set of meeting participants (or a configurable subset thereof) will likely be at an office or corporate location and/or will likely be using a workstation (e.g., as a result of analyzing event densities as described above), then a specific communications platform which has robust interactive features (e.g., screen sharing, messaging, etc.) should be selected. In addition, or alternatively, the configurable criteria can indicate that, if some or all meeting participants are likely at home and/or using mobile devices, then a different communications platform should be selected (e.g., a least-cost option, a least-utilized platform, a platform deemed best for mobile devices, etc.). It should be appreciated that the above examples of selecting a communications platform are merely illustrative. Other variations and possibilities will be apparent to one skilled in the art after reviewing the present disclosure. Information generated by the meeting-resource evaluation module 2721 can be output, for example, to the scheduling access interface 2201.

Figure 28:
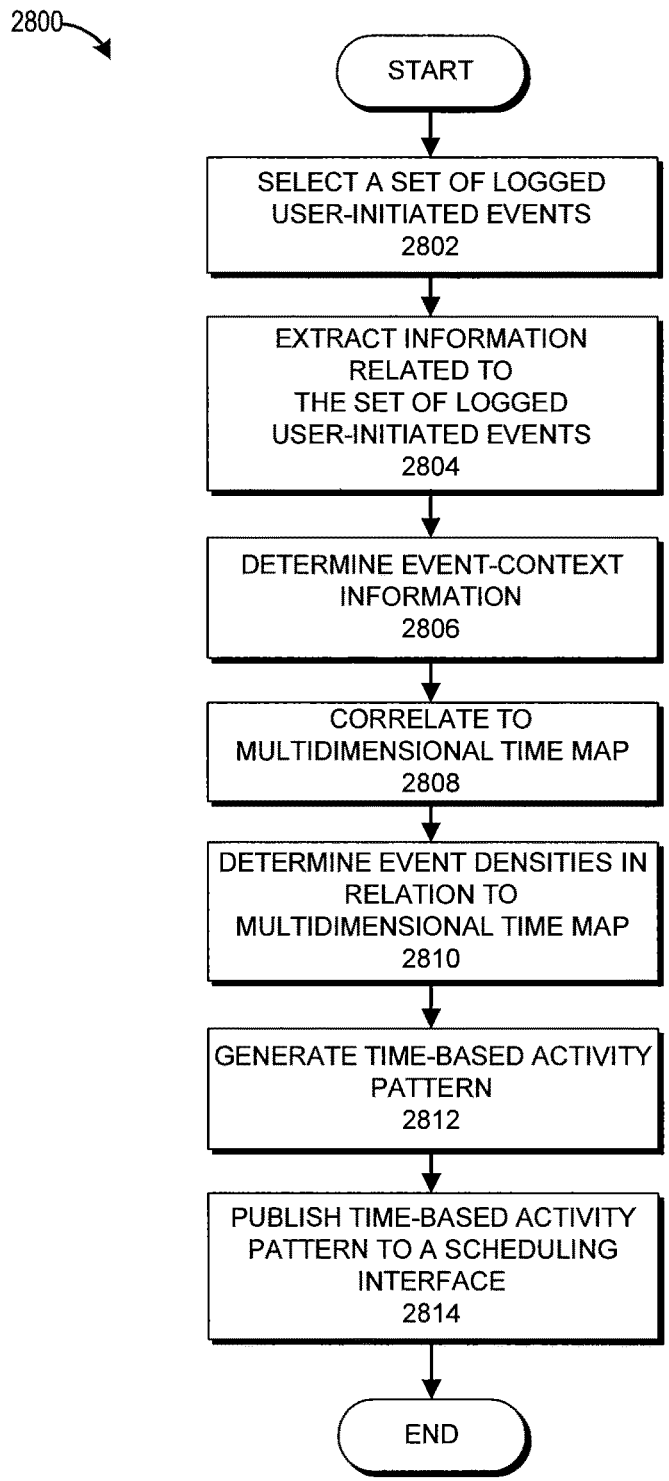
FIG. 28 illustrates an example of a process for generating a time-based activity pattern.

FIG. 28 illustrates an example of a process 2800 for generating a time-based activity pattern. In various embodiments, the process 2800 can be executed at particular intervals, on-demand when initiated by an administrator, on-demand when initiated by a user via a scheduling inquiry, combinations of same, and/or the like. In certain embodiments, the process 2800 can be executed repeatedly for each user of a set of users so that time-based activity patterns for the set of users can be stored in the data store 2221.

In particular embodiments, the process 2800, in whole or in part, can be implemented by one or more of the meeting information sources 2215, the BIM system 2230, the meeting analytics system 2219, the user-context analytics system 2280, the meeting scheduling system 2292, the event extractor 2294, the pattern generator 2296, the recommendation system 2298, the scheduling access interface 2201, the meeting tracker 2203, and/or the data store 2221. The process 2800 can also be performed generally by the system 2200. Although any number of systems, in whole or in part, can implement the process 2800, to simplify discussion, the process 2800 will be described in relation to specific systems or subsystems of the system 2200.

At block 2802, the pattern generator 2296 selects a set of logged user-initiated events for a particular user. In various cases, the selection can correspond to a historical time period such as, for example, user-initiated events that occurred over the last year, last six months, etc. In some cases, the selection can correspond to all user-initiated events of the particular user for which any information is logged.

At block 2804, the event extractor 2294 extracts event information related to the selected set of logged user-initiated events. In some embodiments, the block 2804 can include requesting all or part of the event information from the user-context analytics system 2280 via the context-analytics access interface 2286. The extracted event information can include, for example, event-assessment data, event-context information, correlated event-assessment data, user-communication patterns, communication profiles, combinations of same, and/or the like. In some embodiments, the block 2804 can include causing the user-context analytics system 2280 to generate the event information, or the event extractor 2294 itself generating the event information as described with respect to the user-context analytics system 2280.

At block 2806, the pattern generator 2296 determines one or more specific elements of event-context information for the set of logged user-initiated events. The event-context information can include, for example, user-location information, event-timing information, user-device identification information, combinations of same, and/or the like. In that way, in various cases, the pattern generator 2296 can determine where each event occurred (potentially at multiple levels of specificity), when each event occurred, and on which device each event occurred (e.g., a particular device and/or a particular category of device). In some embodiments, the one or more specific elements of event-context information can be determined via receipt of same from the user-context analytics system 2280 or another system or combination of systems.

At block 2808, the pattern generator 2296 correlates the set of logged user-initiated events to a multidimensional time map. The multidimensional time map can have any of the characteristics described above relative to FIG. 22. In general, the correlating can involve mapping each event of the set to a recurring time interval that corresponds to a time at which the event occurred (potentially at multiple levels of specificity).

At block 2810, the pattern generator 2296 determines various event densities in relation to the multidimensional time map. For example, in particular embodiments, the block 2810 can include determining an overall event density for each recurring time interval of the multidimensional time map. In addition, in certain embodiments, the block 2810 can include determining more specific event densities for some or all of the elements of event-context information which were determined at block 2806. For example, in certain embodiments, the pattern generator 2296 can determine, within each recurring time interval, a location-specific event density for one or more identifiable user locations (e.g., using the user-location information), a device-specific density for one or more user devices (e.g., using the device-identification information), a device specific density for one or more categories of user devices (such as mobile devices), combinations of same, and/or the like.

At block 2812, the pattern generator 2296 generates a time-based activity pattern of the user based, at least in part, on a result of the assessing. In certain embodiments, the time-based activity pattern can include some or all of the event densities determined at the block 2810 in relation to a corresponding recurring time interval of the multidimensional time map. In various embodiments, depending on the exact information contained therein, the time-based activity pattern can be stored in various data structures such as arrays, vectors, matrices, etc.

At block 2814, the pattern generator 2296 publishes the time-based activity pattern to a scheduling interface such as, for example, the scheduling access interface 2201. In various embodiments, the time-based activity pattern can be published by being stored in the data store 2221 or in memory.

Figure 29:
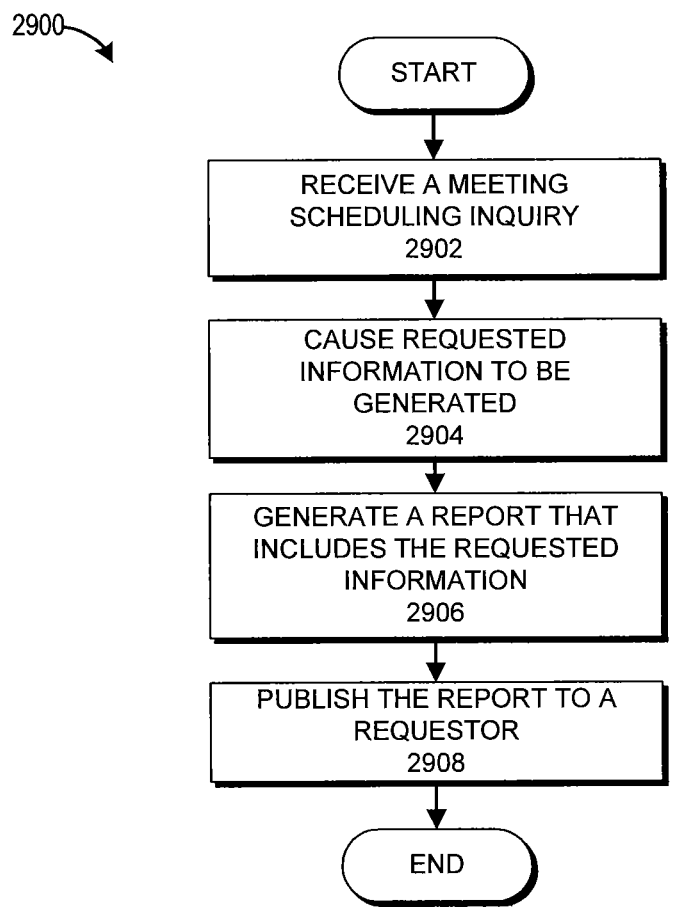
FIG. 29 illustrates an example of a process for handing meeting scheduling inquiries from users.

FIG. 29 illustrates an example of a process 2900 for handing meeting scheduling inquiries from users. In particular embodiments, the process 2900, in whole or in part, can be implemented by one or more of the meeting information sources 2215, the BIM system 2230, the meeting analytics system 2219, the user-context analytics system 2280, the meeting scheduling system 2292, the event extractor 2294, the pattern generator 2296, the recommendation system 2298, the scheduling access interface 2201, the meeting tracker 2203, and/or the data store 2221. The process 2900 can also be performed generally by the system 2200. Although any number of systems, in whole or in part, can implement the process 2900, to simplify discussion, the process 2900 will be described in relation to specific systems or subsystems of the system 2200.

At block 2902, the scheduling access interface 2201 receives a meeting scheduling inquiry from a user. In various embodiments, the meeting scheduling inquiry indicates a request for particular information such as, for example, one or more recommendations, suggestions, and/or evaluations. In general, the request can specify any information operable to be generated by the recommendation system 2298 using, for example, the time evaluation module 2715, the meeting-participant evaluation module 2717, the location evaluation module 2719, and/or the meeting-resource evaluation module 2721 of FIG. 27.

At block 2904, the scheduling access interface 2201 causes the requested information to be generated, for example, by an appropriate module of the recommendation system 2298 as described above relative to FIG. 27. It should be appreciated that, in many cases, the requested information may involve execution of multiple modules of the recommendation system 2298. At block 2906, the scheduling access interface 2201 generates a report that includes the requested information. At block 2908, the scheduling access interface 2201 publishes the report to the requesting user, for example, by making the report available to the requesting user over the network 2205.

In various embodiments, the process 2900 can be executed repeatedly in efforts to schedule a meeting involving one or more meeting participants. In certain embodiments, the scheduling access interface 2201 can further facilitate scheduling of the meeting and reservation of meeting resources via interaction with one or more of the meeting information sources 2215. Further, the meeting tracker 2203 can track responses and affinity indications relative to the meeting as described above with respect to FIG. 22.

Depending on the embodiment, certain acts, events, or functions of any of the algorithms described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. Although certain computer-implemented tasks are described as being performed by a particular entity, other embodiments are possible in which these tasks are performed by a different entity.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

While the above detailed description has shown, described, and pointed out novel features as applied to various embodiments, it will be understood that various omissions, substitutions, and changes in the form and details of the devices or algorithms illustrated can be made without departing from the spirit of the disclosure. As will be recognized, the processes described herein can be embodied within a form that does not provide all of the features and benefits set forth herein, as some features can be used or practiced separately from others. The scope of protection is defined by the appended claims rather than by the foregoing description. All changes which come within the meaning and range of equivalency of the claims are to be embraced within their scope.

What is claimed is:

1. A method comprising, by a computer system:
accessing data from a plurality of data sources in a plurality of data formats;
abstracting the data into a standardized format for further analysis, the abstracting comprising selecting the standardized format based on a type of the data;
selecting, from the abstracted data, a set of logged user-initiated events of a particular user that were previously executed on a computing platform from a plurality of locations using a plurality of different devices;
determining timing information, device-identification information, and user-location information for the set of logged user-initiated events on a per-event basis;
correlating the set of logged user-initiated events to recurring time intervals of a time map on a per-event basis;
determining an overall density of the set of logged user-initiated events of the particular user for at least some recurring time intervals of the time map;
determining a location-specific density of the set of logged user-initiated events of the particular user for at least some recurring time intervals of the time map, wherein the determining of the location-specific density is based, at least in part, on the user-location information;
determining a device-specific density of the set of logged user-initiated events of the particular user for at least some recurring time intervals of the time map, wherein the determining of the device-specific density is based, at least in part, on the device-identification information;
generating a time-based activity pattern of the particular user, the time-based activity pattern comprising, for the at least some recurring time intervals of the time map, information related to the overall density, the location-specific density, and the device-specific density;
receiving a request to provide a suggested communications platform for a virtual meeting with the particular user based on one or more event constraints, wherein the one or more event constraints comprise a particular time interval, and wherein the one or more event constraints is operable to be correlated to the time map;
determining a communications platform for the virtual meeting based, at least in part, on an analysis of the time-based activity pattern of the particular user and the one or more event constraints, the determining of the communications platform comprising:
  determining, for the particular time interval, a highest event density of a user device based, at least in part, on the device-specific density; and
  responsive to the determination, applying device-specific configuration criteria to select the communications platform;
responsive to the determination of the communications platform, facilitating scheduling of the virtual meeting on the communications platform; and
executing the virtual meeting on the communications platform during the particular time interval.

2. The method of claim 1, wherein a greater density of user-initiated events is interpreted to mean a greater degree of meeting availability of the user.

3. The method of claim 1, comprising:
receiving a request to identify suggested meeting time intervals in relation to the user;
retrieving the time-based activity pattern of the user;
identifying based, at least in part, on the time-based activity pattern, one or more recurring time intervals of the time map that each have a comparatively high event density; and
publishing information related to the one or more recurring time intervals as the suggested meeting time intervals.

4. The method of claim 1, comprising:
receiving a request to generate comparative availability information of the user; and
retrieving the time-based activity pattern of the user;
determining based, at least in part, on the time-based activity pattern, event densities of at least selected recurring time intervals of the time map; and
publishing information related to the event densities as the comparative availability information.

5. The method of claim 1, comprising:
receiving a request to evaluate an availability of the user for a proposed meeting time interval;
correlating the meeting time interval to at least one recurring time interval of the time map;
retrieving the time-based activity pattern;
determining based, at least in part, on the time-based activity pattern, event densities of at least selected recurring time intervals of the time map, the selected recurring time intervals comprising the at least one recurring time interval to which the meeting time interval is correlated;
computing an availability evaluation of the user for the proposed meeting time interval based, at least in part, on the event densities; and
publishing information related to the availability evaluation to a requestor.

6. The method of claim 1, comprising:
receiving a request to identify a subject-matter expert for a meeting;
determining at least one subject-matter expert for a topic of the meeting; and
publishing information related to the at least one subject-matter expert to a requestor.

7. The method of claim 1, comprising:
receiving a request to identify a suggested meeting location in relation to the user;
retrieving the time-based activity pattern;
identifying, from the time-based activity pattern, one or more locations identifying, from the time-based activity pattern, one or more locations that each have a comparatively high event density; and
publishing information related to the one or more locations to a requestor.

8. The method of claim 1, comprising:
receiving a request to generate comparative location-availability information for the user;
retrieving the time-based activity pattern of the user;
determining, from the time-based activity pattern, event densities of one or more locations; and
publishing information related to the event densities as the comparative location-availability information.

9. The method of claim 1, comprising:
receiving a request to provide suggested meeting resources, the request comprising a plurality of constraints;
wherein the plurality of constraints comprise one or more desired meeting resources and a number of meeting participants;
querying a meeting analytics system for one or more collections of meeting resources that satisfy the plurality of constraints;
sorting one or more meeting-resource options by cost; and
publishing a result of the sorting to a requestor.

10. The method of claim 1, comprising:
facilitating scheduling of a meeting comprising a plurality of meeting participants; and
allowing the plurality of meeting participants to provide a least one affinity indication relative to the meeting.

11. An information handling system comprising:
at least one processor, wherein the at least one processor is operable to implement a method, the method comprising:
accessing data from a plurality of data sources in a plurality of data formats;
abstracting the data into a standardized format for further analysis, the abstracting comprising selecting the standardized format based on a type of the data;
selecting, from the abstracted data, a set of logged user-initiated events of a particular user that were previously executed on a computing platform from a plurality of locations using a plurality of different devices;
determining timing information, device-identification information, and user-location information for the set of logged user-initiated events on a per-event basis;
correlating the set of logged user-initiated events to recurring time intervals of a time map on a per-event basis;
determining an overall density of the set of logged user-initiated events of the particular user for at least some recurring time intervals of the time map;
determining a location-specific density of the set of logged user-initiated events of the particular user for at least some recurring time intervals of the time map, wherein the determining of the location-specific density is based, at least in part, on the user-location information;
determining a device-specific density of the set of logged user-initiated events of the particular user for at least some recurring time intervals of the time map, wherein the determining of the device-specific density is based, at least in part, on the device-identification information;
generating a time-based activity pattern of the particular user, the time-based activity pattern comprising, for the at least some recurring time intervals of the time map, information related to the overall density, the location-specific density, and the device-specific density;
receiving a request to provide a suggested communications platform for a virtual meeting with the particular user based on one or more event constraints, wherein the one or more event constraints comprise a particular time interval, and wherein the one or more event constraints is operable to be correlated to the time map;
determining a communications platform for the virtual meeting based, at least in part, on an analysis of the time-based activity pattern of the particular user and the one or more event constraints, the determining of the communications platform comprising:
determining, for the particular time interval, a highest event density of a user device based, at least in part, on the device-specific density; and
responsive to the determination, applying device-specific configuration criteria to select the communications platform;
responsive to the determination of the communications platform, facilitating scheduling of the virtual meeting on the communications platform; and
executing the virtual meeting on the communications platform during the particular time interval.

12. The information handling system of claim 11, wherein a greater density of user-initiated events is interpreted to mean a greater degree of meeting availability of the user.

13. The information handling system of claim 11, the method comprising:
receiving a request to identify suggested meeting time intervals in relation to the user;
retrieving the time-based activity pattern of the user;
identifying based, at least in part, on the time-based activity pattern, one or more recurring time intervals of the time map that each have a comparatively high event density; and
publishing information related to the one or more recurring time intervals as the suggested meeting time intervals.

14. The information handling system of claim 11, the method comprising:
receiving a request to generate comparative availability information of the user; and
retrieving the time-based activity pattern of the user;
determining based, at least in part, on the time-based activity pattern, event densities of at least selected recurring time intervals of the time map; and
publishing information related to the event densities as the comparative availability information.

15. The information handling system of claim 11, the method comprising:
receiving a request to evaluate an availability of the user for a proposed meeting time interval;
correlating the meeting time interval to at least one recurring time interval of the time map;
retrieving the time-based activity pattern;
determining based, at least in part, on the time-based activity pattern, event densities of at least selected recurring time intervals of the time map, the selected recurring time intervals comprising the at least one recurring time interval to which the meeting time interval is correlated;
computing an availability evaluation of the user for the proposed meeting time interval based, at least in part, on the event densities; and
publishing information related to the availability evaluation to a requestor.

16. The information handling system of claim 11, the method comprising:
receiving a request to identify a subject-matter expert for a meeting;
determining at least one subject-matter expert for a topic of the meeting; and
publishing information related to the at least one subject-matter expert to a requestor.

17. The information handling system of claim 11, the method comprising:
- receiving a request to identify a suggested meeting location in relation to the user;
- retrieving the time-based activity pattern;
- identifying, from the time-based activity pattern, one or more locations
- identifying, from the time-based activity pattern, one or more locations that each have a comparatively high event density; and
- publishing information related to the one or more locations to a requestor.

18. The information handling system of claim 11, the method comprising:
- receiving a request to generate comparative location-availability information for the user;
- retrieving the time-based activity pattern of the user;
- determining, from the time-based activity pattern, event densities of one or more locations; and
- publishing information related to the event densities as the comparative location-availability information.

19. A computer-program product comprising a non-transitory computer-usable medium having computer-readable program code embodied therein, the computer-readable program code adapted to be executed to implement a method comprising:
- accessing data from a plurality of data sources in a plurality of data formats;
- abstracting the data into a standardized format for further analysis, the abstracting comprising selecting the standardized format based on a type of the data;
- selecting, from the abstracted data, a set of logged user-initiated events of a particular user that were previously executed on a computing platform from a plurality of locations using a plurality of different devices;
- determining timing information, device-identification information, and user-location information for the set of logged user-initiated events on a per-event basis;
- correlating the set of logged user-initiated events to recurring time intervals of a time map on a per-event basis;
- determining an overall density of the set of logged user-initiated events of the particular user for at least some recurring time intervals of the time map;
- determining a location-specific density of the set of logged user-initiated events of the particular user for at least some recurring time intervals of the time map, wherein the determining of the location-specific density is based, at least in part, on the user-location information;
- determining a device-specific density of the set of logged user-initiated events of the particular user for at least some recurring time intervals of the time map, wherein the determining of the device-specific density is based, at least in part, on the device-identification information;
- generating a time-based activity pattern of the particular user, the time-based activity pattern comprising, for the at least some recurring time intervals of the time map, information related to the overall density, the location-specific density, and the device-specific density;
- receiving a request to provide a suggested communications platform for a virtual meeting with the particular user based on one or more event constraints, wherein the one or more event constraints comprise a particular time interval, and wherein the one or more event constraints is operable to be correlated to the time map;
- determining a communications platform for the virtual meeting based, at least in part, on an analysis of the time-based activity pattern of the particular user and the one or more event constraints, the determining of the communications platform comprising:
  - determining, for the particular time interval, a highest event density of a user device based, at least in part, on the device-specific density; and
  - responsive to the determination, applying device-specific configuration criteria to select the communications platform;
- responsive to the determination of the communications platform, facilitating scheduling of the virtual meeting on the communications platform; and
- executing the virtual meeting on the communications platform during the particular time interval.

\* \* \* \* \*